(12) United States Patent
Gentile

(10) Patent No.: US 12,407,198 B1
(45) Date of Patent: Sep. 2, 2025

(54) ELECTRIC MOTOR, GENERATOR AND BATTERY COMBINATION AND APPLICATIONS

(71) Applicant: Francis Xavier Gentile, Los Angeles, CA (US)

(72) Inventor: Francis Xavier Gentile, Los Angeles, CA (US)

(73) Assignee: Francis Xavier Gentile, Los Angeles, CA (US)

( * ) Notice: Subject to any disclaimer, the term of this patent is extended or adjusted under 35 U.S.C. 154(b) by 106 days.

(21) Appl. No.: 17/835,681

(22) Filed: Jun. 8, 2022

Related U.S. Application Data

(60) Provisional application No. 63/291,394, filed on Dec. 18, 2021, provisional application No. 63/183,039, filed on May 2, 2021, provisional application No. 63/172,606, filed on Apr. 8, 2021.

(51) Int. Cl.
  *H02K 1/06* (2006.01)
  *H02K 7/00* (2006.01)
(52) U.S. Cl.
  CPC ............... *H02K 1/06* (2013.01); *H02K 7/00* (2013.01)

(58) Field of Classification Search
  CPC ................................. H02K 1/06; H02K 7/00
  USPC ....................................................... 310/75 R
  See application file for complete search history.

(56) References Cited

U.S. PATENT DOCUMENTS

| | | | |
|---|---|---|---|
| 6,229,224 B1 | 5/2001 | Gagne | |
| 6,717,280 B1 | 4/2004 | Bienville | |
| 10,988,030 B2 | 4/2021 | Gentile | |
| 11,171,533 B2 | 11/2021 | Gentile | |
| 11,260,936 B2 * | 3/2022 | Calley | B60K 7/0007 |
| 2003/0073546 A1 | 4/2003 | Lassanske et al. | |
| 2010/0090475 A1 | 4/2010 | Tsai et al. | |
| 2016/0072353 A1 * | 3/2016 | Gentile | H02K 3/47 |
| | | | 29/598 |
| 2018/0205289 A1 * | 7/2018 | Gentile | H02K 5/04 |
| 2018/0219464 A1 * | 8/2018 | Newmark | H02K 21/12 |
| 2021/0031873 A1 * | 2/2021 | Calley | B62M 6/45 |
| 2022/0045559 A1 * | 2/2022 | Hunstable | H02K 21/24 |
| 2022/0069660 A1 * | 3/2022 | Gentile | H02K 5/00 |

\* cited by examiner

*Primary Examiner* — Rashad H Johnson
(74) *Attorney, Agent, or Firm* — Fish IP Law, LLP

(57) ABSTRACT

Methods of constructing electrical machines using 2 dimensional flat sheet cutting implemented in human generation and vehicle propulsion and regeneration.

19 Claims, 117 Drawing Sheets

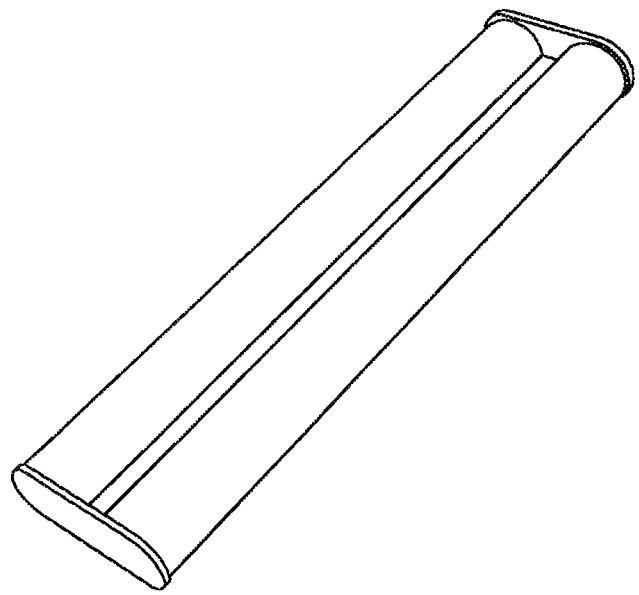
Fig. 2AAA

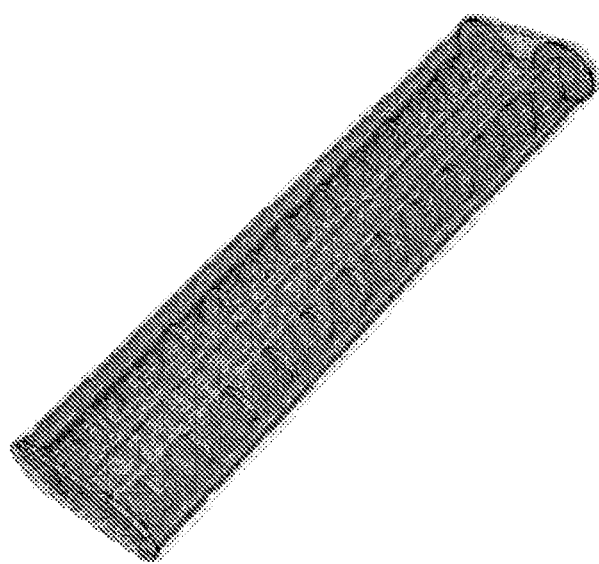
Fig. 2BBB

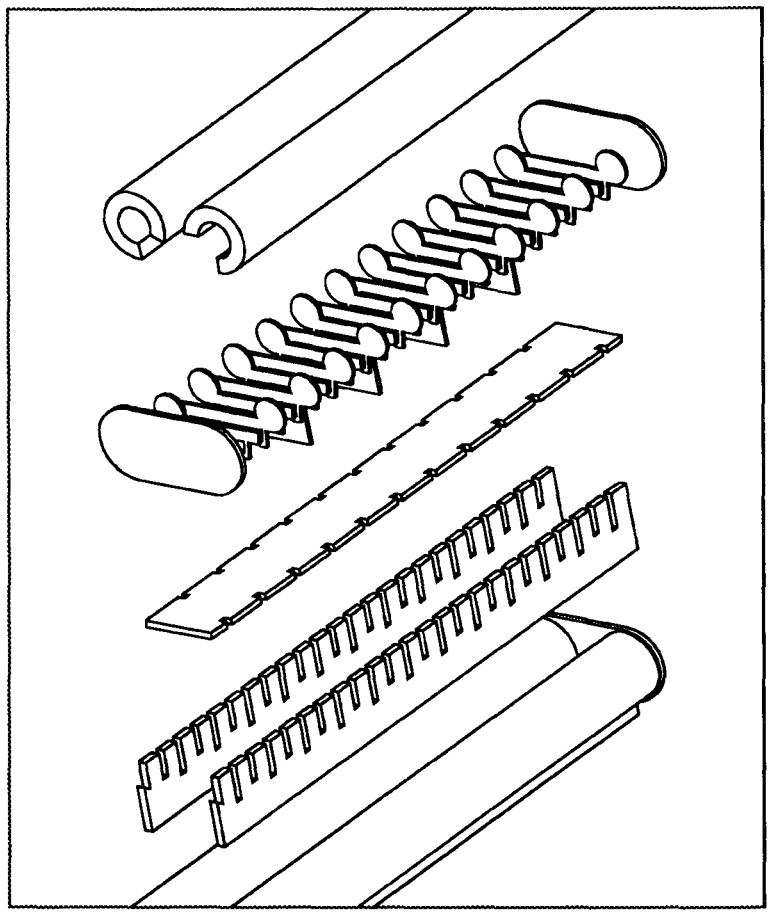
Fig. 2CCC

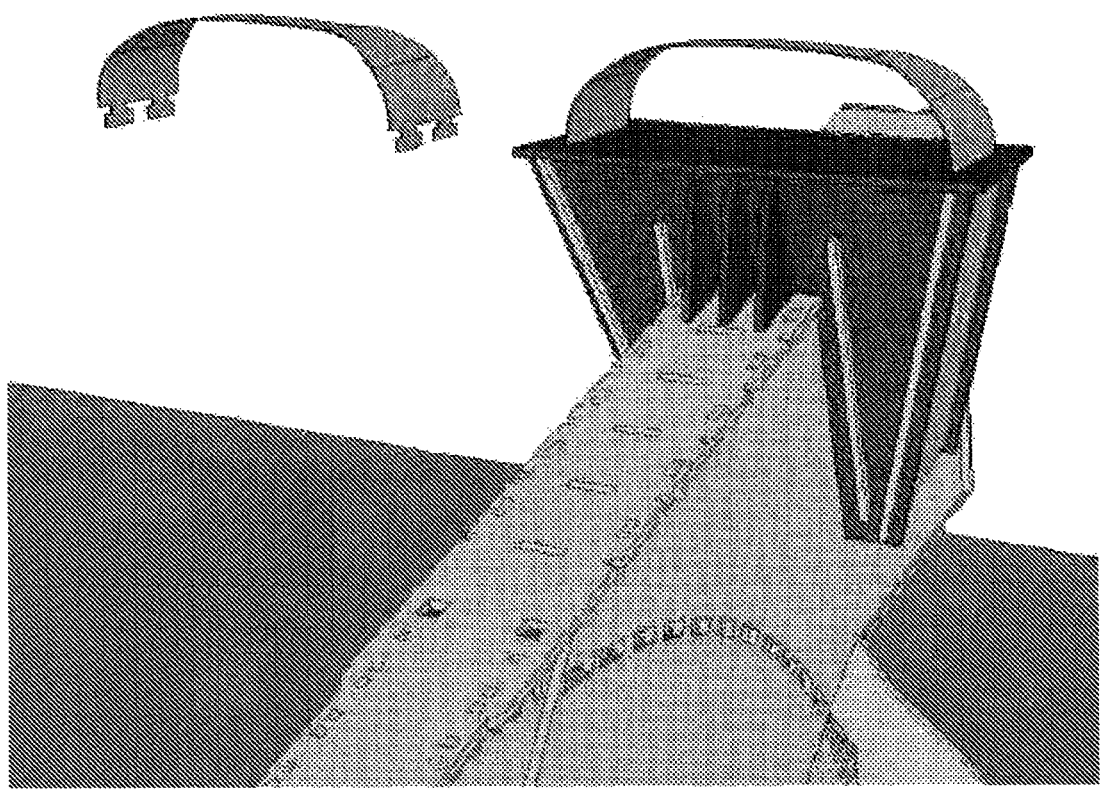
Fig. 2DDD

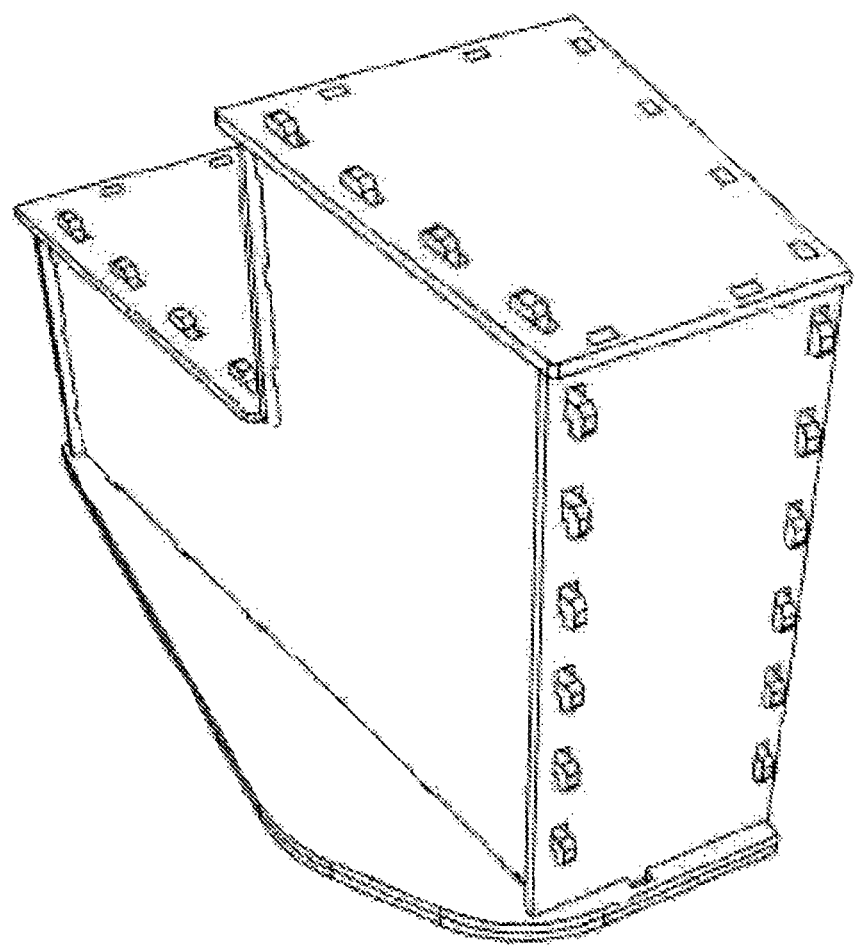
Fig. 2EEE

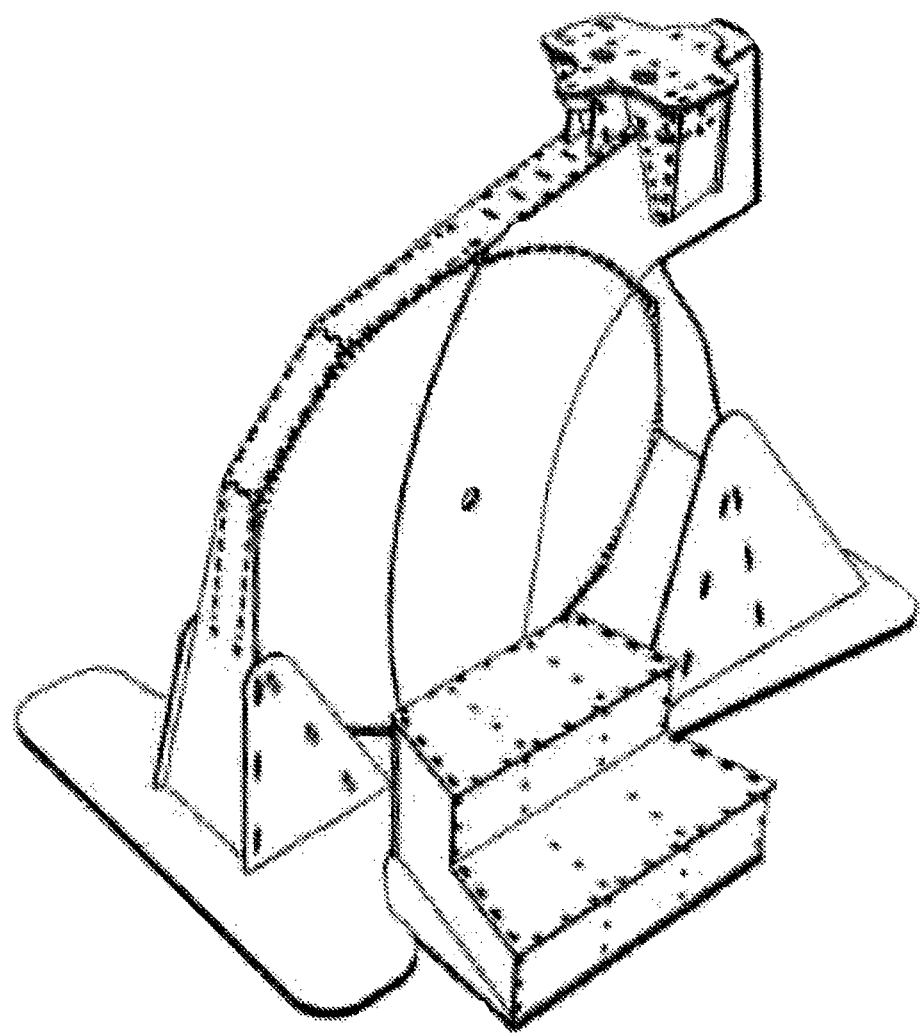
Fig. 2FFF

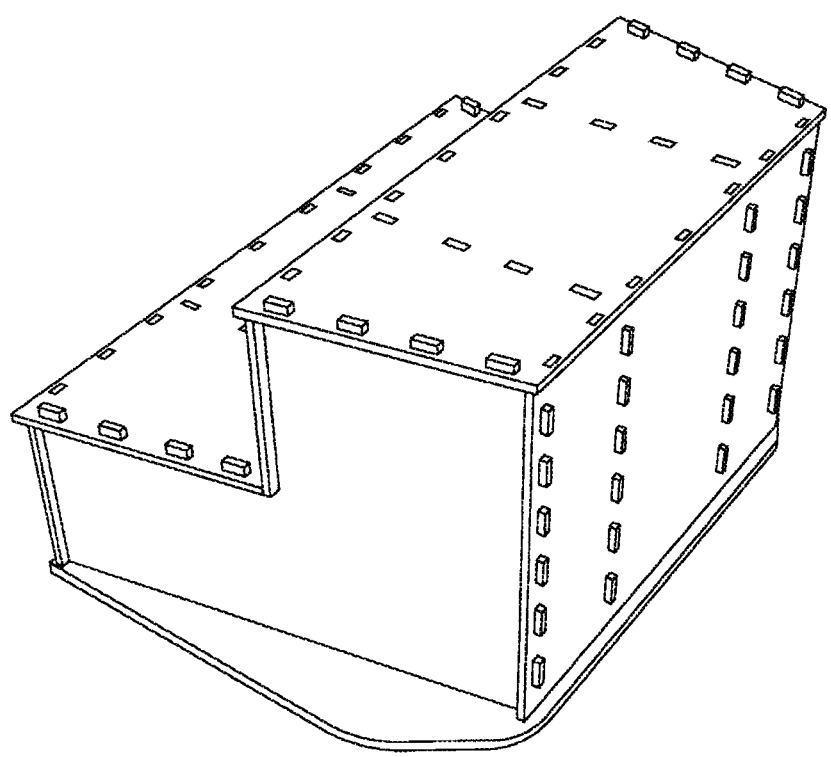
Fig. 2GGG

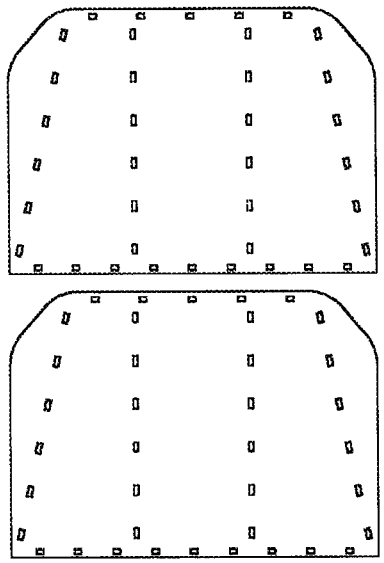
Fig. 2HHH
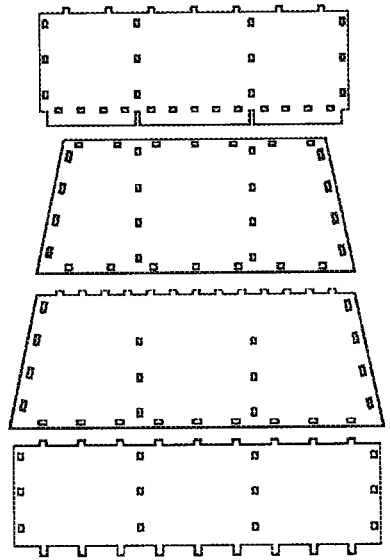
Fig. 2III
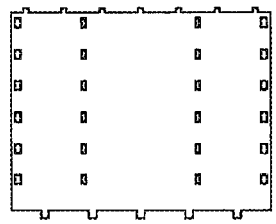
Fig. 2JJJ
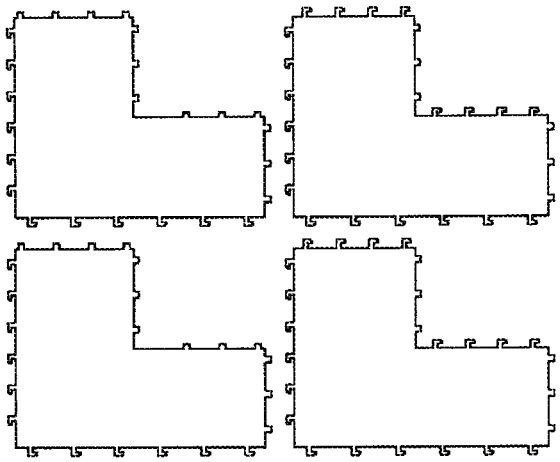
Fig. 2KKK

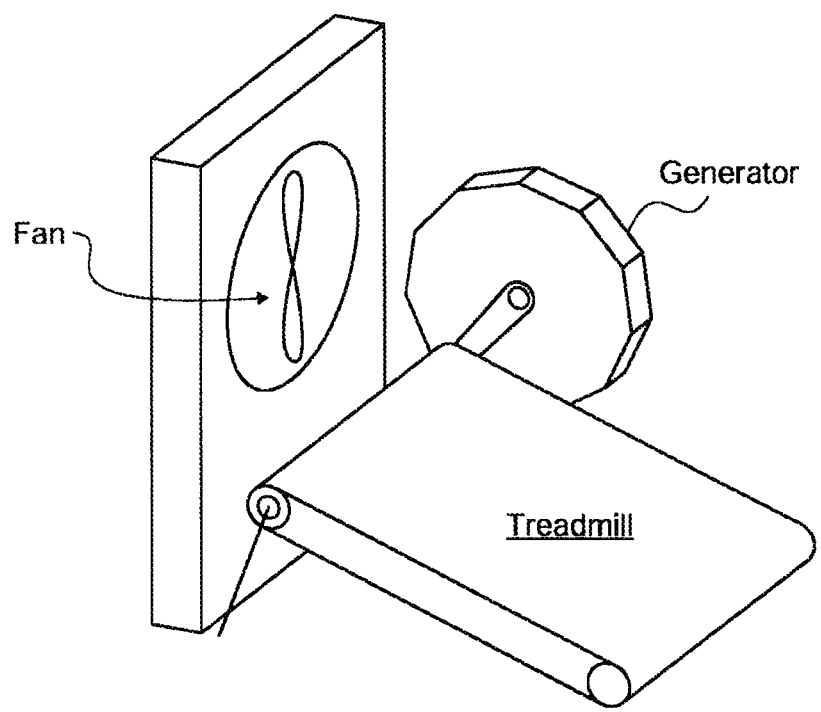
Fig. 2LLL

Wheelie Poppin'
Curb Jumpin'
No Nut Smasher Seat
No Sissy Bar
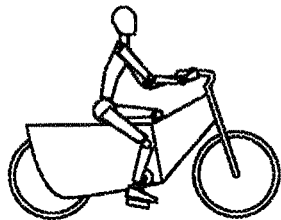
Box-Ray
- High, Narrow
- Handle Bar Position
- Fat Free Tires
- Internal Storage
- Fast Locking
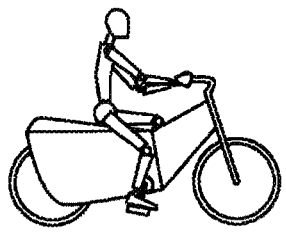
Fold-up Pedals
+
↓
Connection
Rotation
for
Storage
Narrow to avoid
lamp posts / trees, etc
Finger Bash Guard
Steering Bearing (Removability for Storage?)
or Steering Bearings
within box
*Fig. 2MMM*

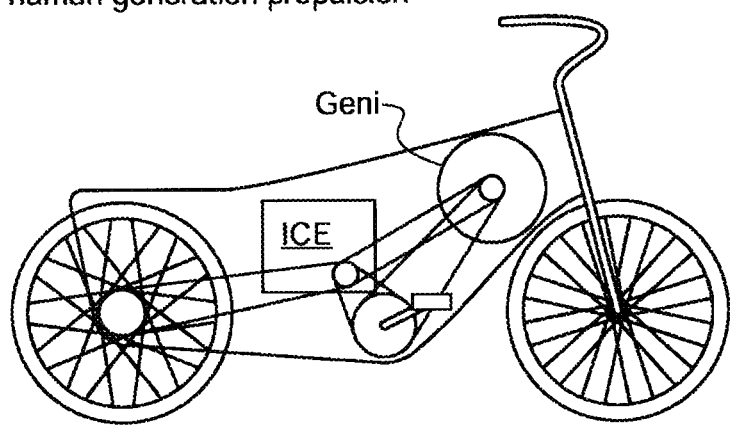
Fig. 2NNN

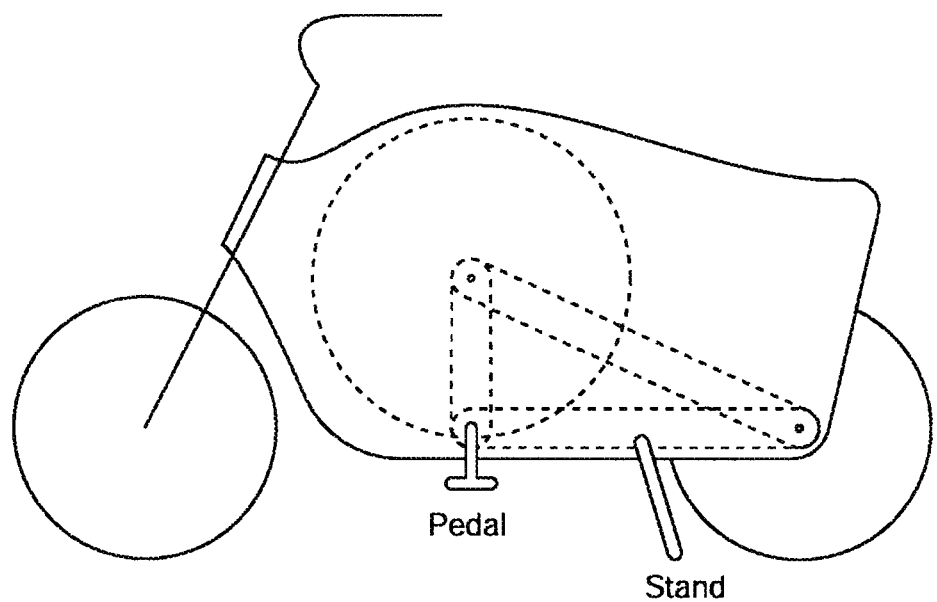
Pedal
Stand
No Electric Bicycle
For Propulsion and Regeneration Breaking
or
A Bicycle that is also a Stationary
or Rolling Electrical Generator
Using the principles in these referenced
application
Fig. 2000

Current layout - slots aligned normal to caps

Slots radially aligned and equal angular spacing

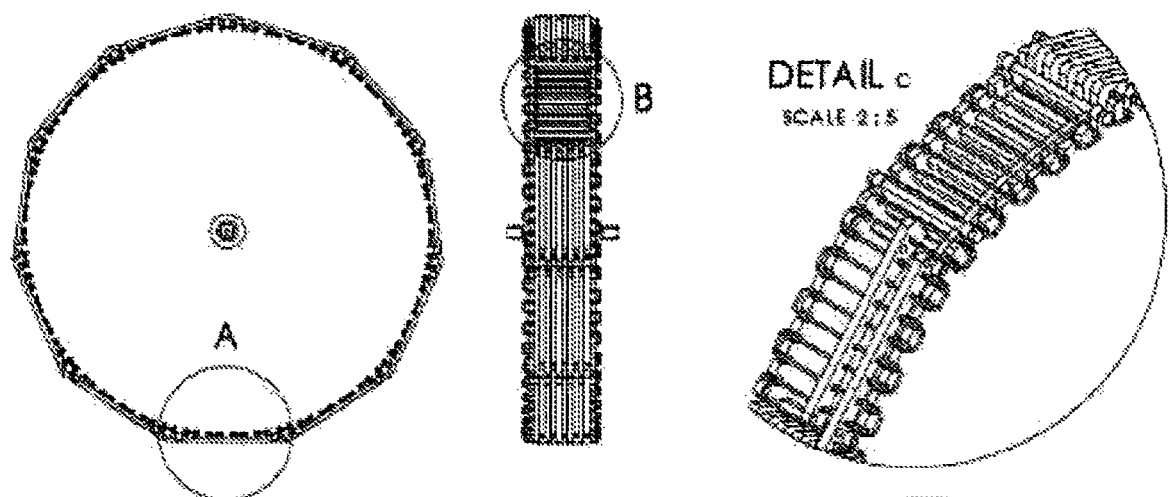
*Fig. 11M*
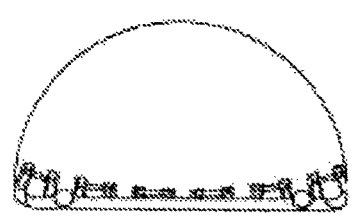
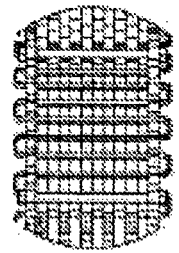
DETAIL A
SCALE 1:2
DETAIL B
SCALE 2:5
*Fig. 11K*    *Fig. 11L*

Undercut rectangle backing metal

What retains ?   How

Slip over washer

Chained curved pieces?

Retrofit of existing alternator in existing vehicles

US 12,407,198 B1

ELECTRIC MOTOR, GENERATOR AND BATTERY COMBINATION AND APPLICATIONS

This application claims the benefit of PPA Ser. Nr 63/172,606 filed 8 Apr. 2021 and PPA Ser. Nr 63/183,039 filed 2 May 2021, and PPA Ser. Nr 63/291,394 filed 18 Dec. 2021 by the present Inventor. These and all other extrinsic references referenced herein are incorporated by reference in their entirety.

FIELD OF THE INVENTION

The field of the invention is electric generators.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Stationary or mobile bike systems that generate electricity are desirable but difficult to realize due to the limitations of human motive power and the relative size and dimensions of bikes. For example, the average bike size does not work because it is too small. There are noise and efficiency losses due to the limited size, and they lack cooling fans. Those skilled in the art have struggled to scale up or create larger bike systems because the weight of the system increases prohibitively with increase of size based on known systems and methods. For example, previous attempts to create generator bicycles include US Patent Publications US20030073546A1 and US20100090475A1, and US Patent Nos. U.S. Pat. No. 6,717,280B1 and U.S. Pat. No. 6,229,224B1, each showing characteristics that fail to reach the nonobvious improvements the invention described herein.

Thus, there remains a need for practical systems, methods, and devices to generate electricity from bike or pedaled apparatus of a reduced weight and offering cooling, entertainment, productivity, and health benefits in addition to power generation.

SUMMARY OF THE INVENTION

Systems, methods, and devices for generating electricity are disclosed. An electric generator includes a drum with a first and a second side. A number of stator poles (e.g., 10, 20, 30, 50, 60, 100, or more, etc.) are disposed at an edge of each side wall. A conductor is disposed about (e.g., wound, wrapped, etc.) the of stator poles, preferably most or all of the stator poles. An axle passes through the first and second side walls, preferably toward or at the center of the side wall.

A first and a second plate is disposed within the drum and coupled to the axle such that the first and second plates rotate with the axle. A plurality of magnets (e.g., 10, 20, 30, 40, 50, 80, or more than 100, etc.) are disposed between an edge of the first and second plates. It should be appreciated that the plates and the drum share an axis, and that the plates are smaller in diameter than the side walls or drum. Preferably, the drum and the plates are sized and dimensioned such that an edge of the plate (and magnets disposed there) are within 1, 2, 3, 4, 5, or 6 inches from an edge of the side walls (and conductor). A crank is coupled to the axle outside of the drum. Preferably, at least one of the first and second side walls or first and second plates is wood or composed at least 50% of wood, and in preferred embodiments most or all of the framing or structure of the generator is wood.

In some embodiments a foot pedal is coupled to the crank. A first connector spans between the edge of each side wall and is coupled to each side wall. The conductor is typically a copper wire, though a flat strip of copper or other conductive metals or alloys are contemplated. The conductor is electrically coupled to at least one of a battery, an electric motor, an electric outlet, or combinations thereof. A seat is adjustably disposed above the drum, for example coupled to the drum. In some embodiments an electric fan is directed at the seat. A table can also be adjustably disposed above the drum, typically having a base and an upper tier or shelf. It should be appreciated that the seat and table are positioned such that a user (e.g., human) can sit on the seat, reach the crank or pedals coupled to the crank with their feet, and use the table with their hands to manipulate objects on the table.

The crank can be a first crank on one side of the drum, with a second crank coupled to the axle on the other side of the drum. Preferably a pedal or pedals are coupled to the first and second cranks. A second connector spans between the edge of each plate and is coupled to each plate. Preferably the seat and the table are composed of wood. The first and second connectors are coupled to each side wall and plate, respectively, via a mated slot and post or plurality thereof.

BRIEF DESCRIPTION OF THE DRAWING

FIG. 2E Detail A is a view of interlocks below table top riders right.

FIG. 2E Detail B is a view of interlocks below table top riders left.

FIG. 2E Detail C is a view of interlocks bottom riders right.

FIG. 2E Detail D is a view of interlocks bottom of fan area riders right.

FIG. 2E Detail E is a view of interlocks bottom of fan area riders left.

FIGS. 2Y through 2SS are views of a basic Seat ver2.1 and parts layout.

FIG. 2TT is a view of a Basic Seat ver2.1 partially lowered onto bike, without final piece of seat layer.

FIG. 2UU is a view of a Basic Seat ver2.1 fully lowered onto bike, with final piece of seat layer.

FIG. 2VV and 2WW are views of a Basic Seat ver2.2 parts layout.

FIG. 2XX is a view of a Basic Seat ver2.2, front view, partially lowered onto bike, with final piece of seat layer.

FIG. 2YY is a view of a Basic Seat ver2.2, back view, partially lowered onto bike, with final piece of seat layer.

FIG. 2AAA is a drawing of long banana seat with slot for prostate relief.

FIG. 2BBB is a cutaway transparent view of a long banana seat construction method.

FIG. 2CCC is an exploded view of a long banana seat construction method.

FIG. 2DDD is a view of a spring seat on bike example.

FIG. 2EEE is a view of a side of small stool.

FIG. 2FFF is a large stool drawing next to bike.

FIG. 2GGG is a large stool drawing with some measurements.

FIGS. 2HHH through 2KKK are views of a large stool pieces.

FIG. 2LLL is a view of a Treadmill, Schematic arrangement of Treadmill no shields shown.

FIG. 2MMM is a view of a Roadgoing Boxray style bicycle.

FIG. 2NNN is a view of a Roadgoing Generator Moped.

FIG. 2OOO is a view of an electric bicycle for propulsion and regeneration, or a roadgoing bicycle that is also a stationary or rolling electrical generator using principles in the referenced applications.

FIG. 11K is a Longitudinal Laminations side view.

FIG. 11L is a Longitudinal Laminations top view with interlocking.

FIG. 11M is a Longitudinal Laminations partially constructed ¾ view showing interlocking.

FIG. 14E is a view of a switch box with labels as an implementation of the switches shown in the schematic of FIG. 14D, where the switch box is located over the fan.

FIG. 15 is a view of architecture in motorized device or vehicle.

FIG. 16 is a ¾ view example where the stack of laminates which forms the cap of the motor stator has powergroups.

FIG. 17 is a side view of 2d laminations that add the functions of holding the powergroups and providing cooling surface area.

FIG. 18 is a view of functions in the long hood of a vehicle with solarcells that feed the powergroups.

FIG. 19 is a view of an example of a very long hood vehicle to allow more solar power generation.

FIG. 20 is a view of how a cooling propeller could function on the motor generator shaft in a vehicle.

FIG. 21 is a view of how a cooling propeller could function on the motor generator shaft in a vehicle.

FIG. 22 is a modification schematic of classic automotive alternator.

FIG. 23 is a view of the addition of 2 types of large capacitors to the power group. A supercapacitor and a conventional capacitor.

FIG. 24 shows example calculations.

FIG. 25 is a view of the super capacitor and the Lipo A123 separated by separate windings on the same pole.

Figure 26:
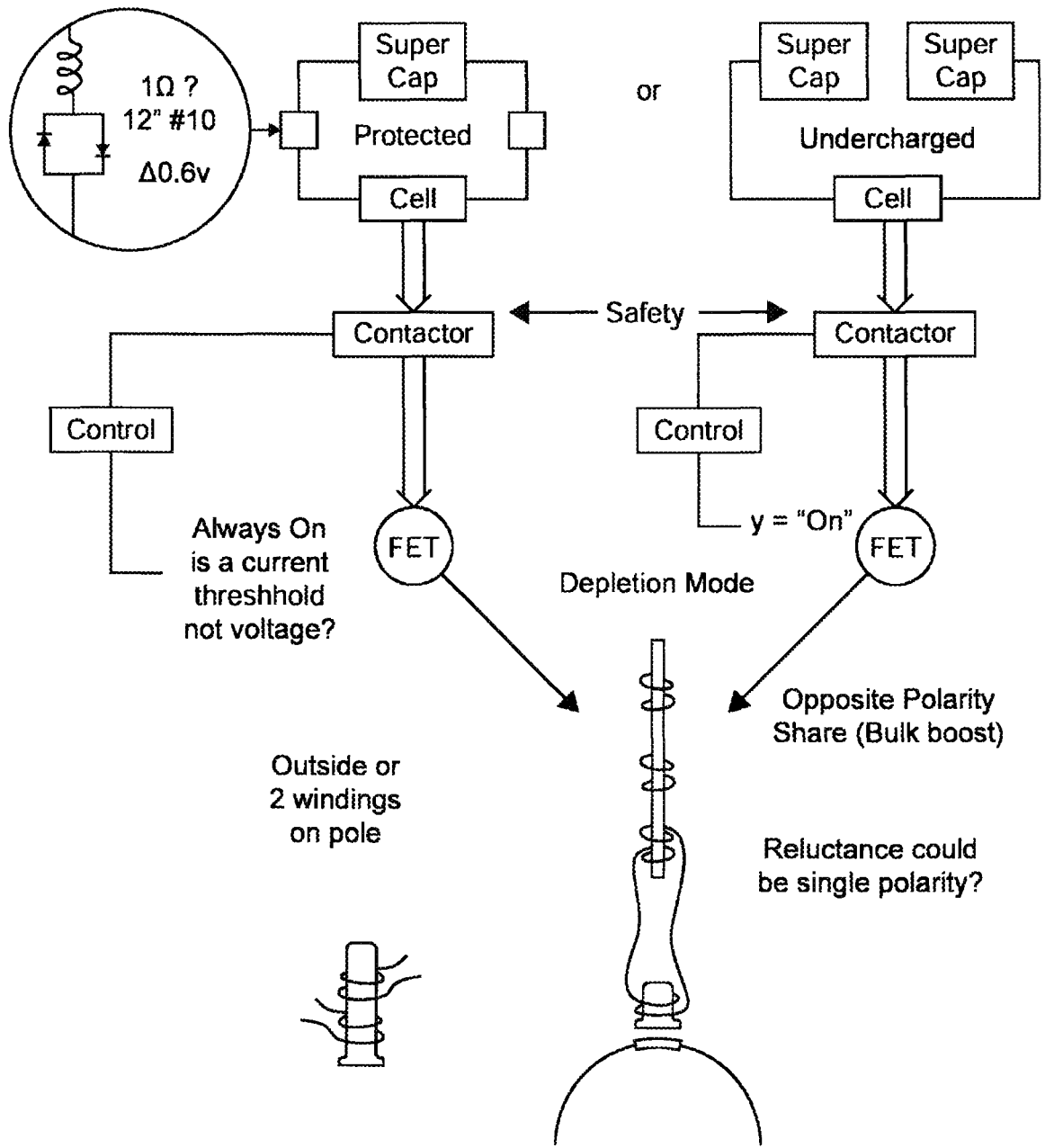

FIG. 26 shows using the separate windings in other ways.

Figure 27:
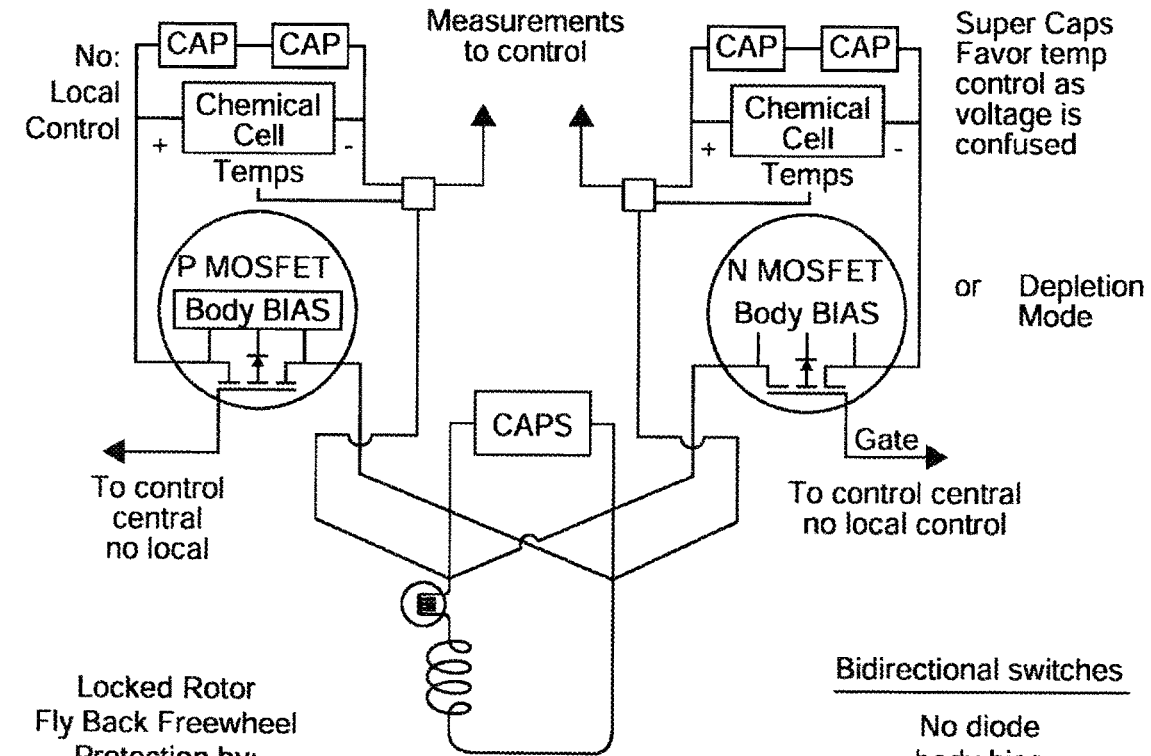

FIG. 27 shows variations of the theme of FIG. 26.

Figure 28:
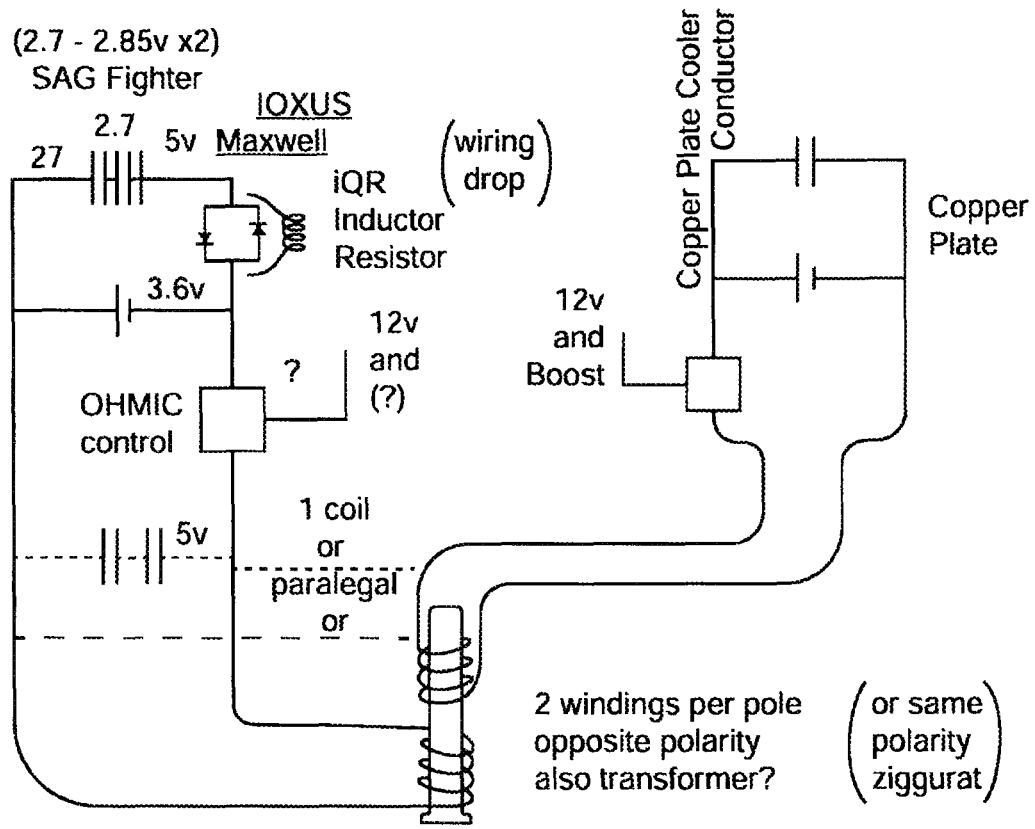

FIG. 28 shows variations of the theme of FIG. 26.

Figure 29A:
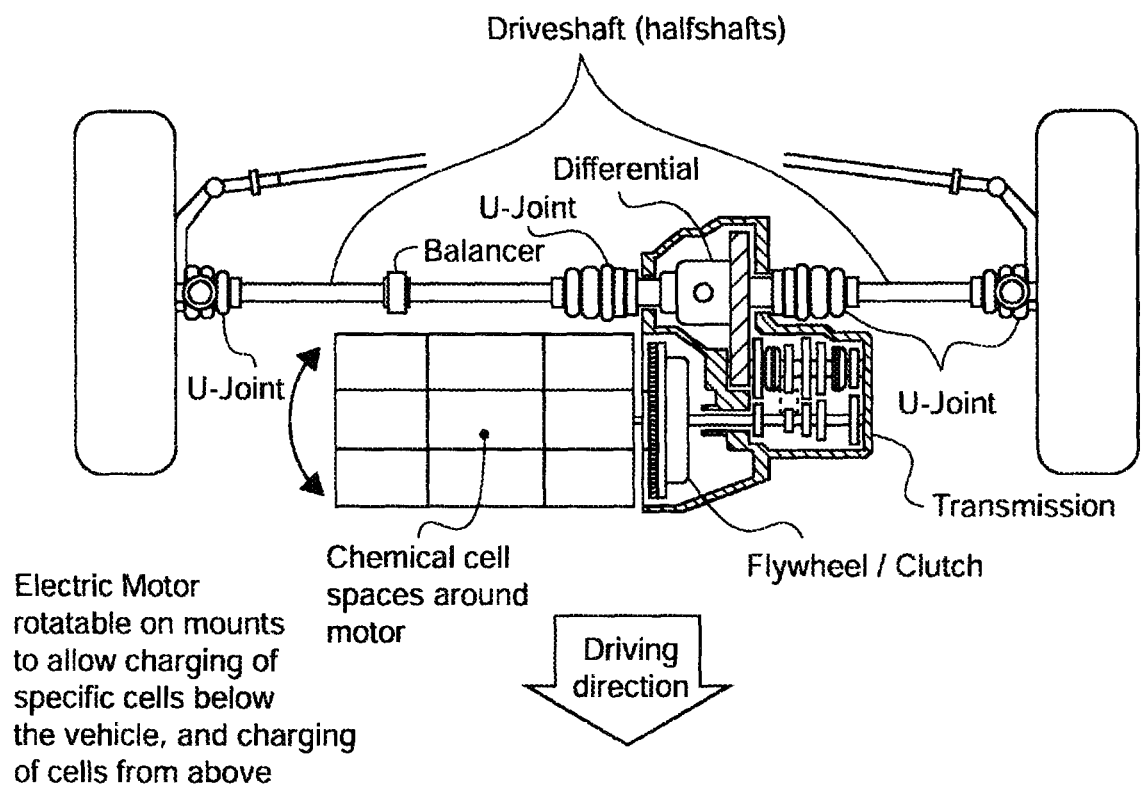

FIG. 29A is a view from above of: (i) a motor that rotates in its mounts to allow dumping of burning cells below, or (ii) rapid changing of cells by hand from above in the engine bay under the hood, mounted to the transmission of vehicles in a size similar existing ICE (internal combustion engines).

Figure 29B:
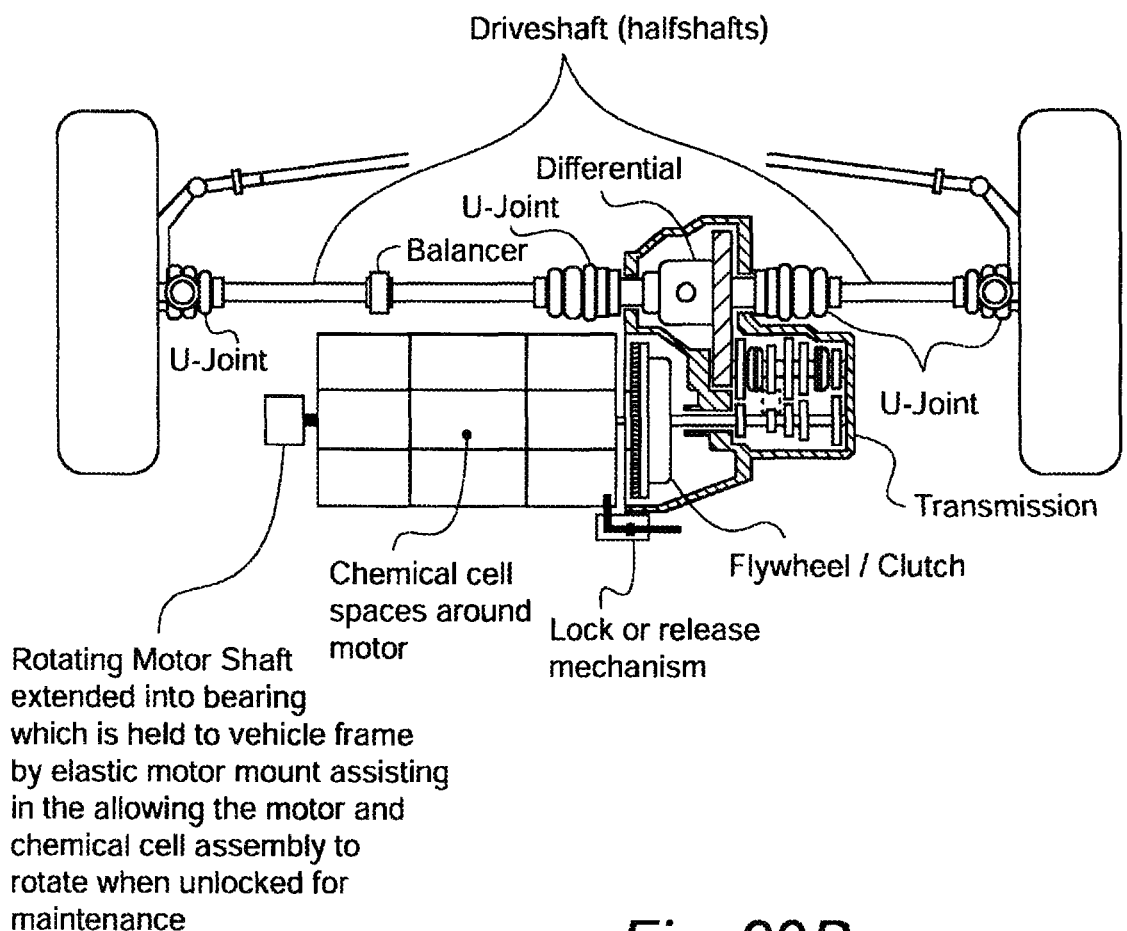

FIG. 29B shows drawing details of external shaft bearing in motor mount, lever lock.

Figure 29C:
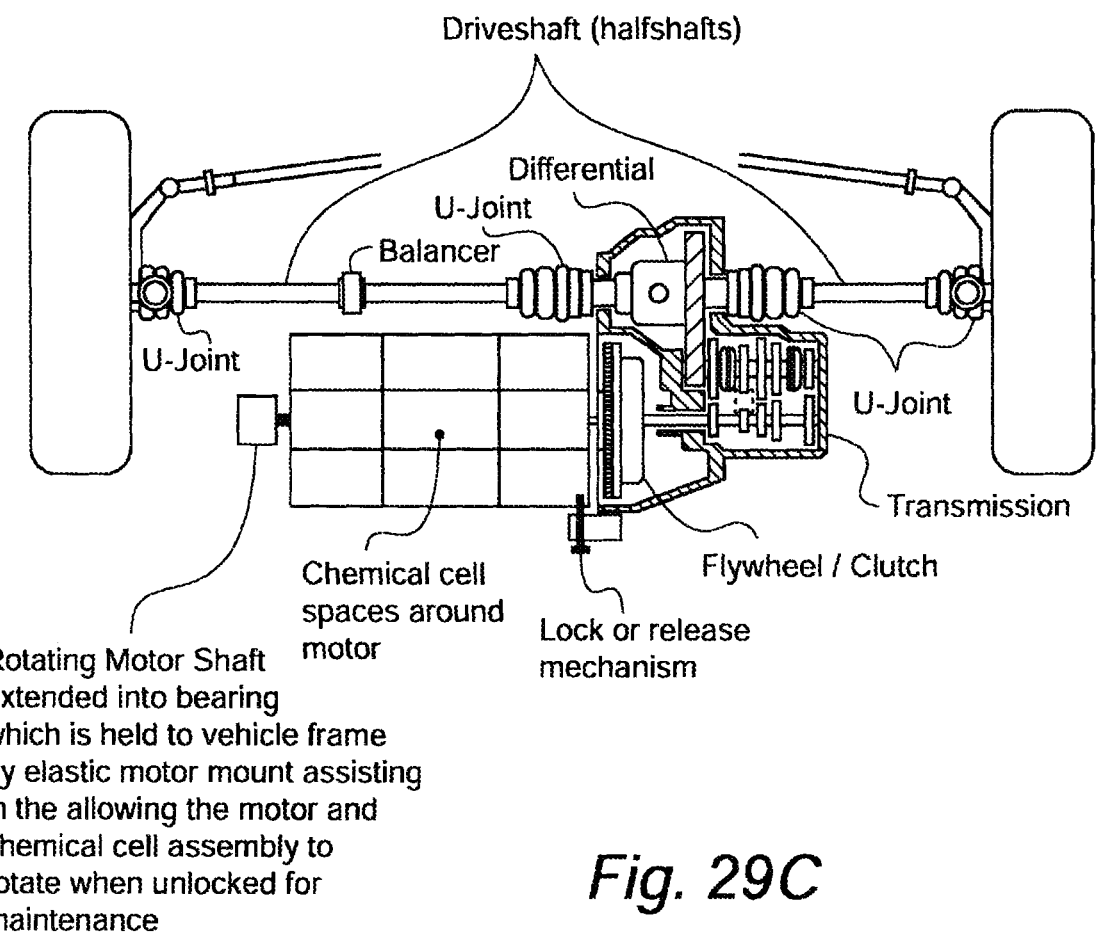

FIG. 29C shows drawing details of external shaft bearing in motor mount, pin lock.

Figure 29D:
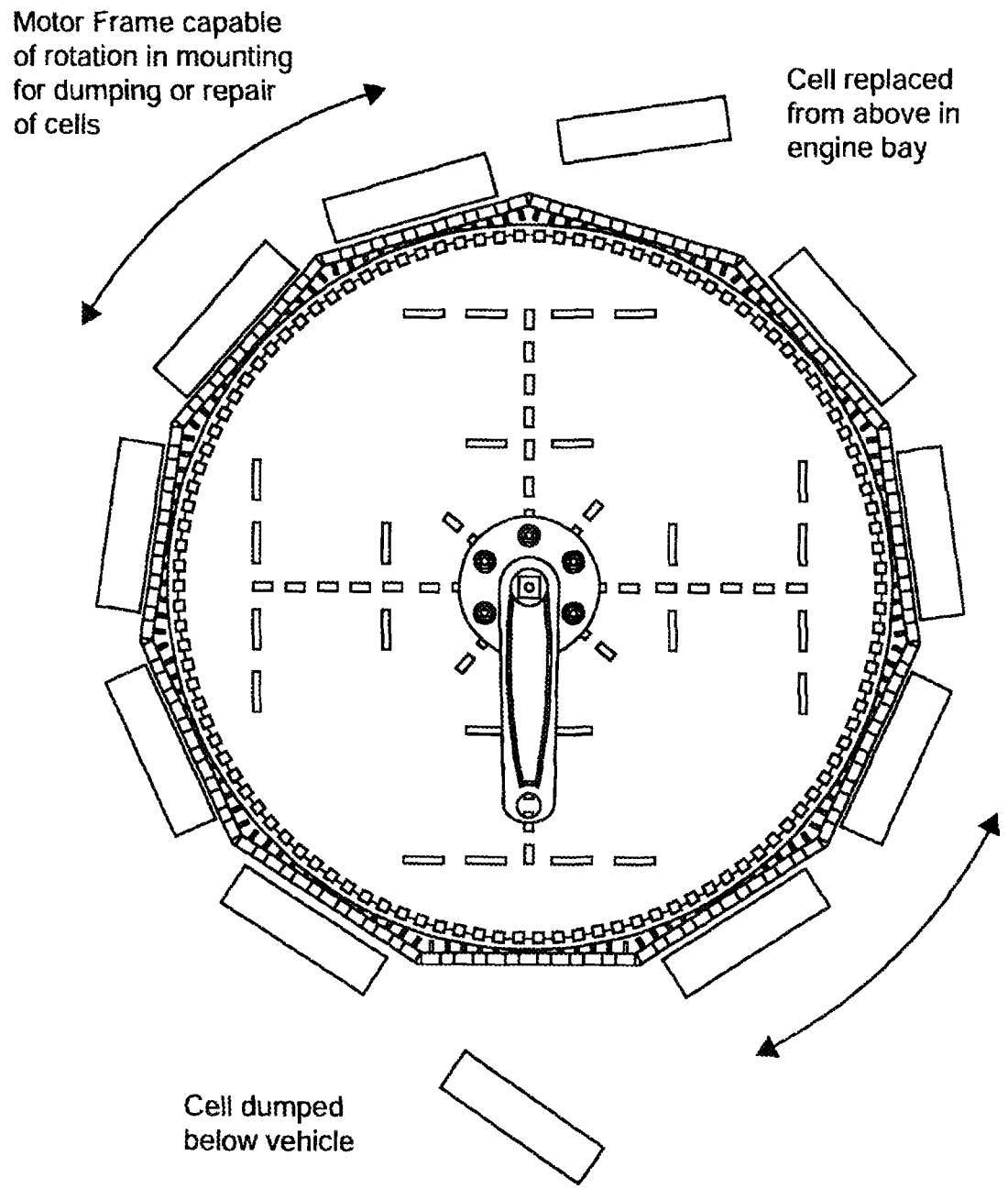

FIG. 29D is a view from the side of: (i) a motor that rotates in its mounts to allow dumping of burning cells below, or (ii) or rapid changing of cells by hand from above in the engine bay under the hood, mounted to the transmission of vehicles in a size similar existing ICE engines.

DETAILED DESCRIPTION

Systems, methods, and devices for generating electricity are disclosed. An electric generator includes a drum with a first and a second side. A number of stator poles (e.g., 10, 20, 30, 50, 60, 100, or more, etc.) are disposed at an edge of each side wall. A conductor is disposed about (e.g., wound, wrapped, etc.) the stator poles, preferably most or all of the stator poles. An axle passes through the first and second side walls, preferably toward or at the center of the side wall.

Disclosed as related applications and Integrated into this disclosure by specific reference to previous applications by the same inventor are:

Generators 2-dimensionally cut from flat stock materiel, Application No. U.S. Ser. No. 14/479,313, claiming priority to 2013-09-06 to provisional patent application no. U.S. 61/874,370, now patented as U.S. Pat. No. 9,583,989B2.

Electric Devices, Generators, And Motors, 2018 Jul. 19 publication as US20180205289A1, now patented as U.S. Ser. No. 11/171,533B2, with 2021 Nov. 8 Continuation Application No. U.S. Ser. No. 17/521,667, published as US20220069660A1.

Individual stator pole winding has its own voltage and amperage matched battery, applied for 2014 Sep. 26 as Application No. U.S. Ser. No. 14/497,347, no patented as U.S. Ser. No. 10/988,030B2, with 2021 Apr. 26 Continuation Application No. U.S. Ser. No. 17/240,783, published as US20210309120A1.

DRAWINGS—REFERENCE NUMERALS

Figure 1A:
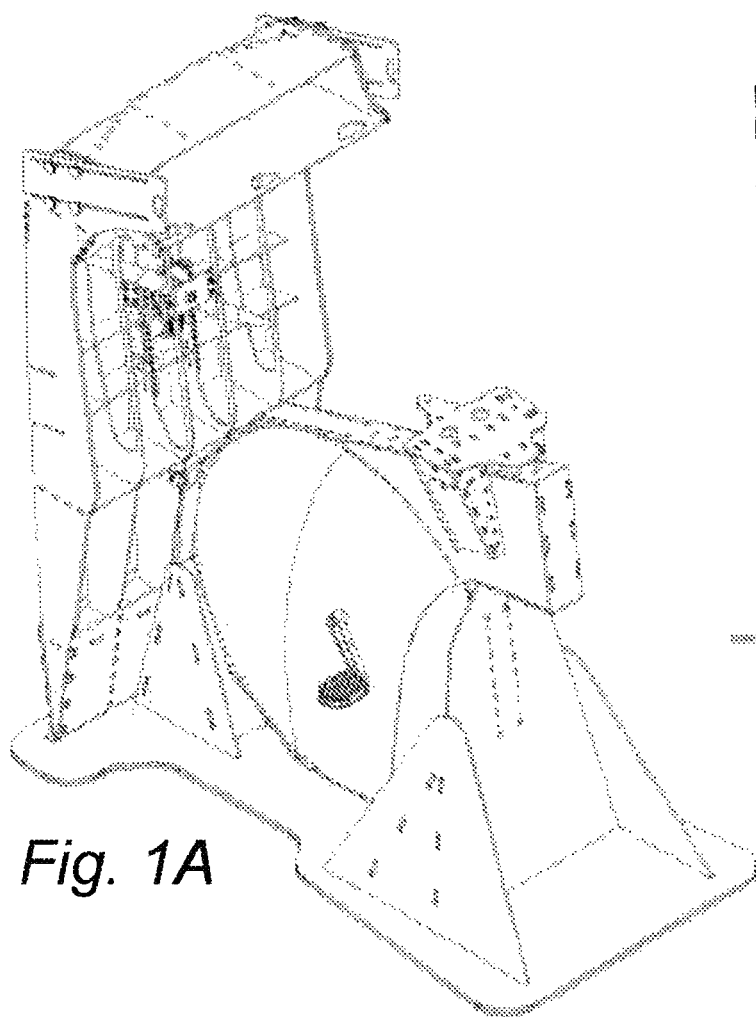
FIG. 1A is a rear side view a bicycle application of the Generator.
Figure 1B:
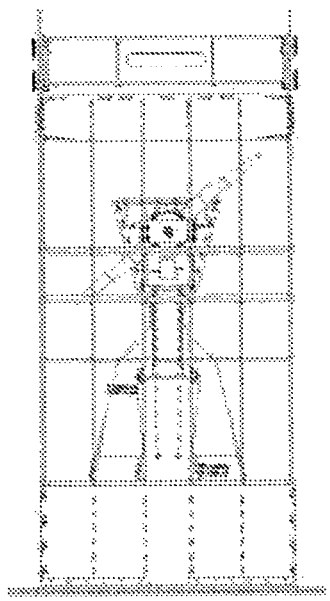
FIG. 1B is a front View a bicycle application of the Generator.
Figure 1C:
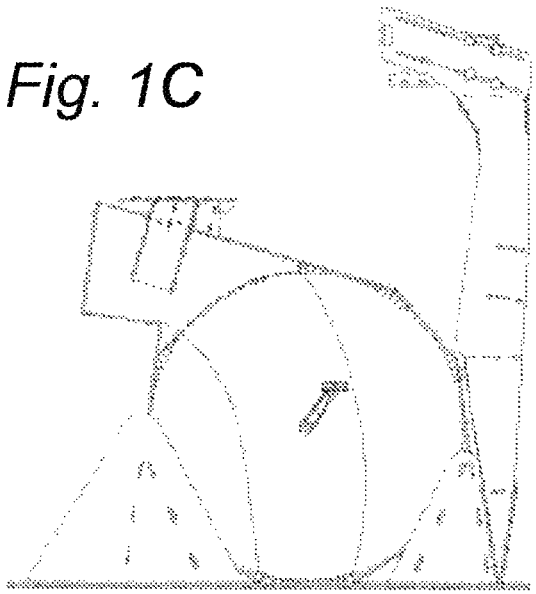
FIG. 1C is a side view of a bicycle application of the generator.
Figure 1D:
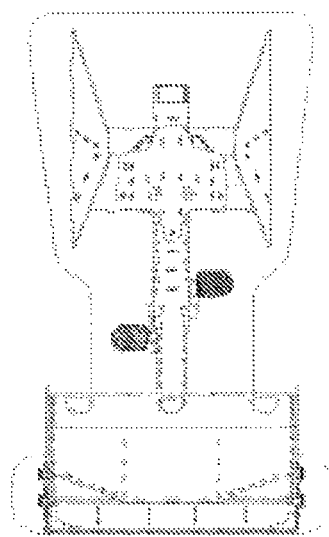
FIG. 1D is a top view of a bicycle application of the generator.
Figure 1E:
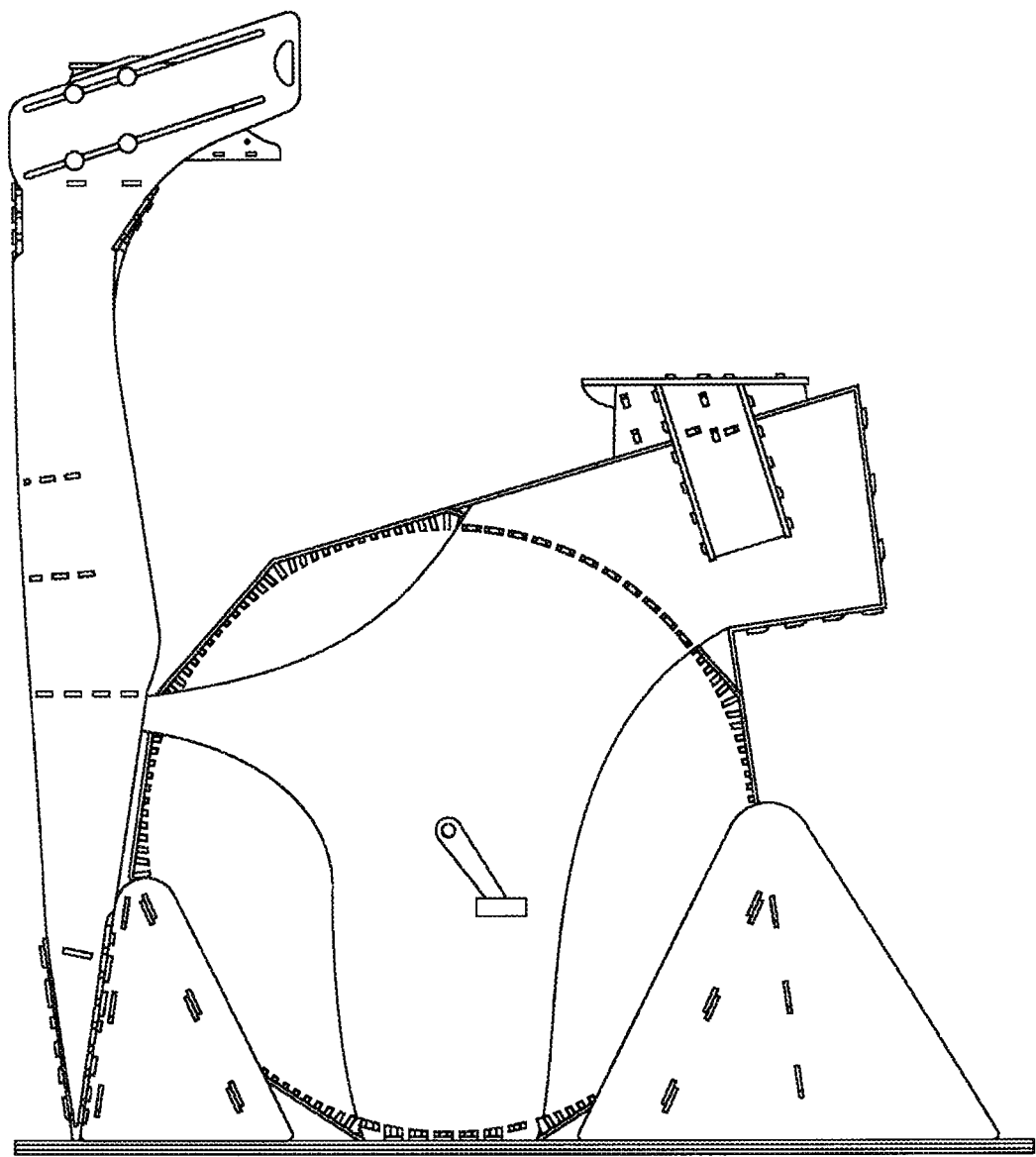
FIG. 1E is a left side view with a bicycle application Fan Desk tilted to be close to a smaller rider.
Figure 1F:
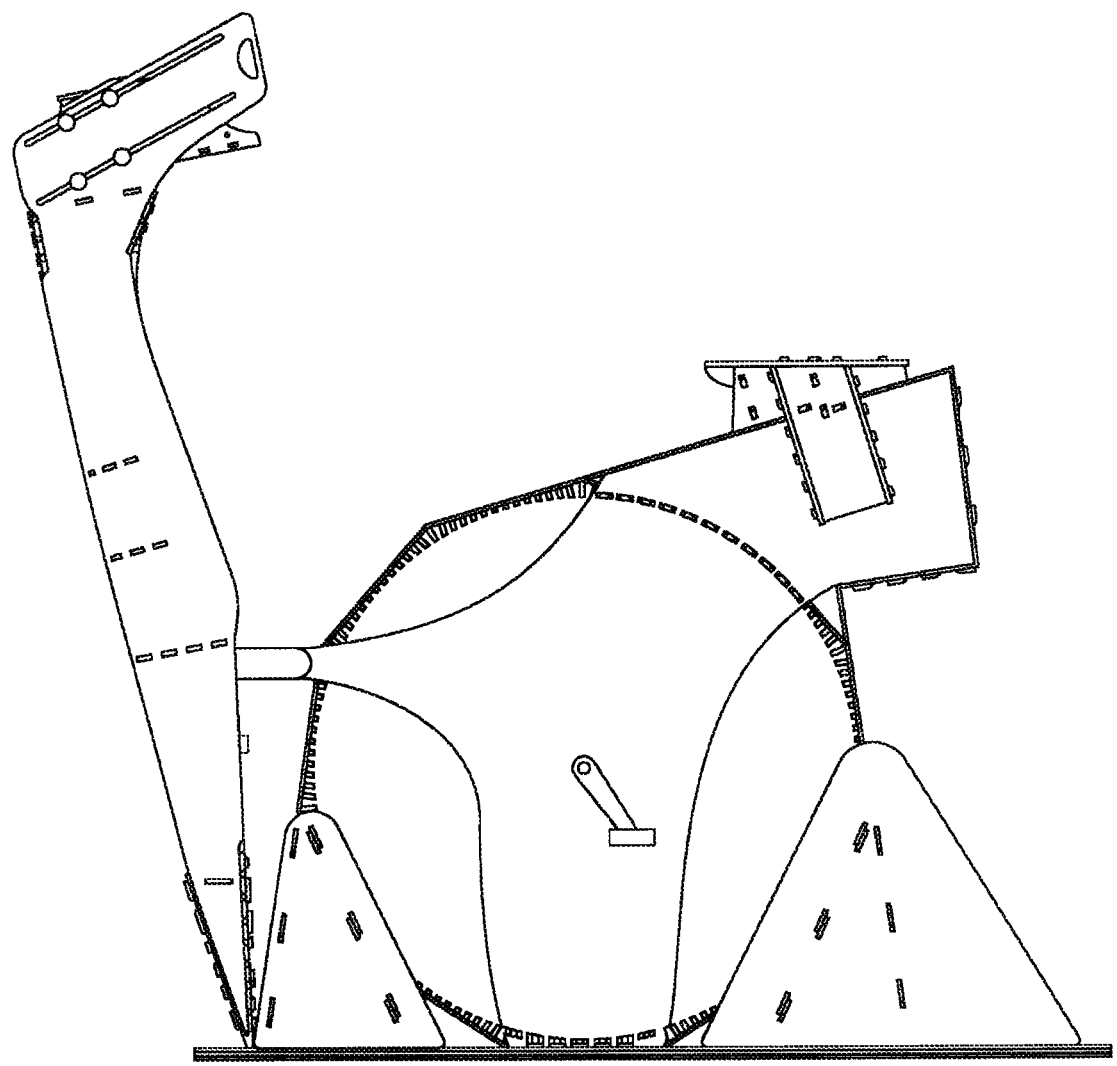
FIG. 1F is a left side view with a bicycle application Fan Desk tilted to be far from the taller the rider.
Figures 1G, 1H:
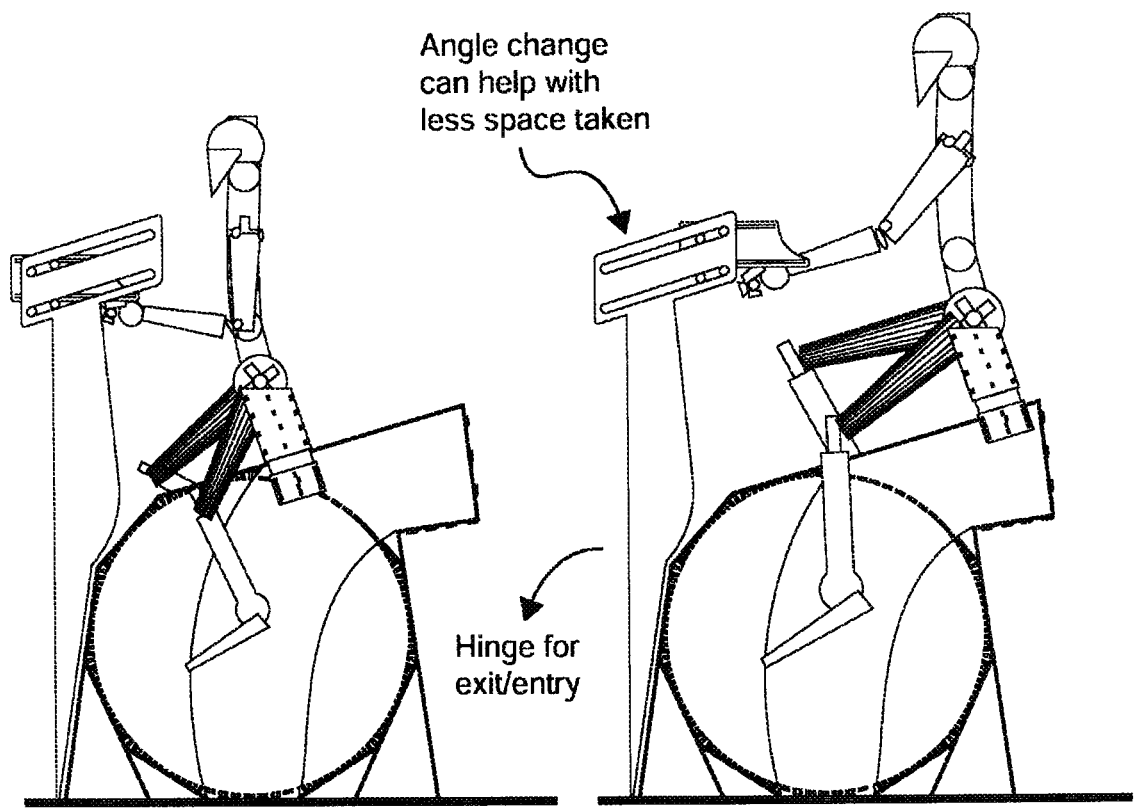
FIG. 1G is a schematic of left Side view a bicycle application of the Generator with rider where Fan Desk is tilted to be near to the smaller rider with the far tilt with seat adjusted far.
FIG. 1H is a schematic of left Side view a bicycle application of the Generator with rider where Fan Desk is tilted to be near to the taller rider with the seat adjusted far forward.
Figure 2A:
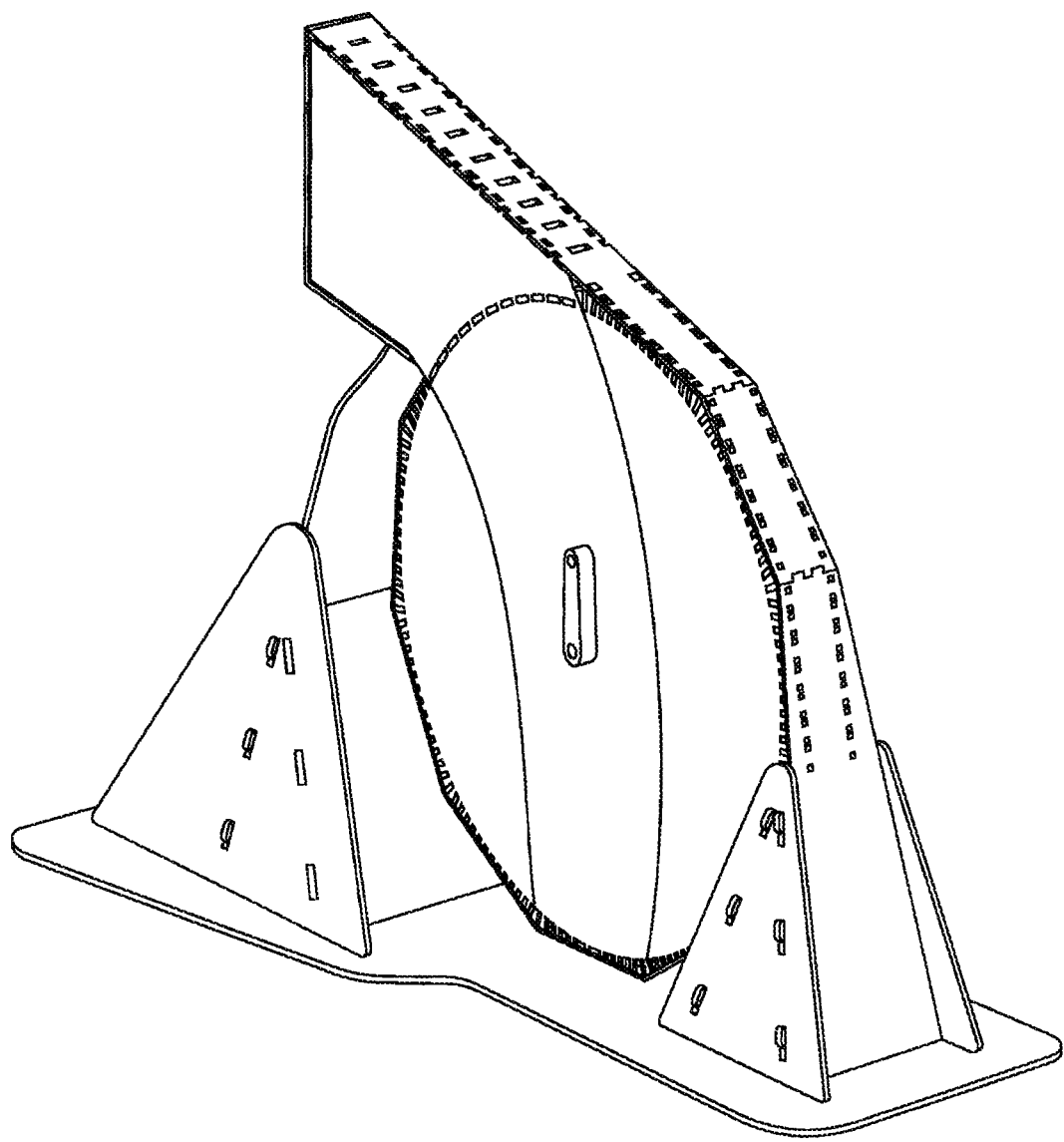
FIG. 2A is a pre explosion group of FIG. 2B of a bicycle application of the Generator main body 50 of the generator.
Figure 2B:
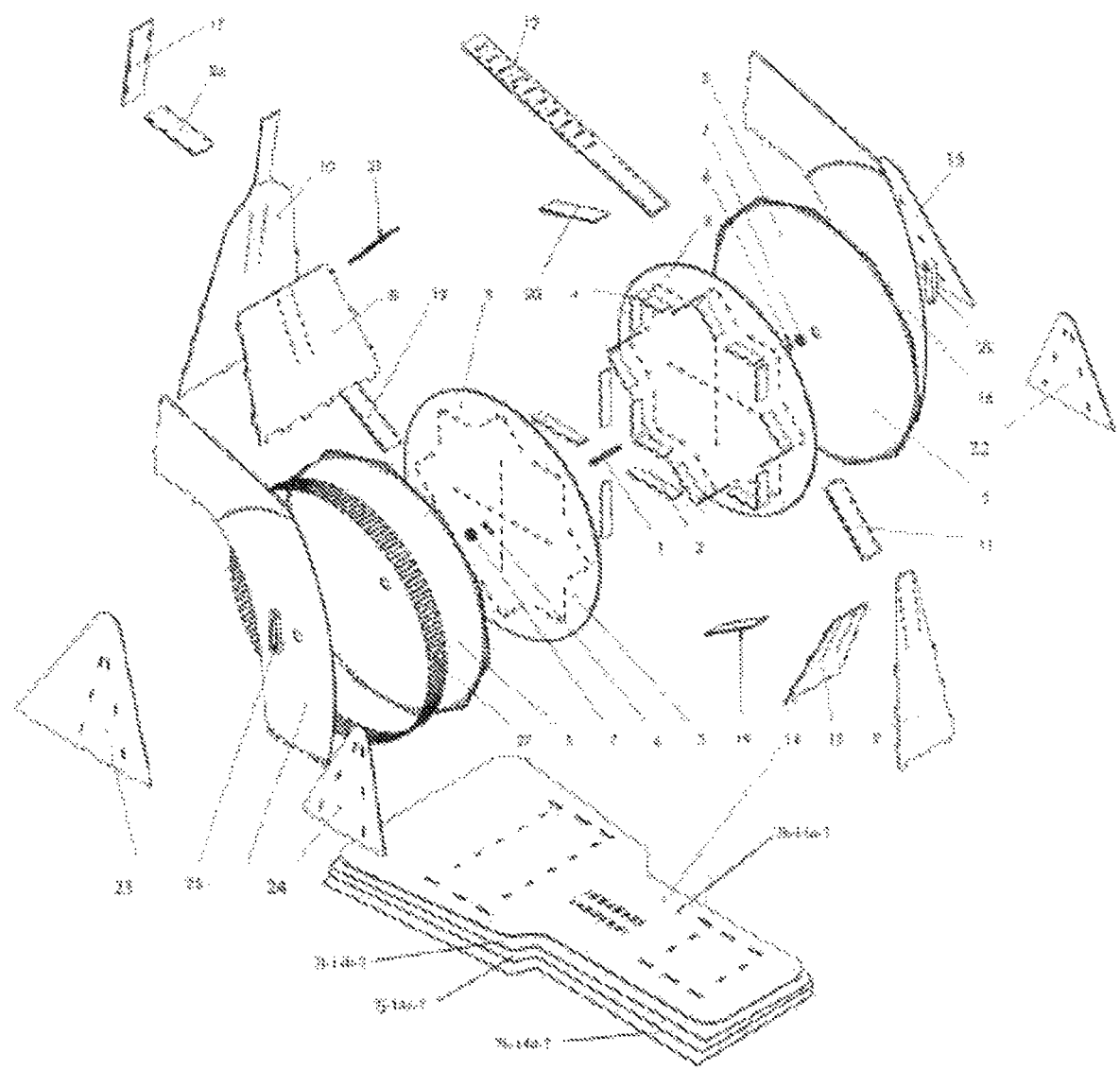
FIG. 2B is a part exploded of a bicycle application of the Generator main body 50 of the generator.
Figure 2C:
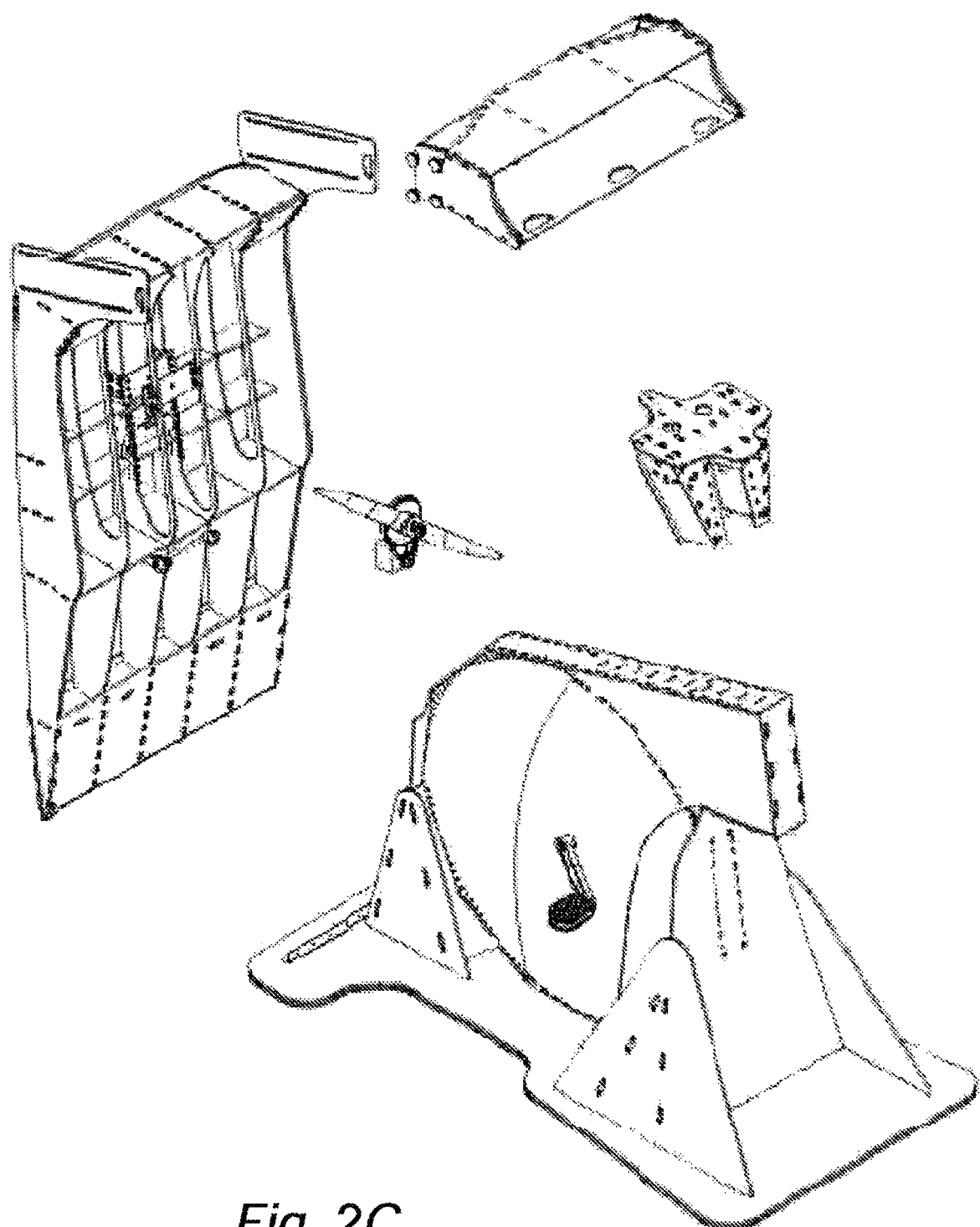
FIG. 2C is a group explosion of Fan Box 70, Table assembly 60, Main Body of Generator 50, Seat assembly 80.
Figure 2D:
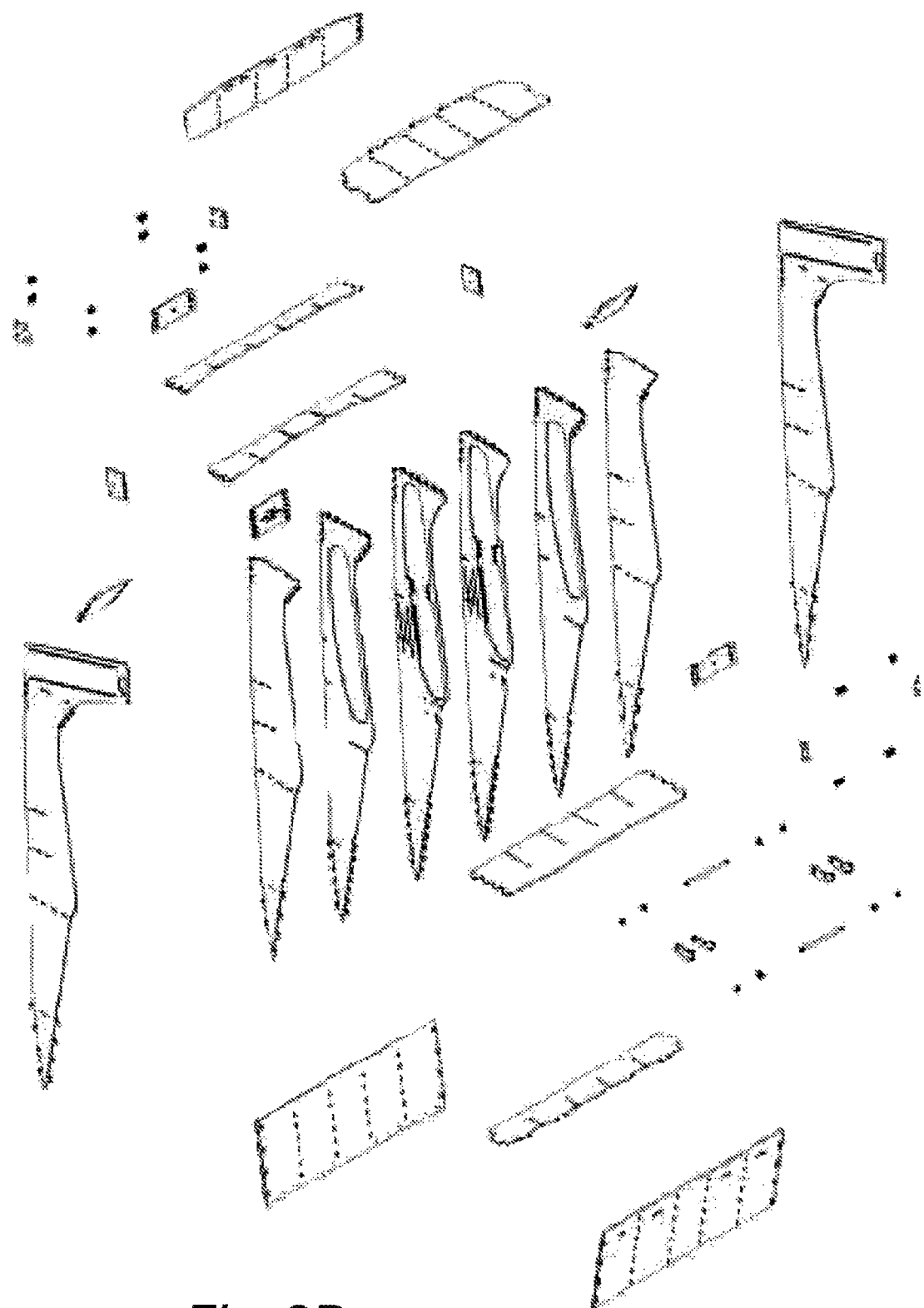
FIG. 2D is an explosion of Fan Box 70.
Figure 2E:
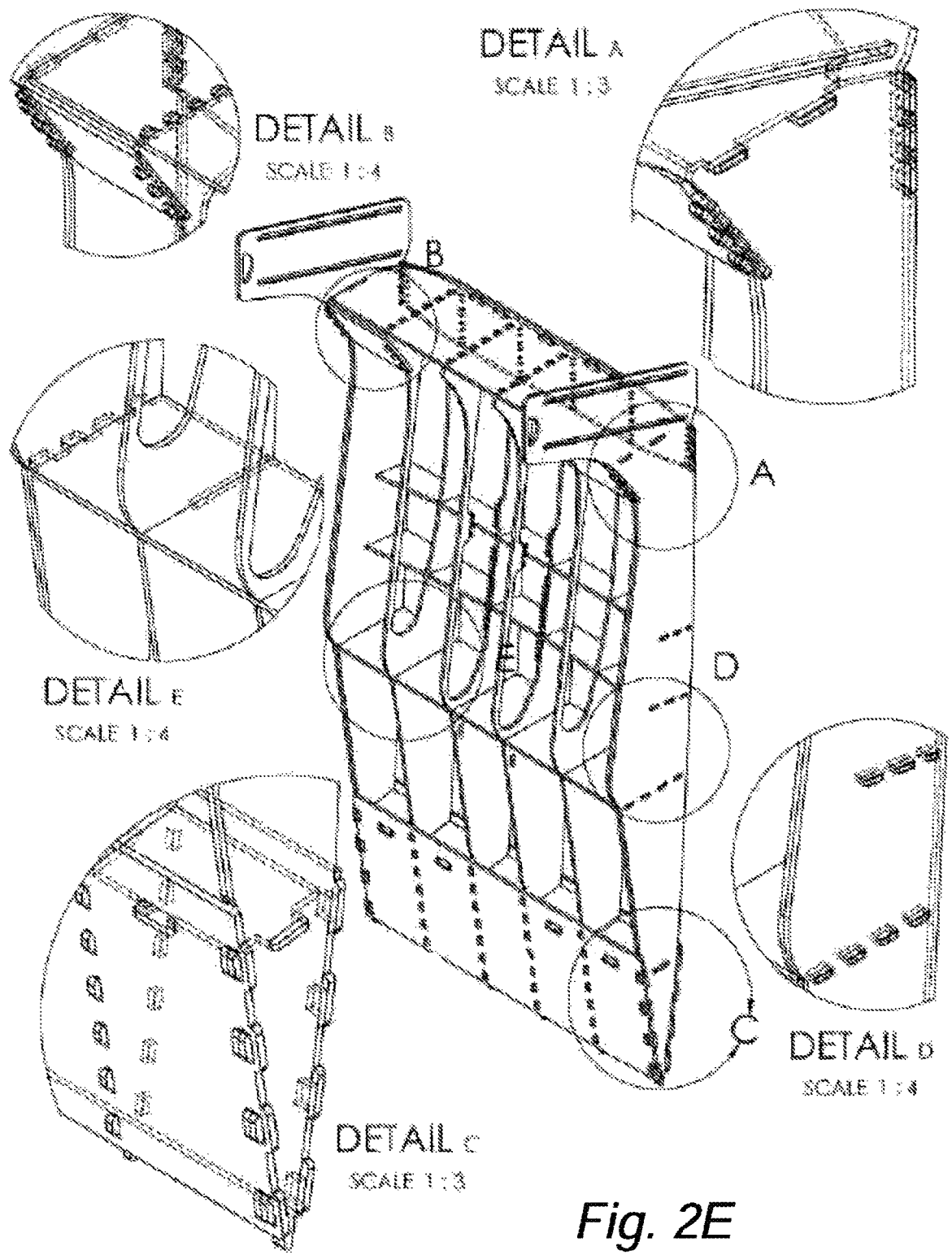
FIG. 2E is a view of fan box structure 70.
Figure 2F:
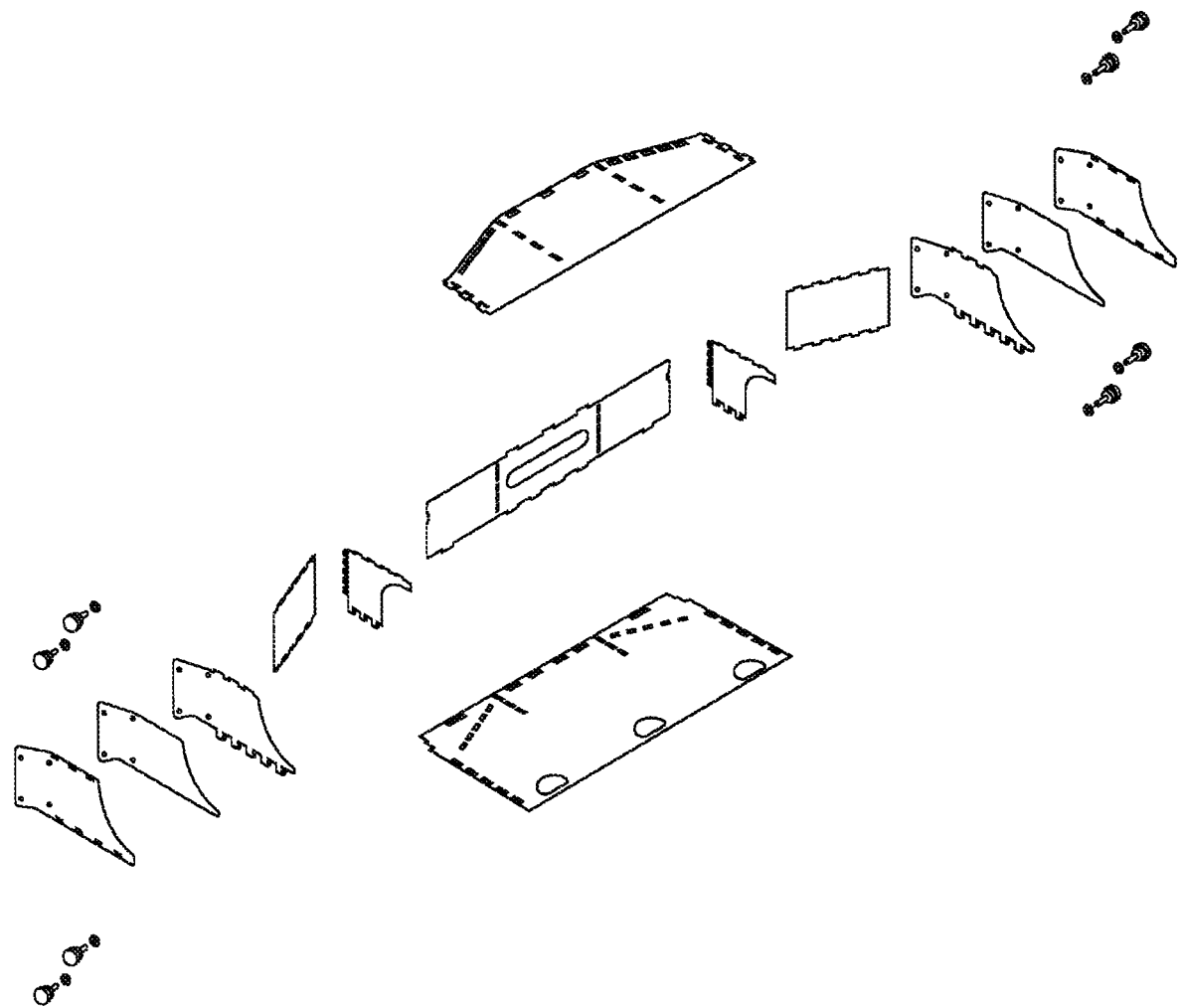
FIG. 2F is a view of an explosion of Table.
Figure 2G:
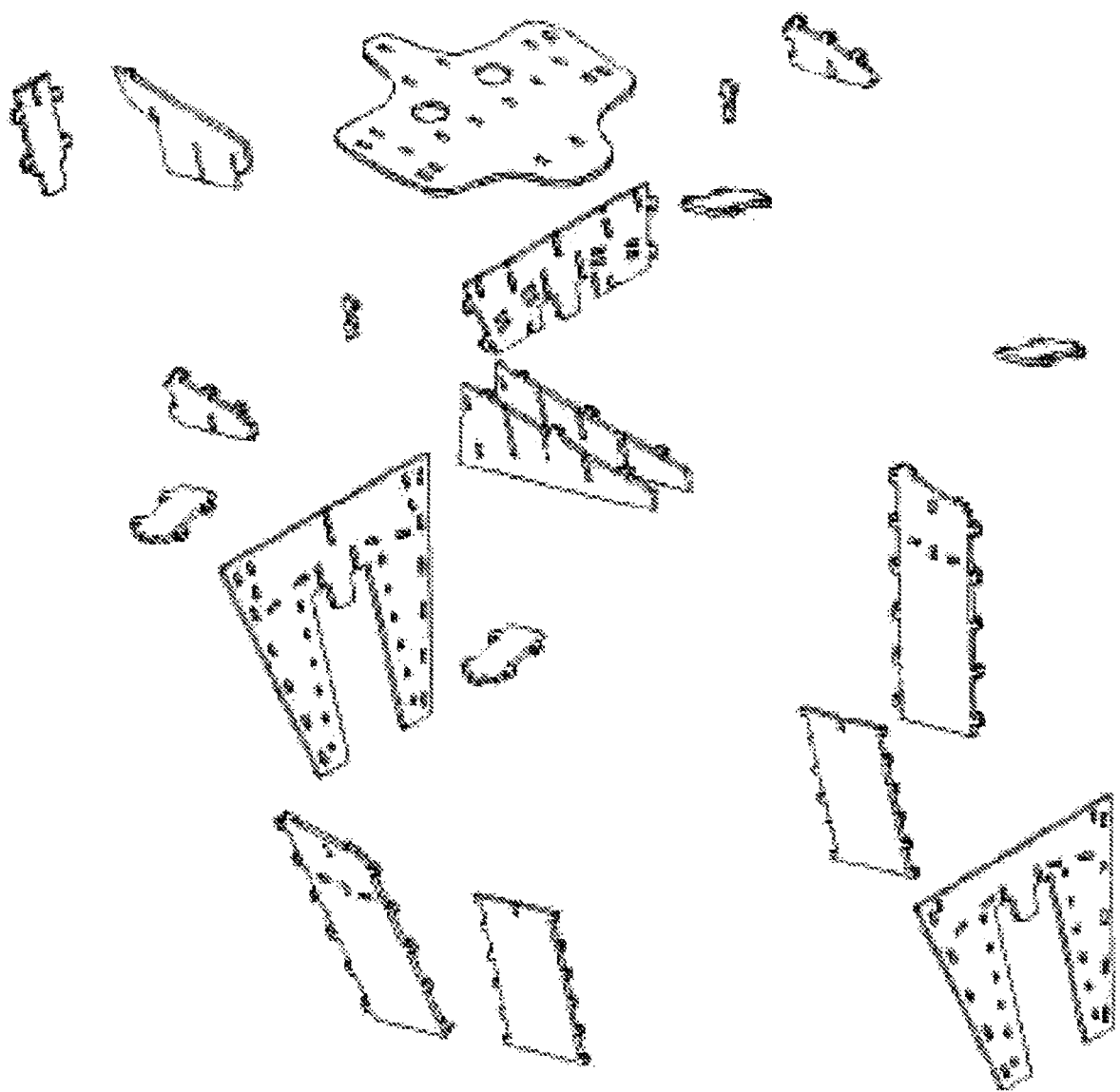
FIG. 2G is an explosion view of seat basic.
Figure 2H:
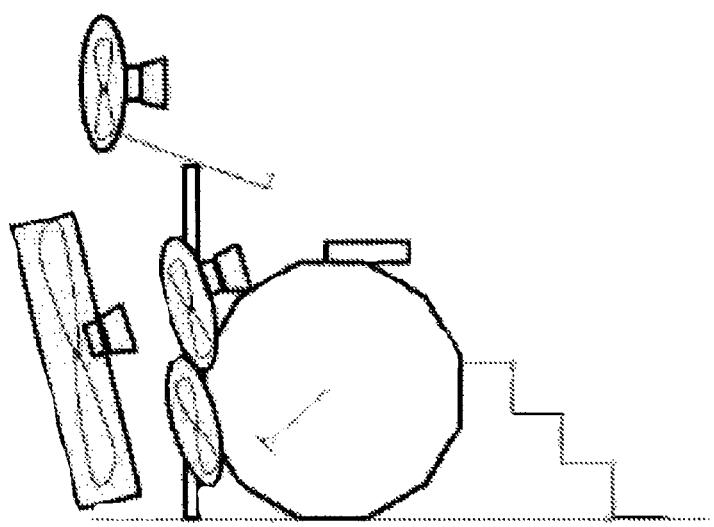
FIG. 2H is a view of an audio speaker in the center of a propeller.
Figure 6A:
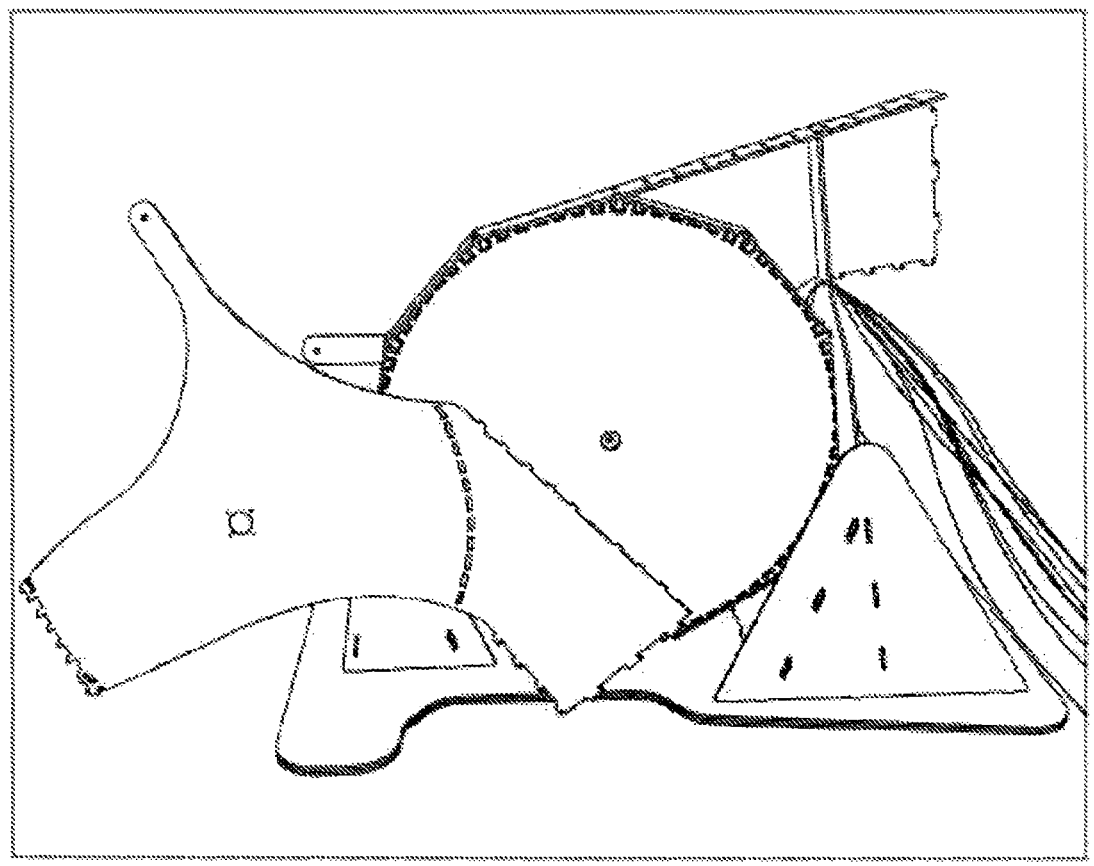
FIG. 6A is a view of partially assembled Photograph with a6e-RL-16b Stator standseat, fan protrusion, 6-RL Box Side Rider's Left.
Figure 6B:
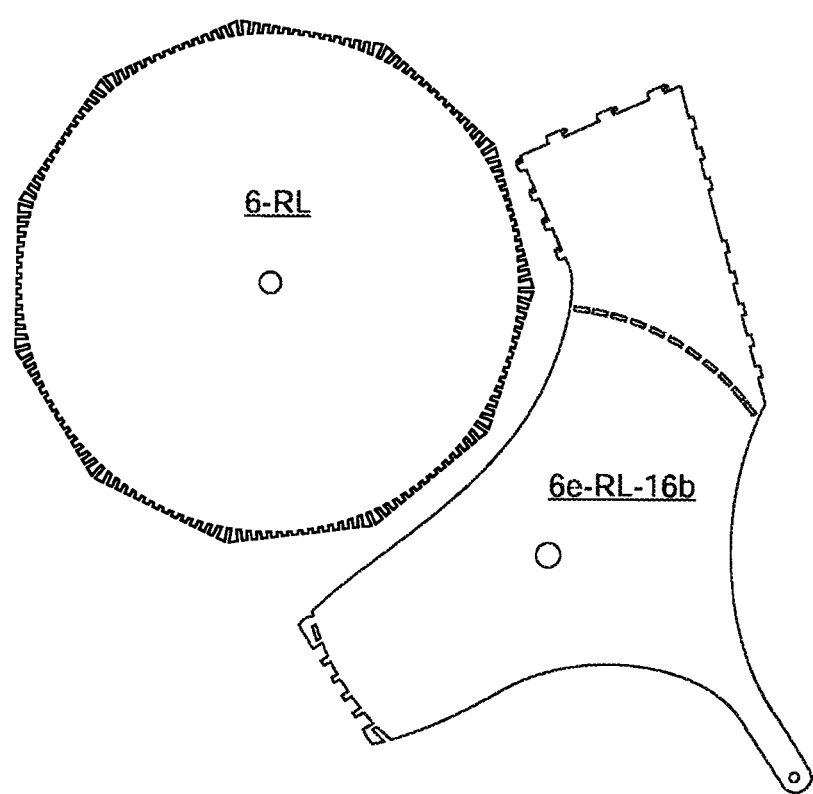
FIG. 6B is a view of 6e-RL-16b Stator standseat, fan protrusion (adjustment of wire cutouts on opposing sides) and 6-RL Box Side Rider's Left.
Figure 6C:
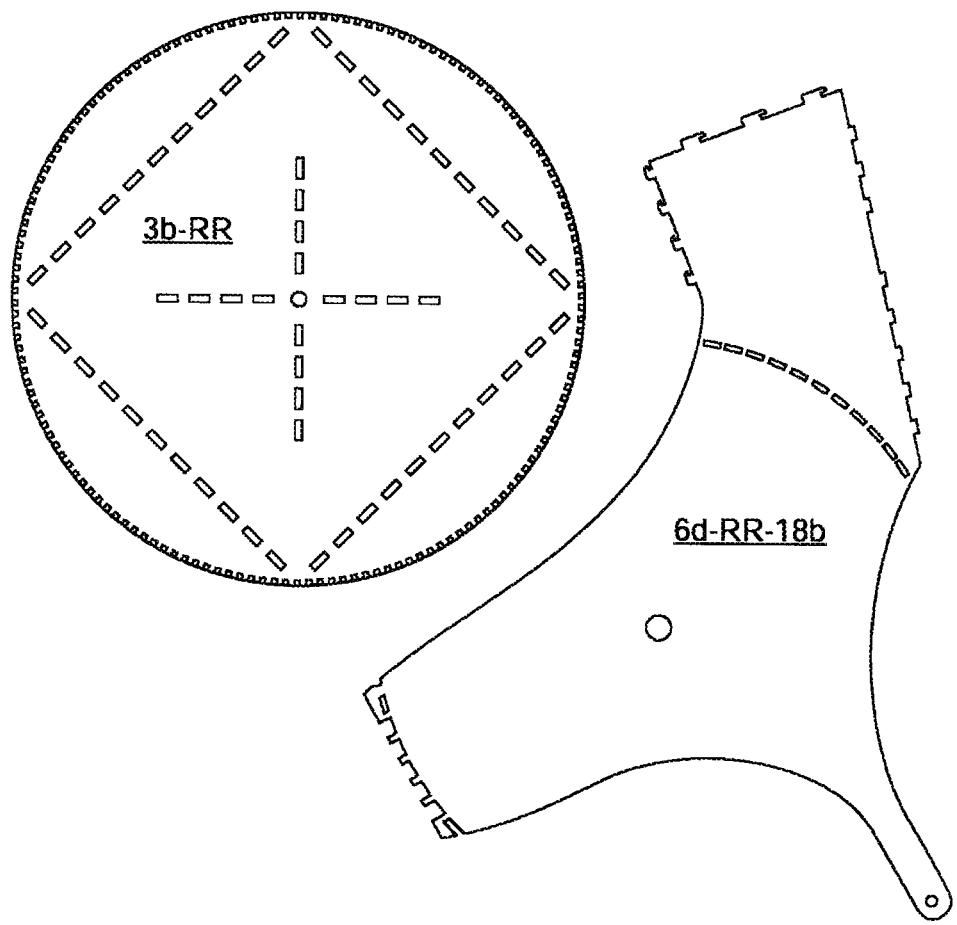
FIG. 6C is a view of 6d-RR-18b Stator standseat, fan protrusion (adjustment of wire cutouts on opposing sides) and 3b-RR.
Figure 6D:
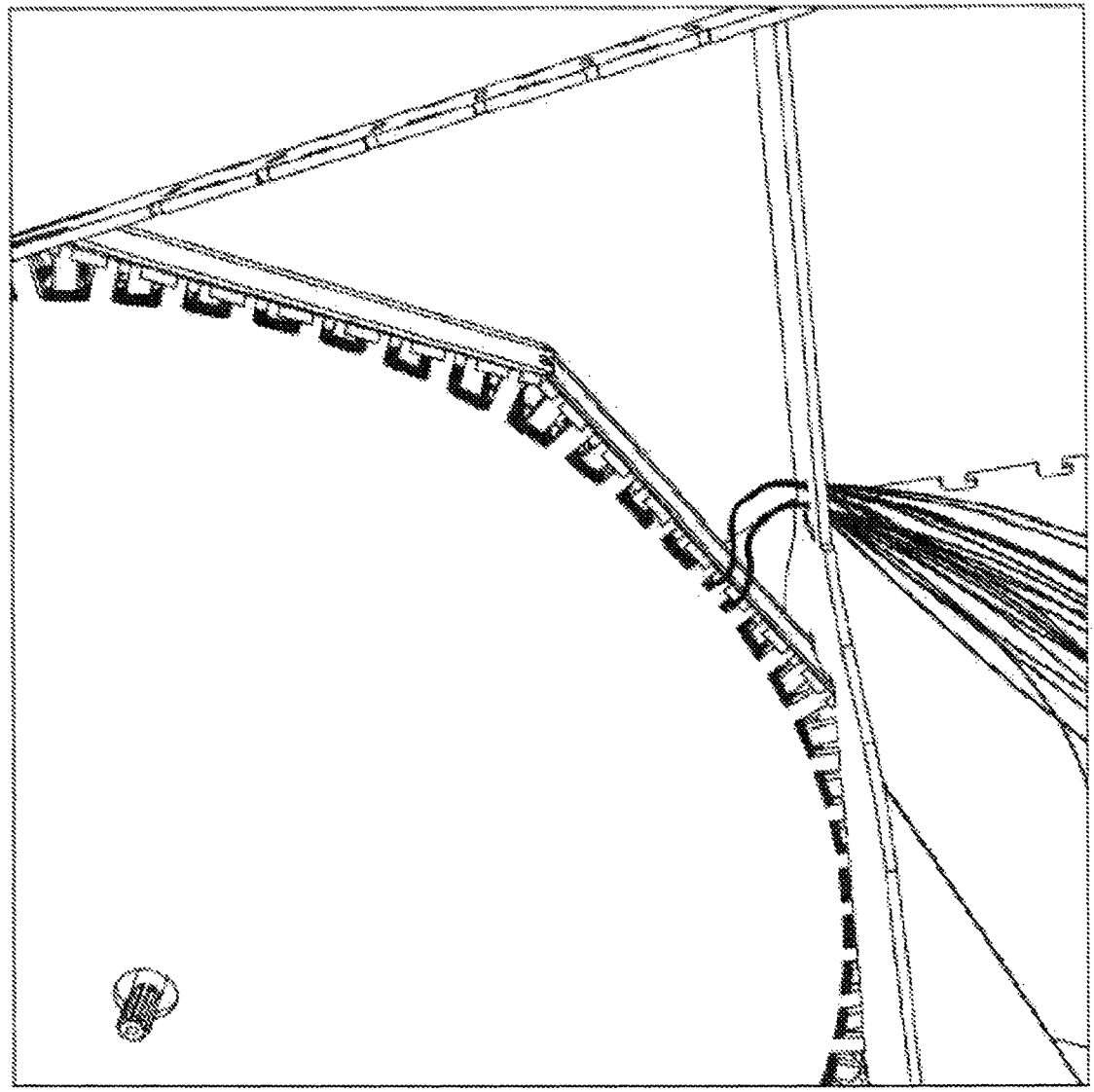
FIG. 6D is a view of detail of an underseat wireing area.
Figure 6E:
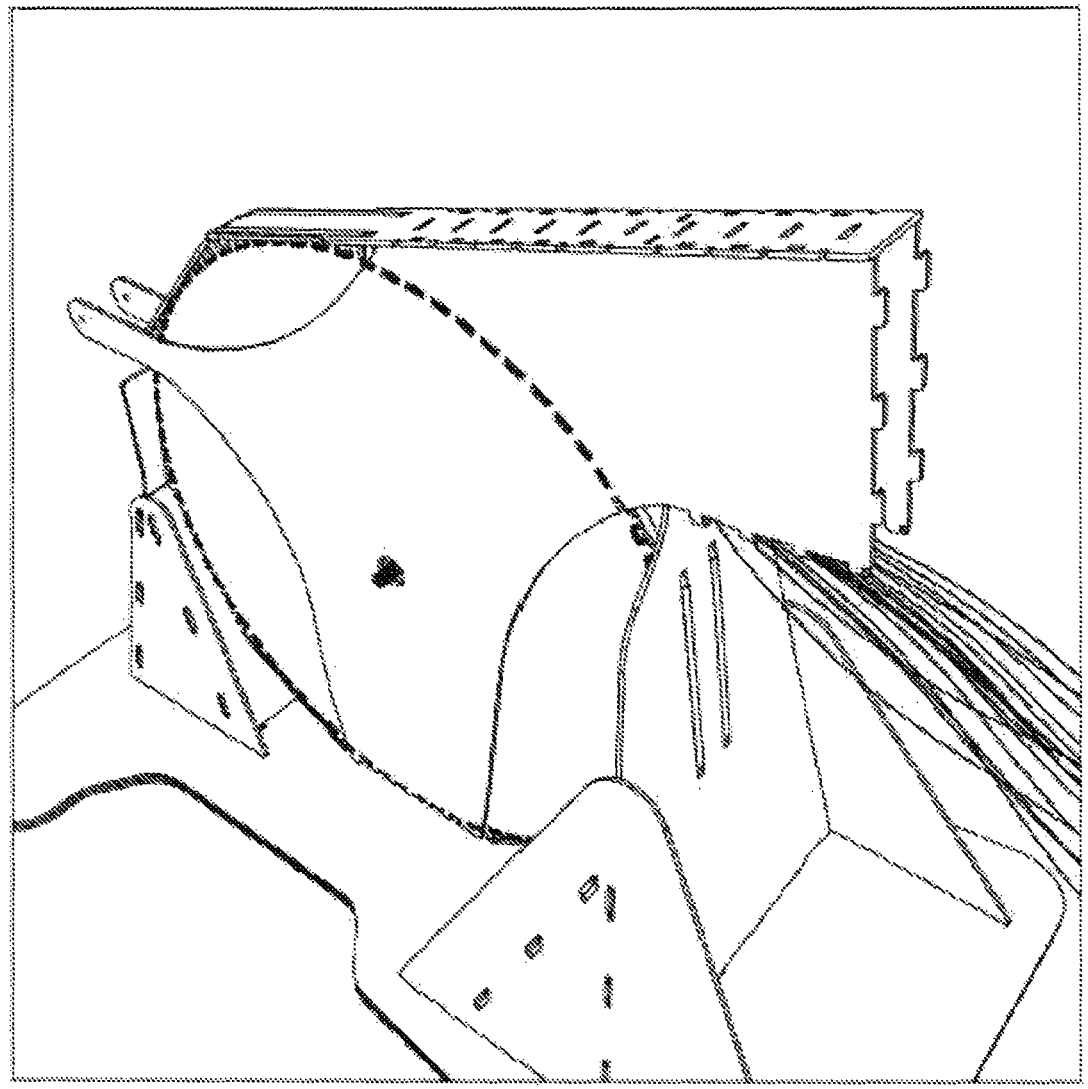
FIG. 6E is a view of 6e-RL-16b in final position.
Figure 6F:
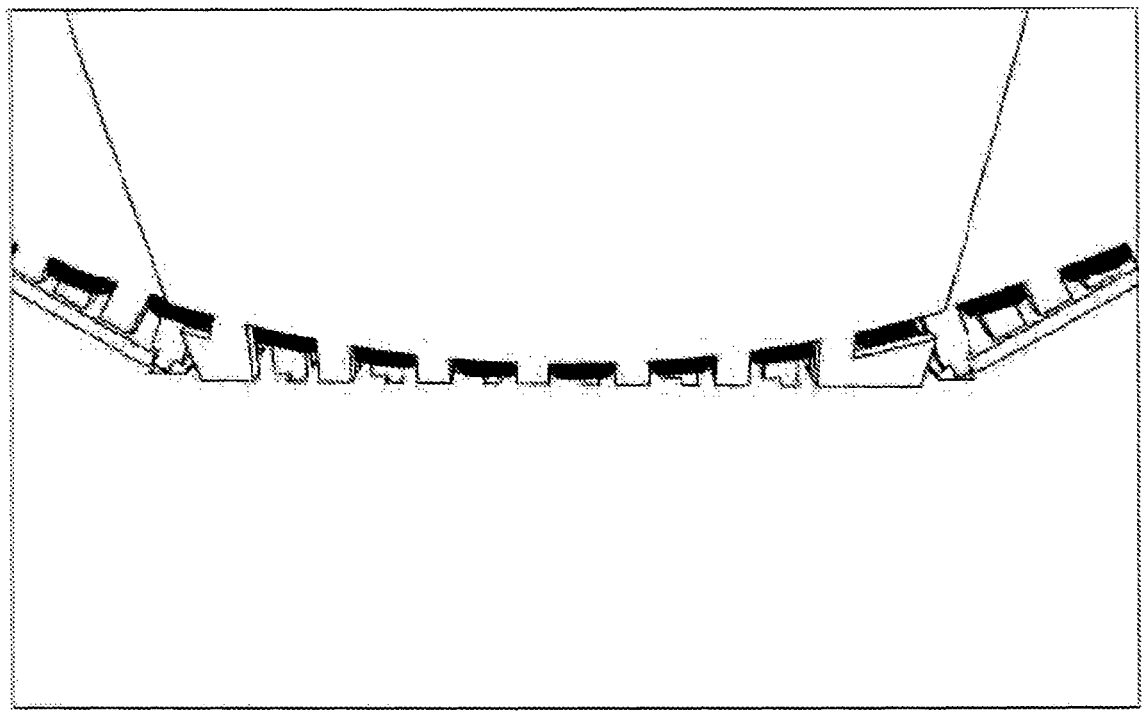
FIG. 6F is a view of 6e-RL-16b lower accommodation slots for 15,15a wires and floor interface.
Figure 6G:
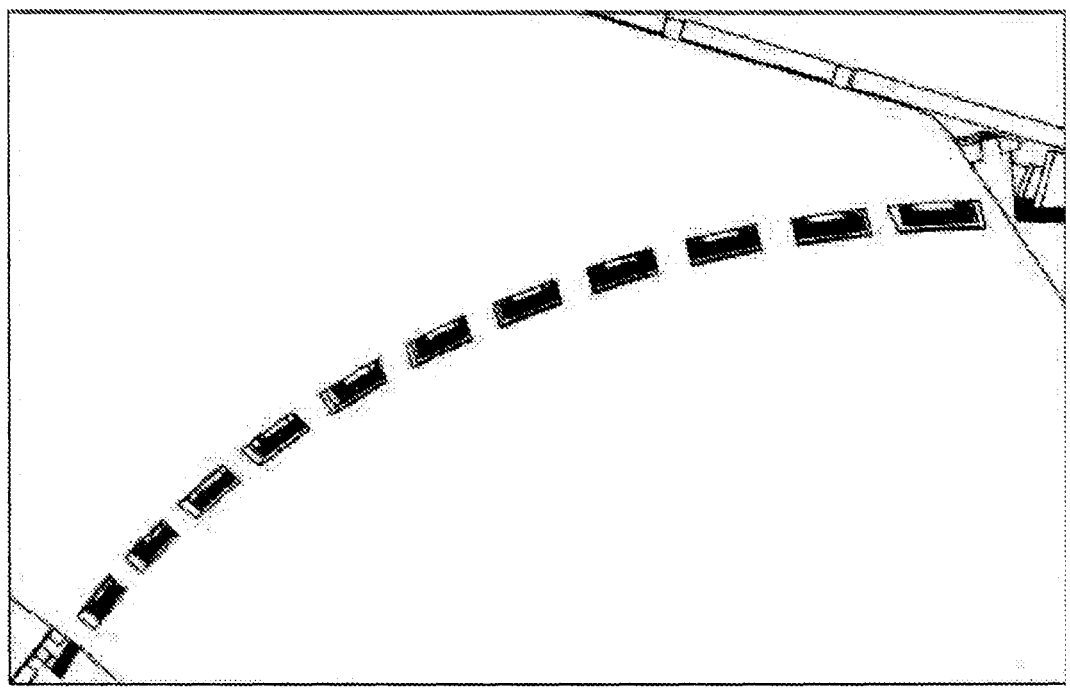
FIG. 6G is a view of 6e-RL-16b upper accommodation slots for 15,15a wires.
Figure 6H:
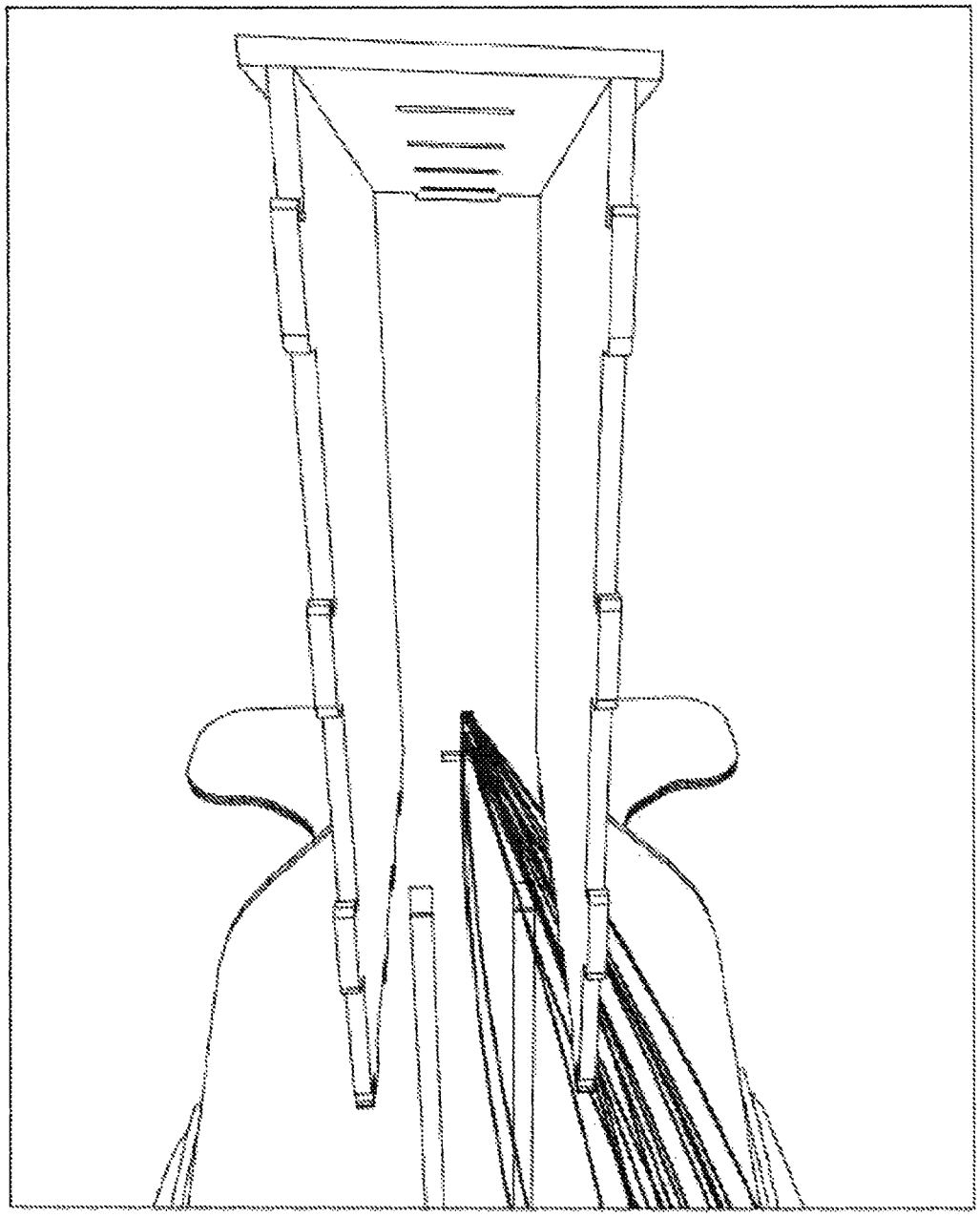
FIG. 6H is a rear view of underseat before closure by 6-26, 6-17.
Figure 6I:
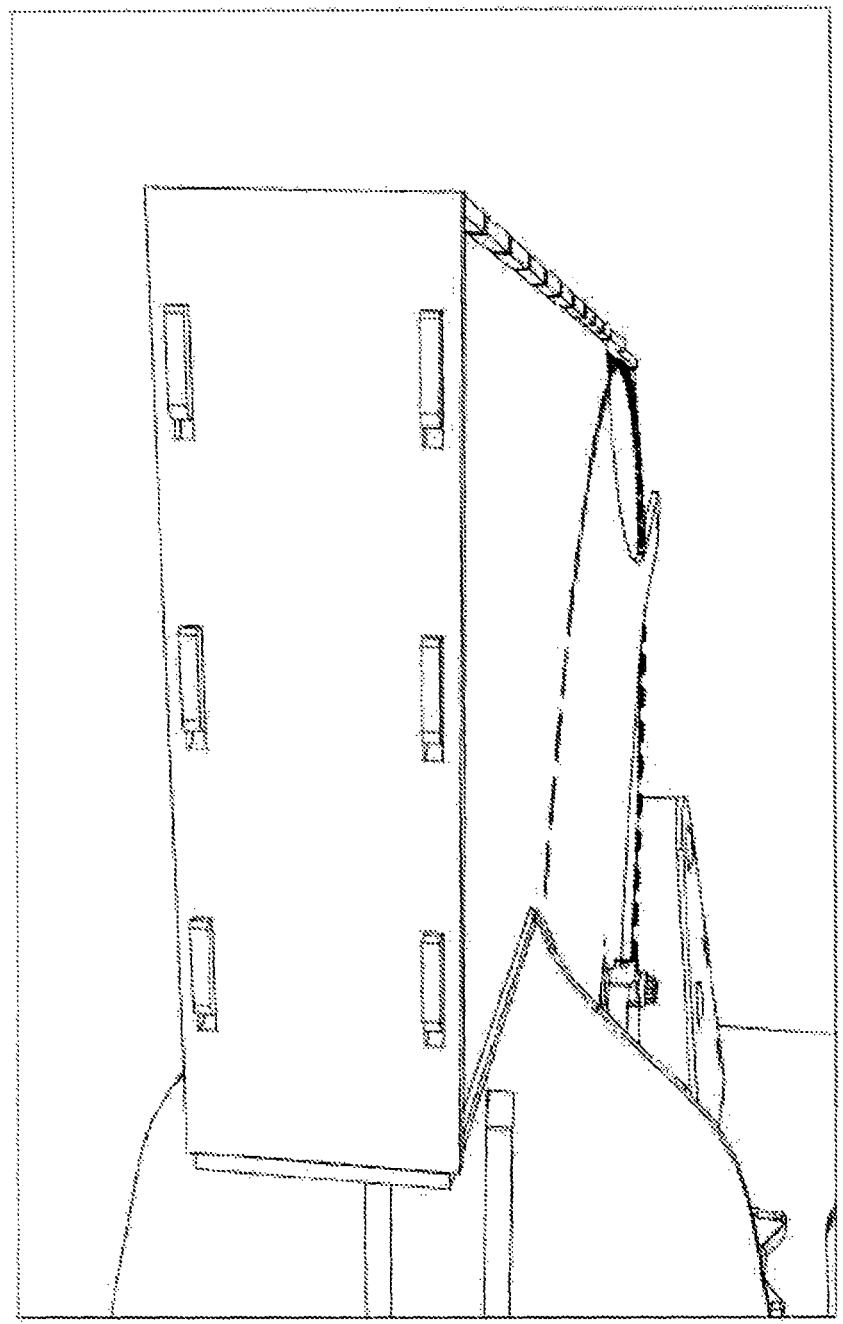
FIG. 6I is a rear view of final closure piece of rear seat by 6-17 downward slide hook lock.
Figure 10A:
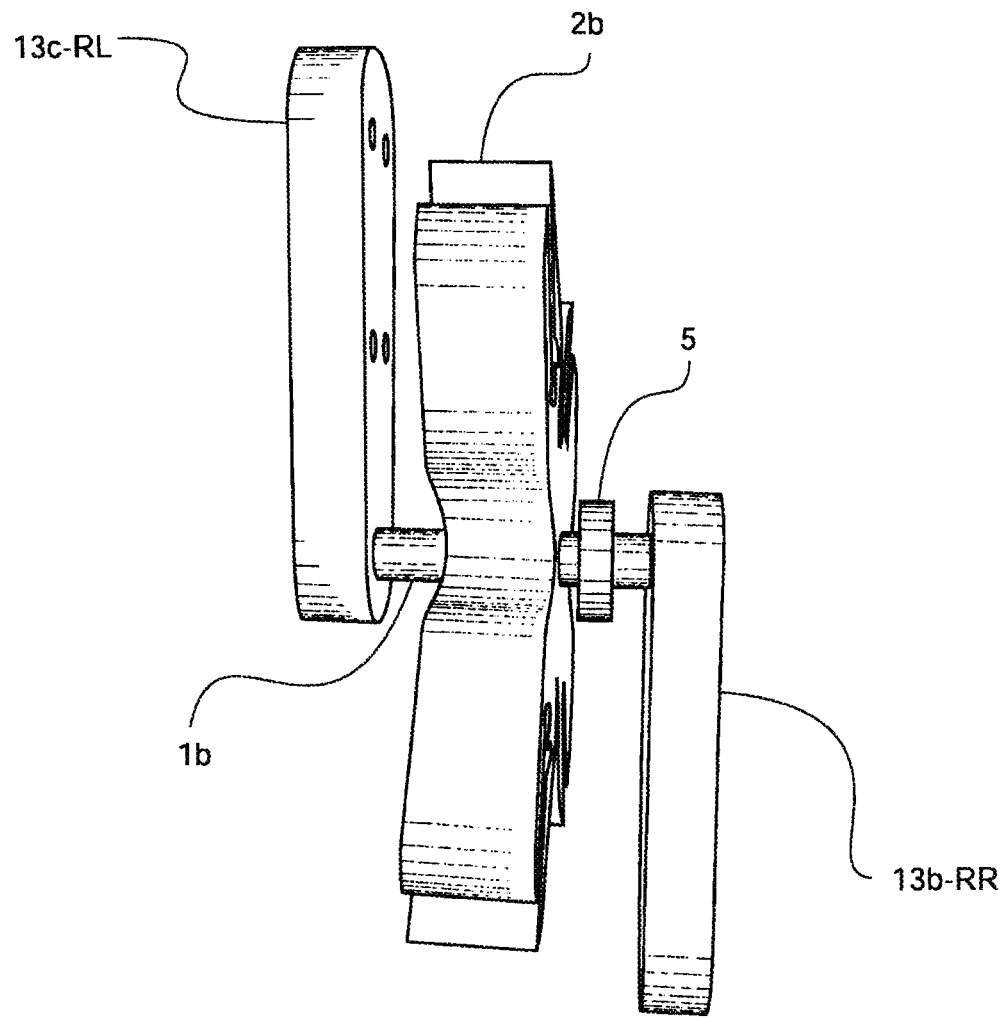
FIG. 10A is a view of an Axle and Hub and Pedal Arms from above with one bearing, and a spline shaft that outside matches bearing 5 inside diameter.
Figure 10B:
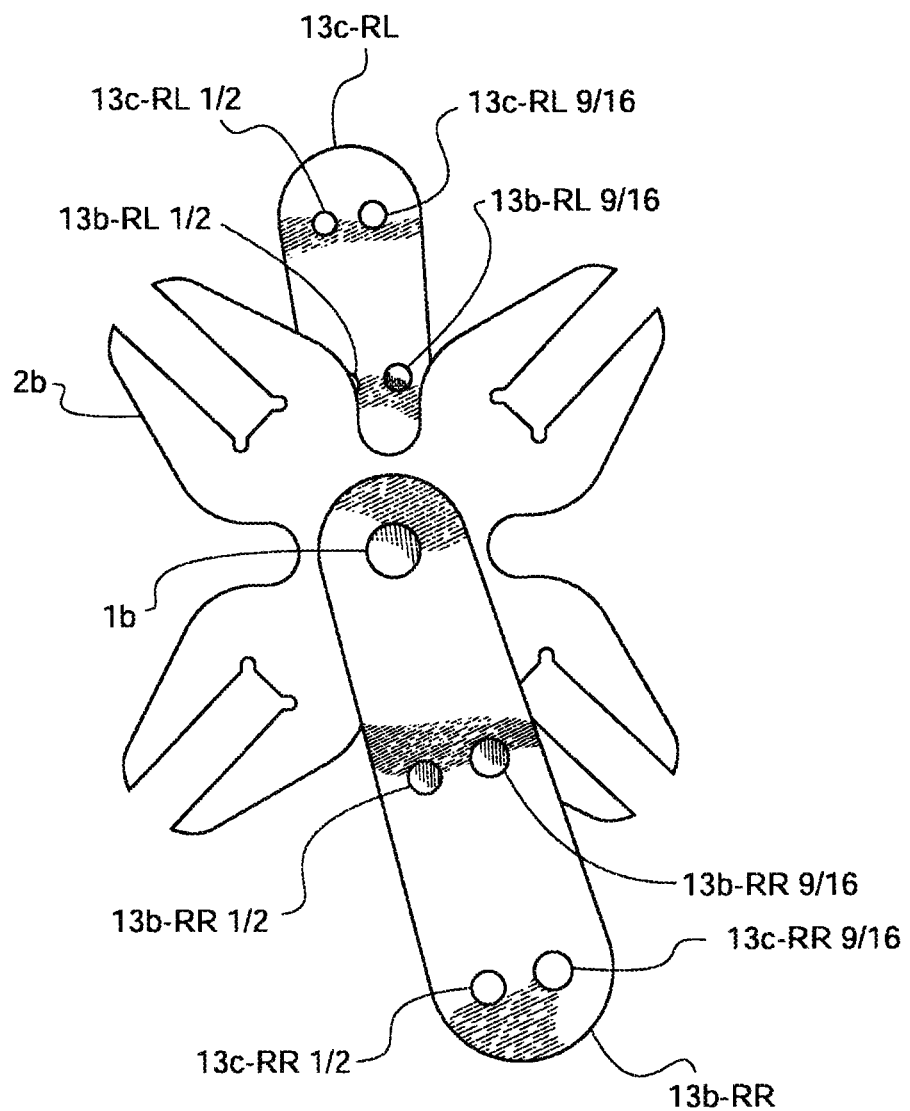
FIG. 10B is a view of an Axle and Hub and Pedal Arms from the side.
Figure 10C:
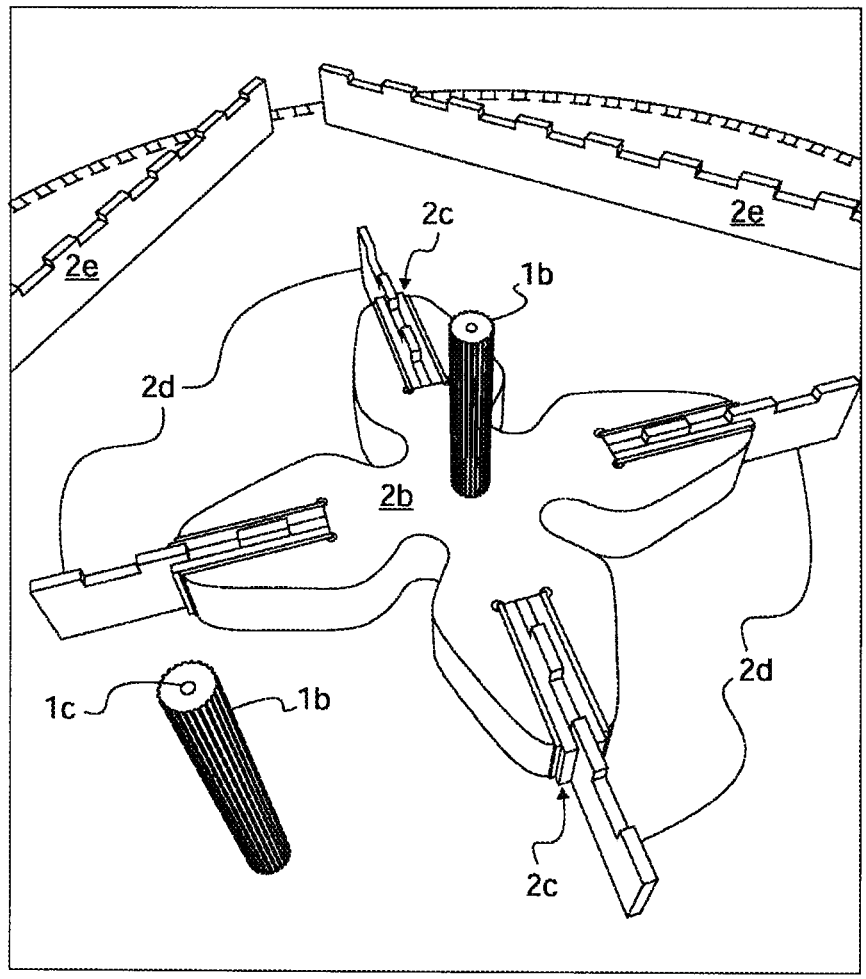
FIG. 10C is a view of an Axle and hub mounted on rotor, with display axle, where spline shaft 1b can also be used for wind generation attachments, chain or direct.
Figure 10D:
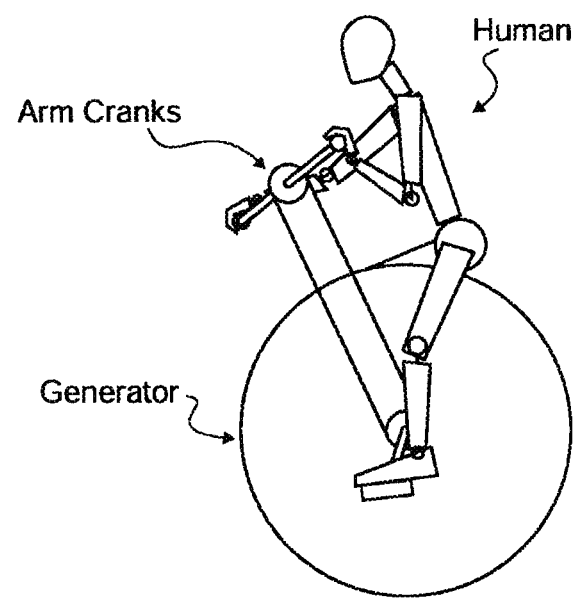
FIG. 10D is a view of a splined sprocket/pulley for chain/belt for arm crank power input to generator axle upright.
Figure 10E:
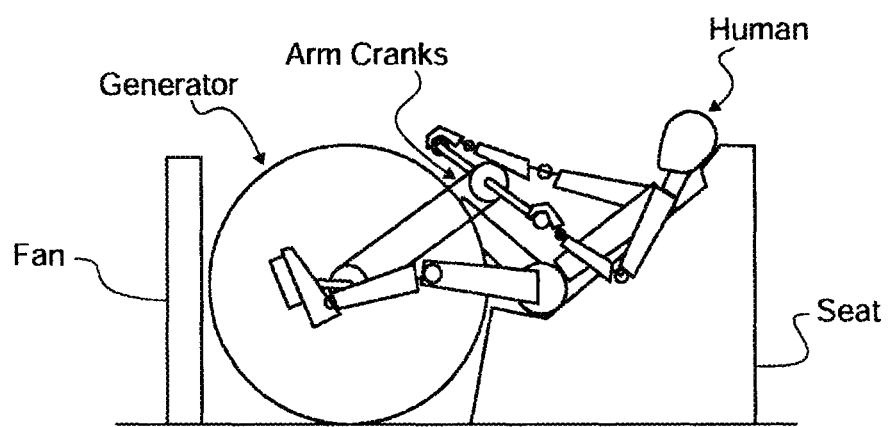
FIG. 10E is a view of a splined sprocket/pulley for chain/belt for arm crank power input to generator axle recumbent.

1 Shaft, Axle in FIG. 2B (similarly depicted in U.S. Ser. No. 17/521,667, FIG.1 at element 1).
1b Spline Axle in FIG. 10A and FIG. 10B.
1c threaded hole in FIG. 10C in the ends of 1b to retain objects on 1b from both sides with a washer,
2 Rotor Tooth Connect in FIG. 2B (similarly rotor axle torsion pinned spacer or peripheral rotor spacer interlock pieces depicted in U.S. Ser. No. 17/521,667, FIG. 1 at element 2).
2b Aluminum spline fork in FIG. 10A, FIG. 10B, and FIG. 10C.
2c absorber in fork in FIG. 10C.
2d rib spacers FIG. 10C.
2e Ultra long rib spacers in FIG. 10C. 4 long square anti potato chip distortion pieces which are a subset of more long potato chip pieces
3 Rotor in FIG. 2B (similarly depicted in U.S. Ser. No. 17/521,667, FIG. 1 at element).
3b-RR in FIG. 6C.
6 Spacers in FIG. 2B (similarlu depicted in U.S. Ser. No. 17/521,667, FIG. 1 at element 4).
7 Ball-Bearing in FIG. 2B and element of FIG. 10A (similarly to other bearing depicted in U.S. Ser. No. 17/521,667, FIG. 1 at element 5).
5 Stator, Box Side (similarly depicted in U.S. Ser. No. 17/521,667.
FIG. 1 at element 6).
6-RL Box Side Rider's Left in FIG. 2B.
6d-RR-18b in FIG. 6C, Stator standseat with protrusion for fan.
6e-RL-16 Stator standseat is the same as FIG. 2B item 16 and redundant.
6e-RL-16b Stator standseat in FIG. 6B (adjustment of wire cutouts on opposing sides)
Item 17 BOX-REAR-PANEL in FIG. 2B.
Item 26 BOX-BOTTOM-PANEL in FIG. 2B.
Item 12 TOP-PANEL in FIG. 2B.
Item 20 TOP-H-CAP-W/T FIG. 2B.
Item 8 REAR-INNER-PANEL in FIG. 2B.
Item 19 BOTTOM-CAP in FIG. 2B.
7h-14a-7 BOTTOM-PANEL 1 Top in FIG. 2B, is the same as item 14 BOTTOM-PANEL in FIG. 2B..
7i-14b-7 BOTTOM-PANEL 2 in FIG. 2B.
7j-14c-7 Carpet Fur up layer in FIG. 2B.
7k-14d-7 Carpet Fur down layer in FIG. 2B.
Item 13 FRONT-INNER-PANEL in FIG. 2B.
Item 9 FRONT-OUTER-PANEL in FIG. 2B.
Item 11 FRONT-TOP-CAP in FIG. 2B.
7p hoop strap in FIG. 7A.
7q hoop strap tensioning device in FIG. 7A.
13b-RR in FIG. 10A Pedal arm Riders right is the same as FIG. 2B item 25 PEDAL.
13c-RL in FIG. 10A Pedal arm Riders left is the same as FIG. 2B PEDAL.
13b-RR½" in FIG. 10B, (0.50")×20 tpi Right hand thread,
13b-RR⁹⁄₁₆" in FIG. 10B, (0.56")×20 tpi Right hand thread,
13b-RL½" in FIG. 10B, (0.50")×20 tpi left pedal has a left (reverse) thread,
13b-RL⁹⁄₁₆" in FIG. 10B, (0.56")×20 tpi left pedal has a left (reverse) thread,
13c-RR½" in FIG. 10B, (0.50")×20 tpi Right hand thread, Riders right,
13c-RR⁹⁄₁₆" in FIG. 10B, (0.56")×20 tpi Right hand thread, Riders right,
13c-RL½" in FIG. 10A, (0.50")×20 tpi left pedal has a left (reverse) thread,
13c-RL⁹⁄₁₆" in FIG. 10A, (0.56")×20 tpi left pedal has a left (reverse) thread,
27 wire zig zagged around the circumference of stator box side 5 in FIG. 2B (similarly depicted in U.S. Ser. No. 17/521,667, FIG. 1 at element 15).
15c individual flat conductor winding in FIG. 11C and FIG. 11D, FIG. 11E, FIG. 11F, arranged as a shear web beam to span the stator with minimum sag.
15d in FIG. 11C, FIG. 11D, FIG. 11E, FIG. 11F, FIG. 11G, and FIG 11H, a winding consisting of individual flat conductors 15c splayed out individually to demonstrate how it is constructed; 15d a group of 15c conductors filling the available stator winding space noted in cutaway view.
20 Magnetic Box Closure piece in FIG 12F (similarly depicted in U.S. Ser. No. 17/521,667, FIG. 10).
20b in FIG. 12F, having no 30 overhang Magnetic Box Closure piece.
27b in FIG. 12C and FIG. 12D, wider for undercut.
27c in FIG. 12C and FIG. 12D, wider for undercut.
27d Undercut slot in FIG. 12A and FIG. 12B, depicted in Stator.
27e Undercut slot in FIG. 12A and FIG. 12B, depicted in Stator.
31x in FIG. 12F and FIG. 13B, Under rotor magnetically conductive pieces for undercut.
31b in FIG. 12C and FIG. 13B, widened for undercut in rotor.
31c in FIG. 12C and FIG. 13B, widened for undercut in rotor.
31f Undercut slot in Rotor in FIG. 13D.
31e Undercut slot in Rotor in FIG. 13D.
31d magnet lock piece in FIG. 12F and FIG. 13D, fitting over widened 31x.
Item 16 STAND-R in FIG. 2B.
Item 18 STAND-L in FIG. 2B.
Item 15 REAR-W/T-TRIANGLE in FIG. 2B.
Item 22 FRONT-W/T-TRIANGLE in FIG. 2B.
Item 23 REAR-WO/T-TRIANGLE in FIG. 2B.
Item 24 FRONT-WO/T-TRIANGLE in FIG. 2B.
The following numbers are CAD assigned numbers in FIG. 2B.
FIG. 2Bitem 1 M-SHAFT.
FIG. 2B item 2 TOOTH-IN-C.
FIG. 2B item 4 TOOTH-IN.
FIG. 2B item 5 STATOR.

FIG. 2B item 6 WASHER.
FIG. 2B item 7 BEARING.
FIG. 2B item 8 REAR-INNER-PANEL. REAR-INNER-PANEL
FIG. 2B FRONT-OUTER-PANEL.
FIG. 2B 10 REAR-OUTER-PANEL.
FIG. 2B item 11 FRONT-TOP-CAP.
FIG. 2B item 12 TOP-PANEL.
FIG. 2B item 13 FRONT-INNER-PANEL.
FIG. 2B item 14 BOTTOM-PANEL.
FIG. 2B item REAR-W/T-TRIANGLE.
FIG. 2B item 16 STAND-R.
FIG. 2B item 17 BOX-REAR-PANEL.
FIG. 2B item 19 BOTTOM-CAP.
FIG. 2B item 20 TOP-H-CAP-W/T.
FIG. 2B item 21 TOP-H-CAP-WO/T.
FIG. 2B item 22 FRONT-W/T-TRIANGLE.
FIG. 2B item 23 REAR-WO/T-TRIANGLE.
FIG. 2B item 24 FRONT-WO/T-TRIANGLE.
FIG. 2B item 25 PEDAL.
FIG. 2B item 26 BOX-BOTTOM-PANEL.
FIG. 2B item 27 WIRE 1 is the same as 15 wire zig zagged around the circumference in U.S. Ser. No. 17/521,667.

A generator and motor construction method with applications in bicycle generators, exercise machines, and vehicles for example are disclosed. Methods and order of interlocking to form structures are also disclosed. Fastening by means of hoop straps and other details shown in drawings and photographs are also disclosed. Circuits are also disclosed to match inventive systems and devices.

Some characteristics of a human electrical generator include Pavlovian short term rewards, such as (i) Capacitor Storage with time remaining to shut down, (ii) Loss of fan cooling from inadequate electricity generation is punishment, and (iii) loss of entertainment and distraction from inadequate electricity generation is punishment. Long term rewards include (i) accomplishing something useful, electricity generation, (ii) off grid reserve power, and (iii) improved health.

Power from the human electrical generator is used to (user controllably) power a cooling fan blowing directly on or over said human, for example from the front, the side, below, the rear, or above the human, or combinations thereof.

For example, a systems, methods of assembling, and devices to retain rotor magnets using magnetically conductive parts in an electric device is contemplated. The housing has two side walls coupled by an axle, each side wall having a stator pole (preferably plurality thereof) at an edge of the side wall. A wire (e.g., flat wire, round wire, braided wire, multiple wires, combinations thereof, etc.) is strung between the stator pole of each side wall.

A panel (preferably a plurality) spans the edge of each side wall and interlocks with the stator pole. A first plate is disposed between the side walls (optionally coupled to the axle), and a magnet disposed at an edge of the first plate proximal (e.g., within 1, 2, 3, 4, or 5 inches) to the wire. The magnet is coupled to the edge of the first plate and an edge of a second plate (also between the side walls and optionally coupled to the axle). A plurality of magnets are preferably coupled to the edge of the first plate and an edge of the second plate proximal to the wire.

In such an arrangement, it should be appreciated that the side walls and panels form a stationary drum (relative to the rotating plates and magnets). Inside the drum, the first and second plates form a structure that supports the plurality of magnets and rotate as the user or human rotates the pedals (e.g., by foot, hand, etc.). This in turn rotates the magnets that are part of or otherwise coupled to the plates. Thus, as the magnets rotate, the magnetic field of the moving magnets causes electric current to flow in the wires of the drum and generates electricity.

The preferred material for the side walls, panels, and plates is wood, but other materials such as plastics or polymers can also be used, alone or in combination. Further, the preferred method of connecting the various pieces of bicycle generator is mated slots or grooves and extensions or posts, as depicted in the figures. However, other connectors can be used alone or in combination, for example screws, nails, adhesives, hook and latch, pegs, locking pegs, bolt and hinge, etc.

It should be appreciated that further designs or arrangements are contemplated. In some embodiments, the drum is further geared to rotate counter to the rotation of the first and second plates supporting the magnets. Likewise, the plates and magnets can be held in a fixed position while the drum is rotated by pedaling of the human or user. Further, the magnets can be mounted on a surface of the panel or drum (interior or exterior), while the first and second plates include stator poles at their edges with wires laced between or wound about the stator poles. In such embodiments, either the drum, the first and second plates, or both (e.g., counter rotation) rotate when the user or human pedals.

This stationary electricity generating bike with cooling, can increase a user or human's total workout output by 10 times over stationary bikes that do not have significant direct wind cooling. Operator adjustment of cooling fan allows warming up without fan, and then increasing wind as desired. The cooling fan is powered by pedaling, which causes rotation of the drum to operate a direct drive electric generator, with surplus energy used to either operate electronic devices or stored in batteries.

The bike is quiet allowing hearing of electronic devices. An amplified speaker is also provided in the center of the fan so the sound is carried to the user by the fan, instead of the fan interfering with the sound.

However, due to the inventive design of flat components (preferably wood) with mated slots and posts (i.e., not requiring additional assembly materials or connectors), embodiments of the inventive subject matter a uniquely suited for shipping by flatpack, with assembly by the end user.

Likewise, the user or human can use their personally preferred type of pedal, as the crankshaft of some embodiments is threaded for most, preferably all, common pedal thread pitch sizes, though some embodiments include default pedals. Moreover, some embodiments include more than one (e.g., 2, 3, 4, 5, more than 6, etc.) crank length positions, or slidable, ratcheted, or telescoping adjustments for crank length.

The generator is a large direct drive using the leg inseam dimensions of humans. Small scale bicycle generators do not generate enough voltage, make too much noise, and have efficiency losses due to reduction drives. Big pancake generators (or motors) made with traditional or known methods are prohibitively heavy (e.g., more than 500 lbs), whereas the novel bicycle generator of the inventive subject matter weighs less than 200 lbs, 150 lbs, 120 lbs, and ideally no more than 110 lbs, 100 lbs, 80 lbs, 60 lbs, or 40 lbs. Systems and devices of the inventive subject matter are well suited for affordable flatpack shipping.

A Hoop or Barrel Tensioner can also be used to secure motor generator parts and supporting structure (see, e.g., FIGS. 7A, 7B, 7C, 6D, 6E). Barrel Hoop tension is used to secure outside of motor together, and where the outside box closure pieces extend to perform other functions, and securement of the generator or motor. This is to facilitate mounting in general and special has applications such as exercise bikes, vehicles, wind generators or other things.

Figure 7A:
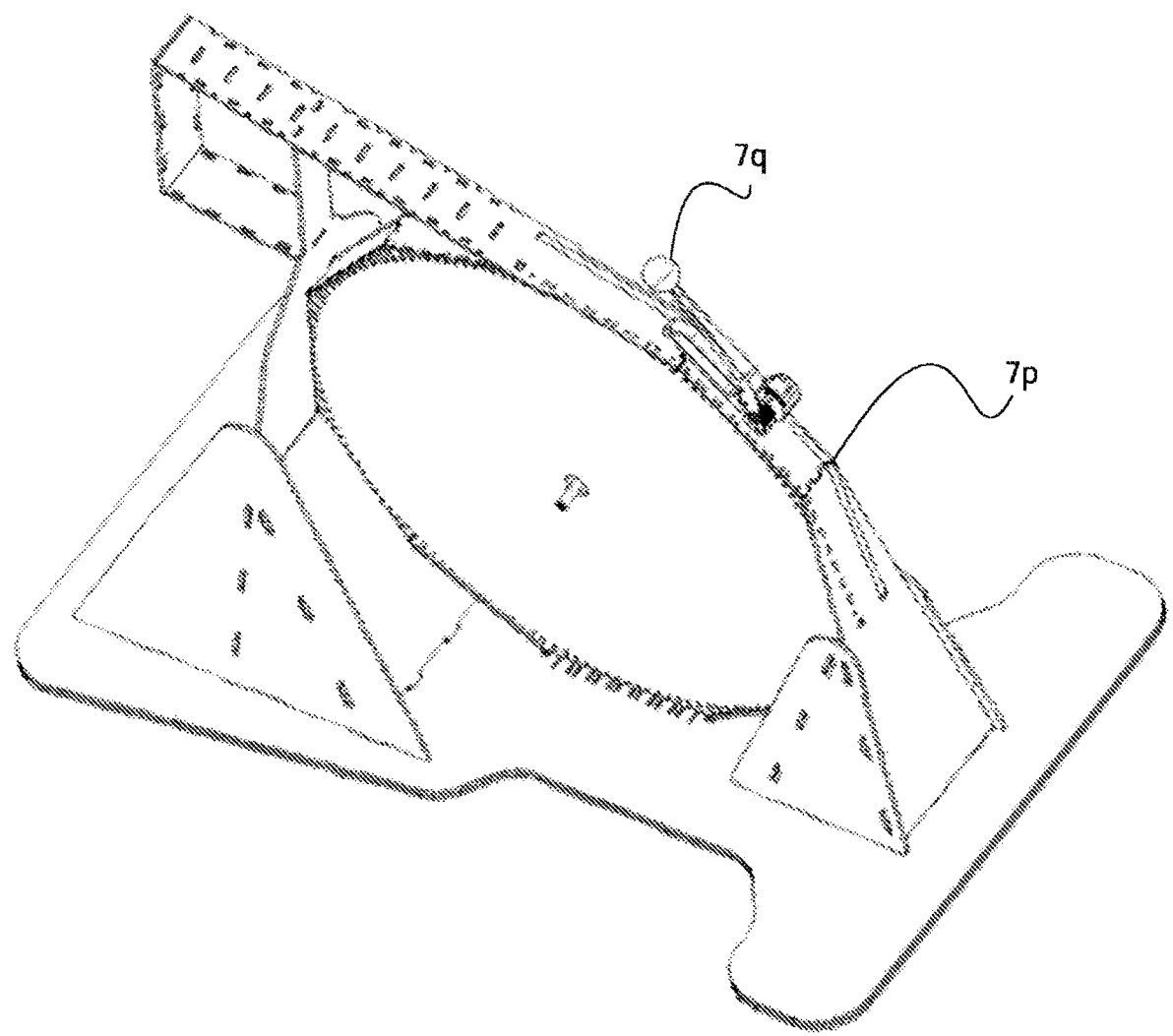
FIG. 7A is a view of a strap tensioner acting upon generator bike unification, and 7b-12-1 TOP-PANEL 7o-11-11 FRONT-TOP-CAP 7n-9-10 FRONT-OUTER-PANEL.
Figure 7B:
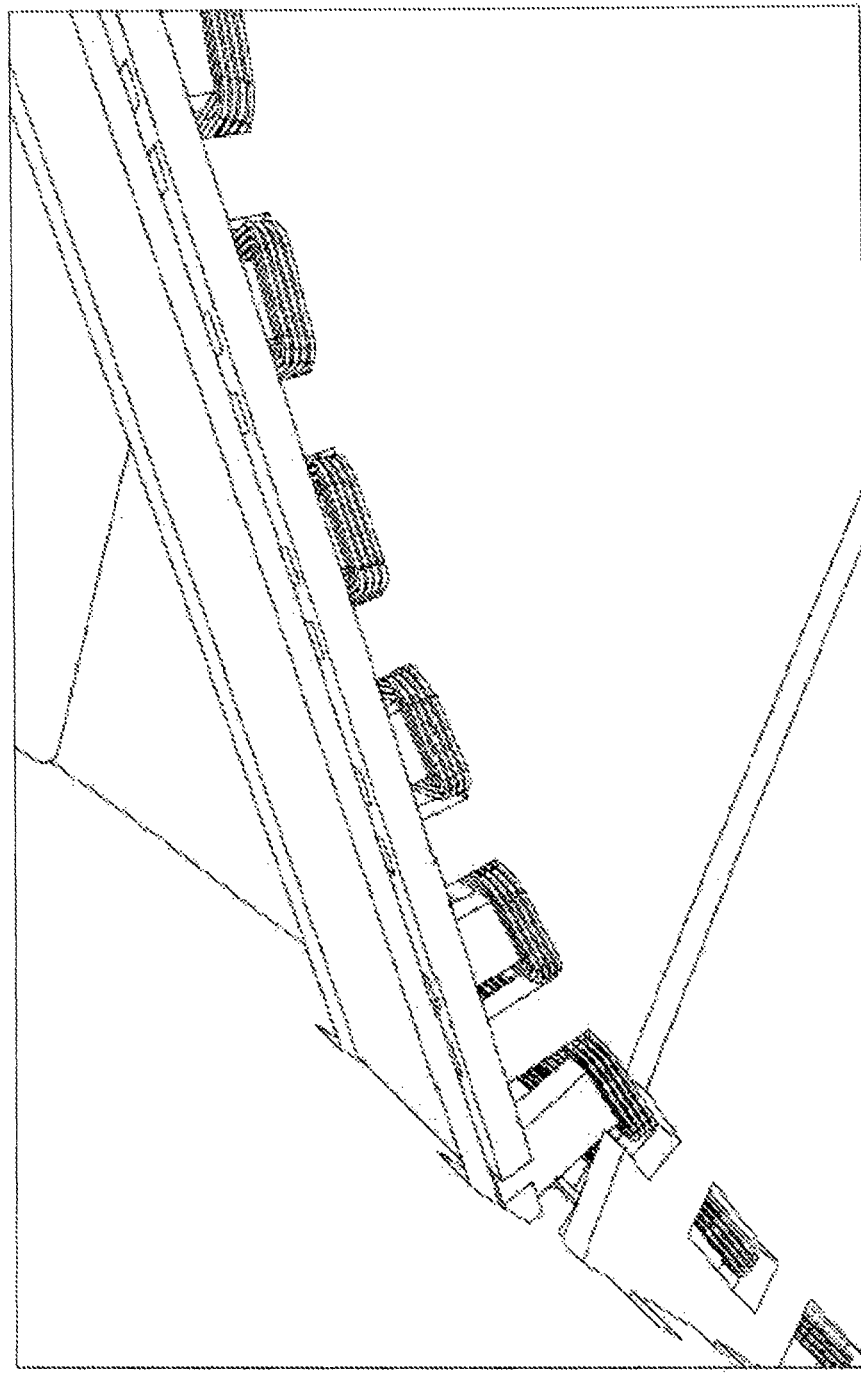
FIG. 7B is a view of a strap being installed near cap 7l-19b-8 near BOTTOM-CAP front 2.
Figure 7C:
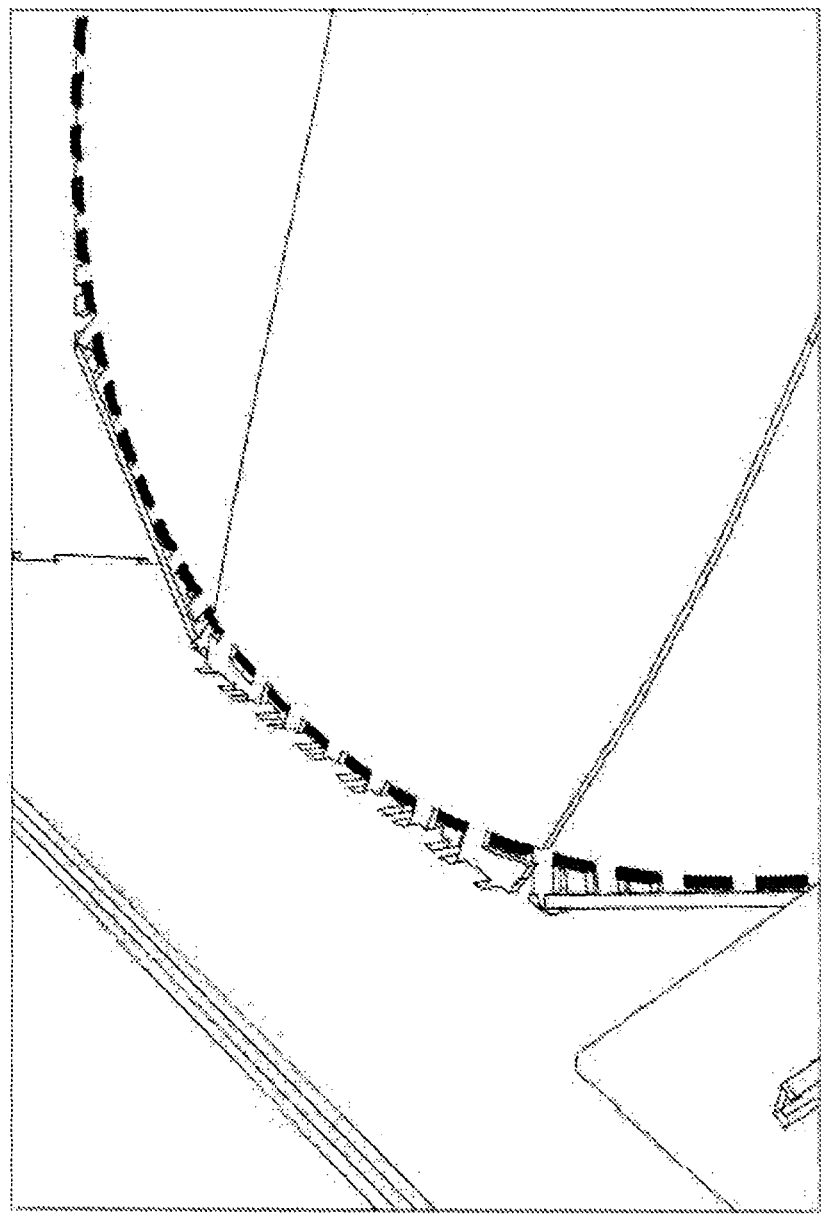
FIG. 7C is a view of a strap being installed near cap 7l-19b-8, 7h-14a-7, 7g-19a-6.

FIG. 7A shows a 7p hoop strap being installed with a 7q hoop strap tensioning device, around the periphery of the generator over box closure pieces 7. The straps 7p can be seen threaded thru holes within the box closure pieces or over the box closure pieces (e.g., 7h-14a-7 BOTTOM-PANEL 1 Top) in FIGS. 6A, 6D. 6E, 6H, 6E, 7B, 7C etc. Alternatively in FIG. 2B numbering the hoop straps is threaded to hold parts in numbers shown on FIG. 2B as 8,10,21,20,12,11,9,13,19,14,19.

Figure 2I:
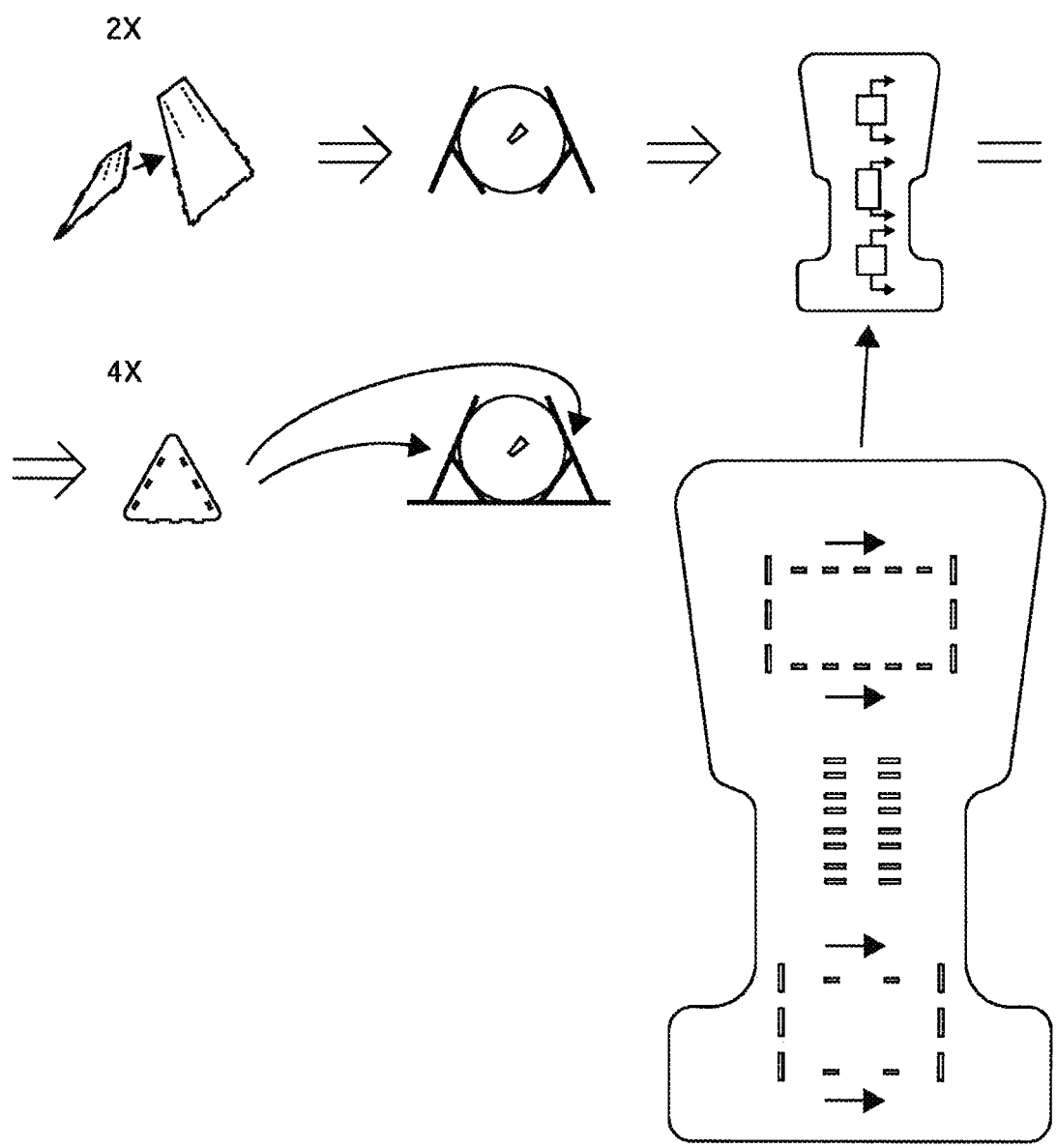
FIG. 2I is a view of an assembly interlock order of FIG. 2F a bicycle application of the Generator main body 50 of the generator.
Figure 2J:
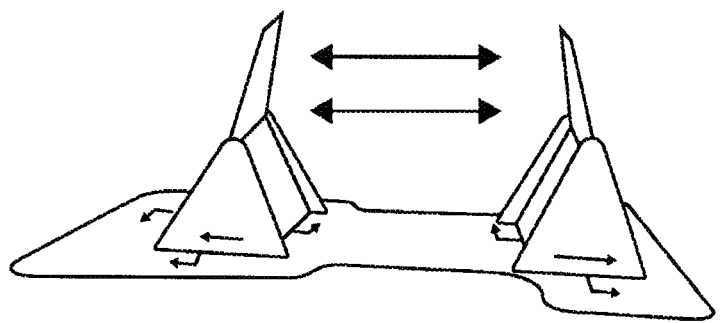
FIG. 2J is a view of other assembly method, Pre assembly of support sides to floor and the generator fitted in by elastic access.
Figure 2N:
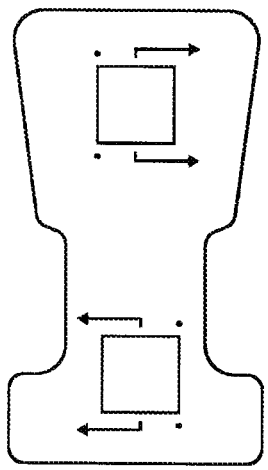
FIG. 2N is a view of 3 orders of lock.
Figure 2N:
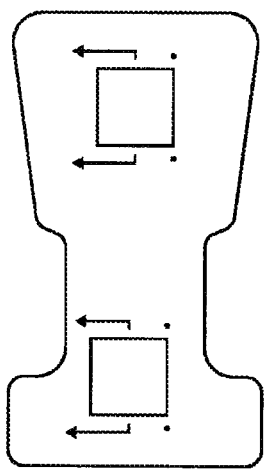
Figure 2N:
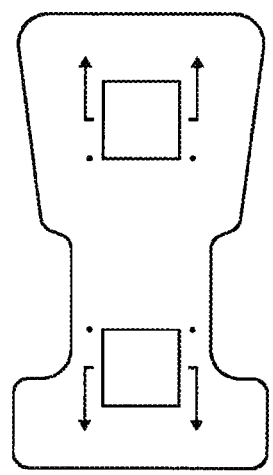
Figure 2N:
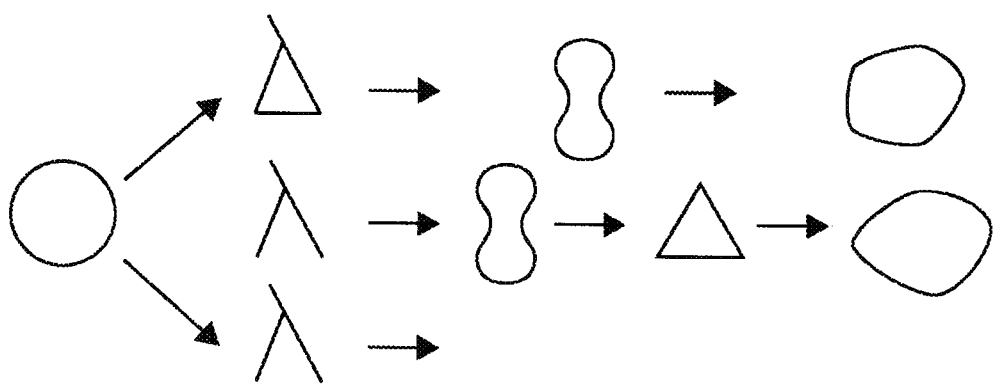
Figure 8A:
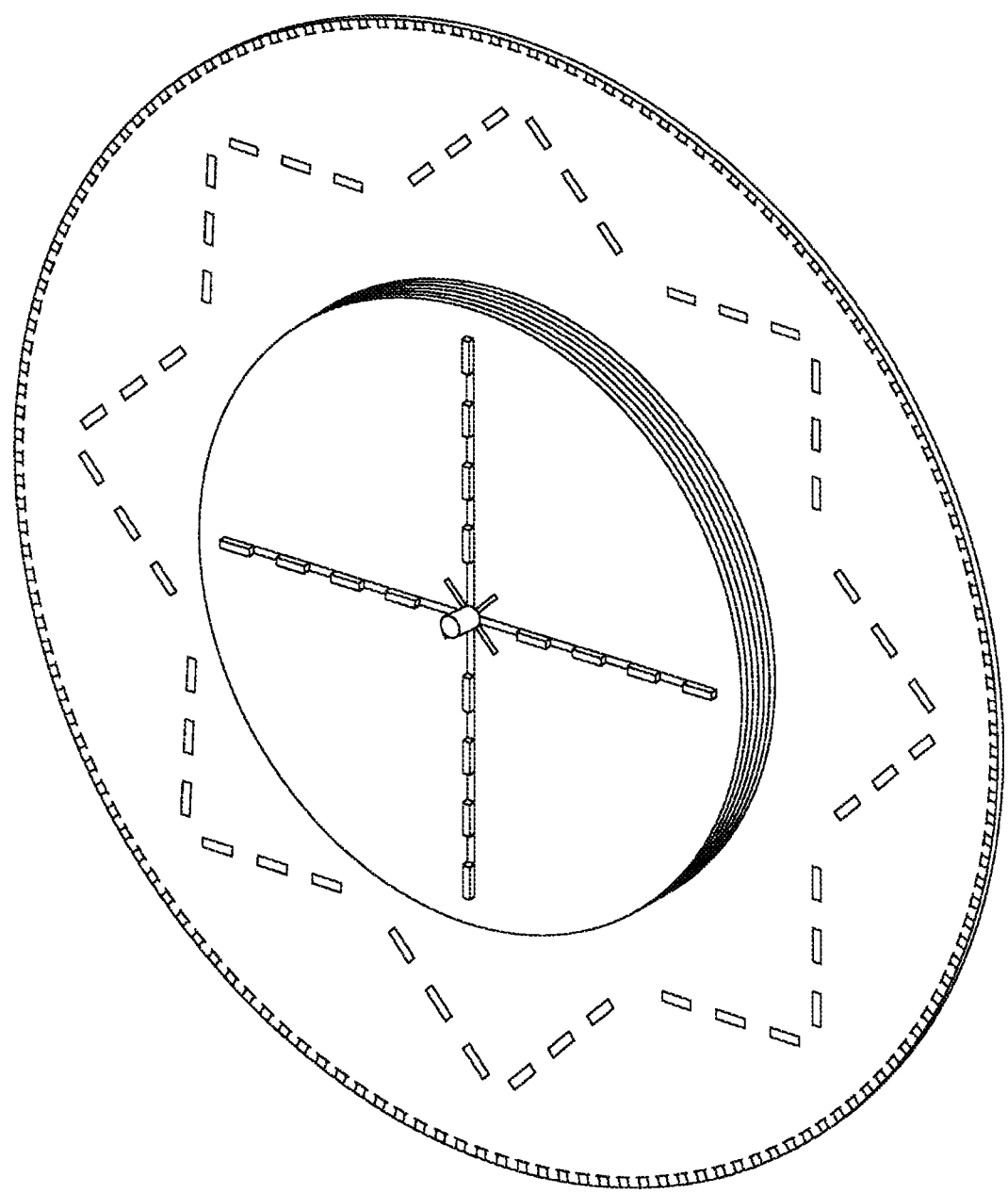
FIG. 8A is a view of a pinned axle linkage assembled.
Figure 8B:
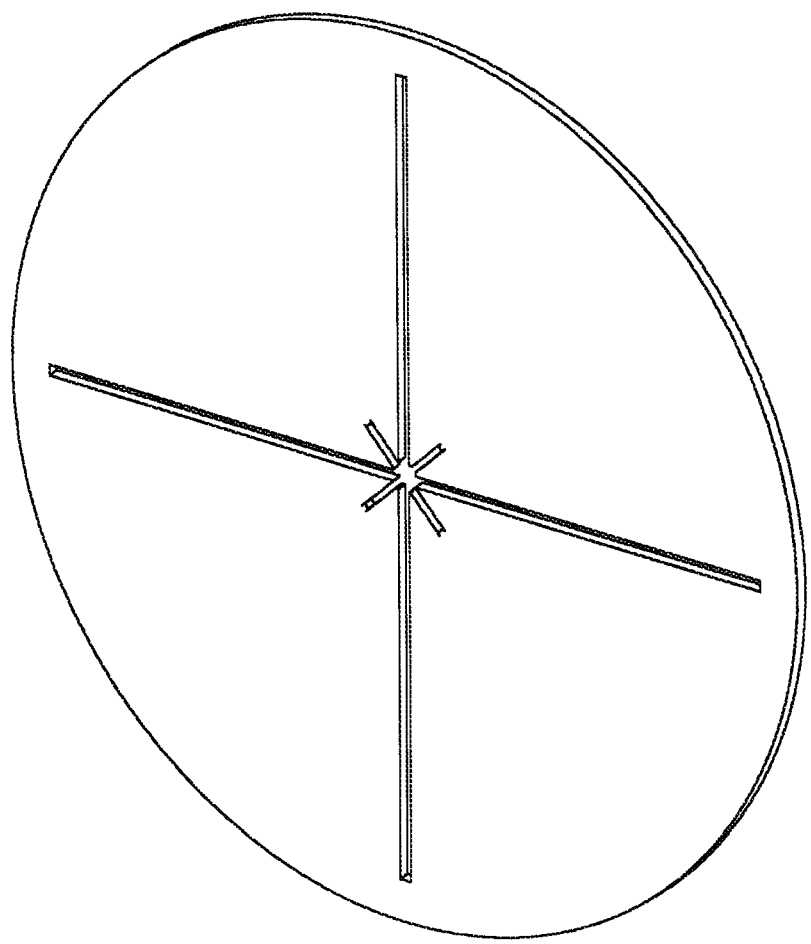
FIG. 8B is a view of one of the stacked parts in FIG. 8A.
Figure 8C:
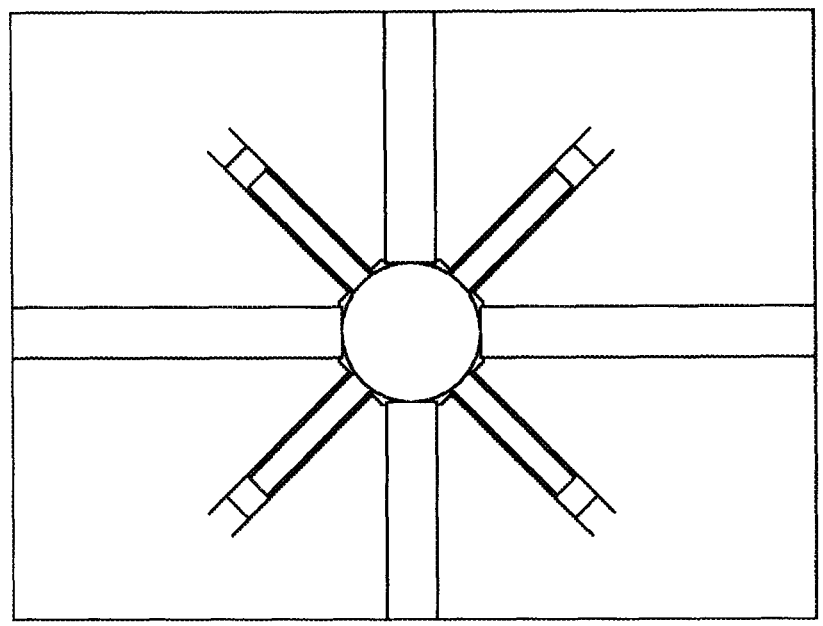
FIG. 8C is a view of detail of FIG. 8A where pins reside in metal lined slots.
Figure 9A:
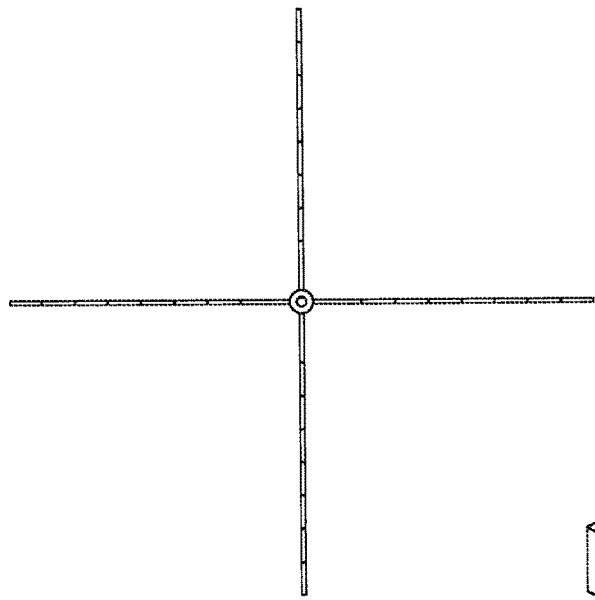
FIG. 9A is a view of a welded axle assembly.
Figure 9B:
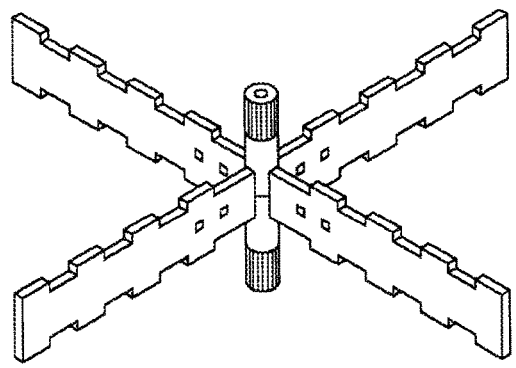
FIG. 9B is a view of a welded axle assembly.
Figure 9C:
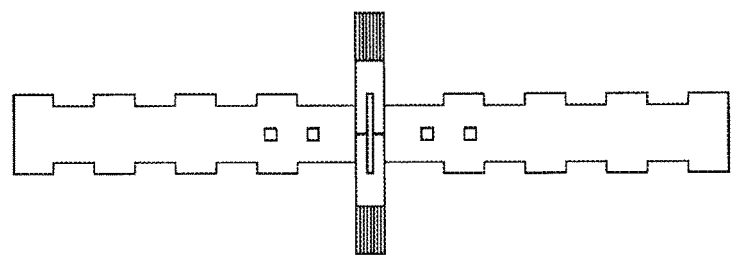
FIG. 9C is a view of a welded axle assembly.

In some embodiments, a sequence of one-way hooking is used to assemble and retain a motor generator or bike parts, with or without minimal additional fasteners, in a kind of Chinese puzzle box. See e.g., FIGS. 2I through 2N. In FIG. 2I, the two side generator stands/closures 10 of FIG. 2B, 8 of FIG. 2B, 13 of FIG. 2B, 9 of FIG. 2B applied to the generator motor and then the combined apparatus placed on the floor and then four side stand closures placed on the sides and then slid with hoop hooks in two of the side stands 15 of FIG. 2B, 22 of FIG. 2B sideways in the floor, 14 FIG. 2B (or 7h-14a-7) into floor tangs and the two of the side stand closures 23 of FIG. 2B, 24 of FIG. 2B with prong tangs slid downward into a constrained hole in the floor to become the final slide lock of the build sequence. Subsequently the circumferential hoop straps through holes are used to additionally hold the generator together. A second layer of floor 7i-14b-7 is used to space the hooks and strap protrusions from the floor footing. Layers of conforming padding such as carpeting form another layer of floor footing to conform to the inevitable irregularities in surfaces that the machine is placed.

Adjusting the bike for different human sizes is inherent in the slope of the seating area of item labeled 6e-RL-16b and 6d-RR-18b or 6e-RL-16 and 6d-RR-18, also with spacers for some types of seats. Some accommodation of arm lengths can be accommodated by changing the hinge angle of the fan and table part of the bike.

Figure 14A:
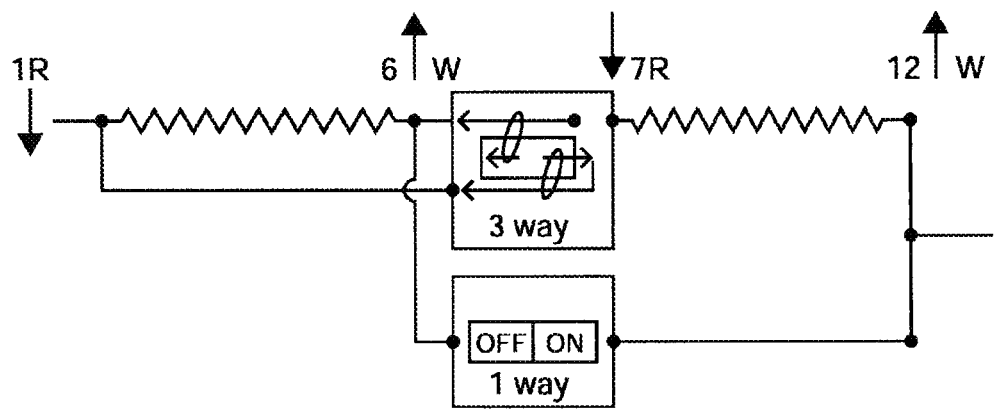
FIG. 14A is a view of series parallel switching generator windings schematics.
Figure 14A:
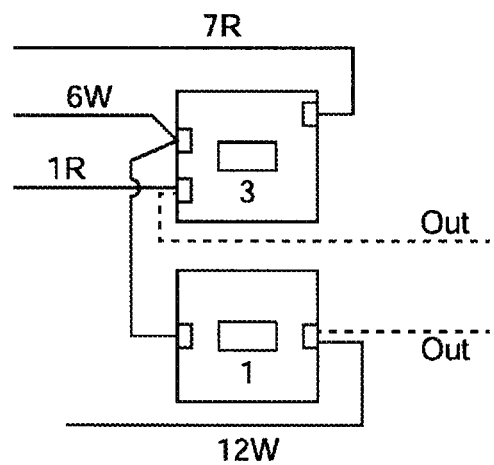

FIG. 14A shows a schematic for series-parallel switching generator windings. Circumferential windings 1 through 6 are arranged in series and 7 through 12 are also arranged in series. Series group 1 through 6 and group 7 thru 12 are switched between a series and a parallel arrangement. The switch can be accomplished, for example, by two household ganged duplex type switches where one switch is a 3 way and one is a 1 way switch. 4 possible positions of the switches are listed in position and effect, generally with the intent of trading between volts and current. The series parallel switching switch box can be placed, for example, near the chosen output of the generator windings in proximity to the fan box access, preferably without interfering with the user's legs. Winding groups can be created by bonding together individual circumferential windings.

Figure 12A:
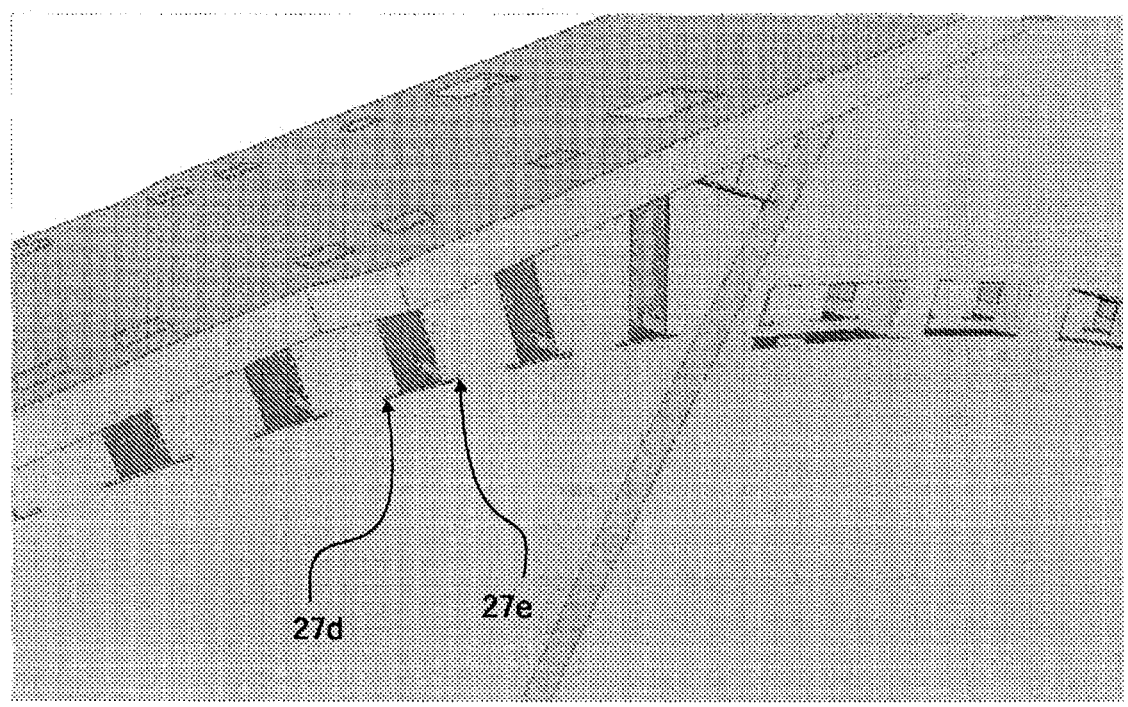
FIG. 12A is a close up showing undercut stator placement of magnetically conductive metal
Figure 12B:
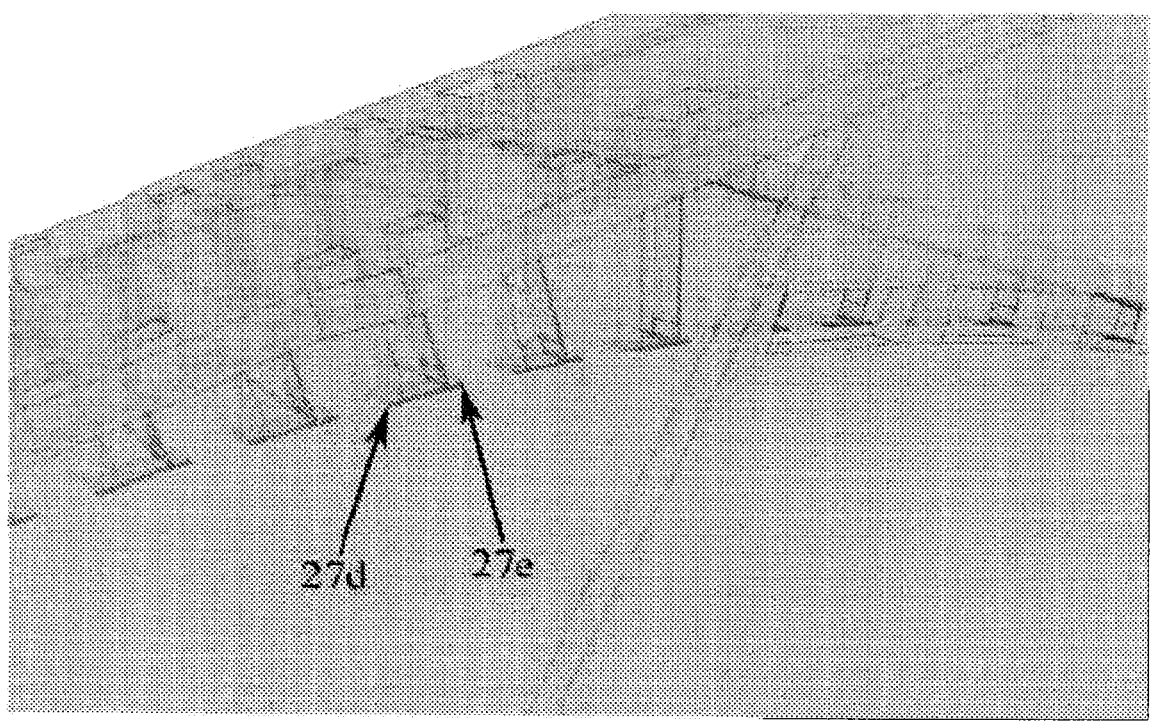
FIG. 12B is a see thru rendering of FIG. 12A.
Figure 12C:
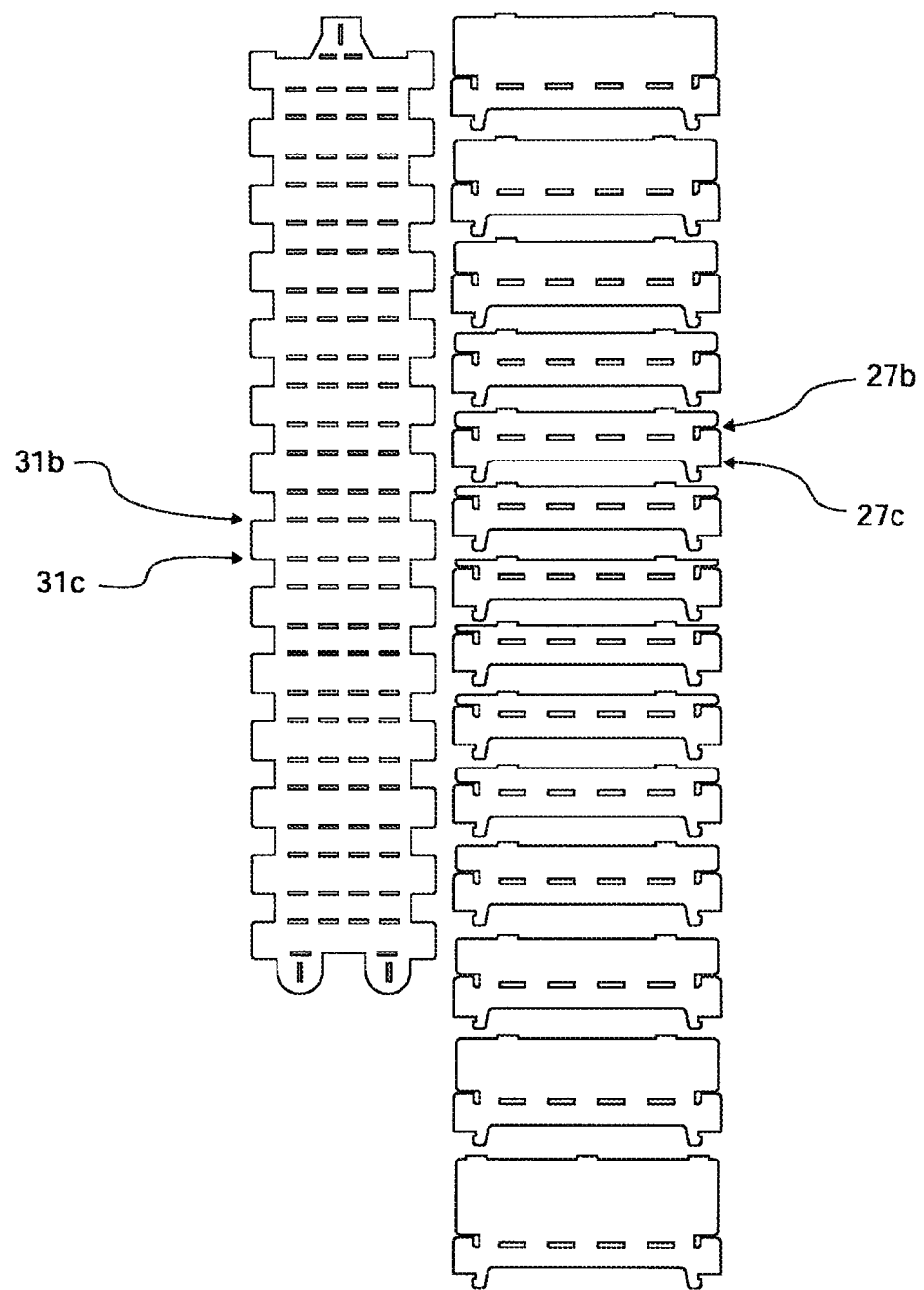
FIG. 12C is a view of a shape of metal made wider for undercut.
Figure 12D:
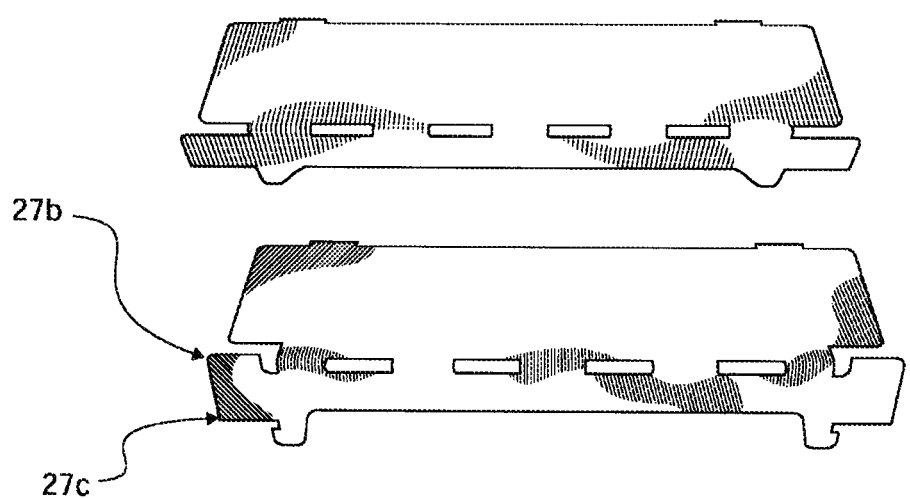
FIG. 12D is a view of widened versus original metal stator pole pieces FIG. 12A to FIG. 12C.
Figure 12E:
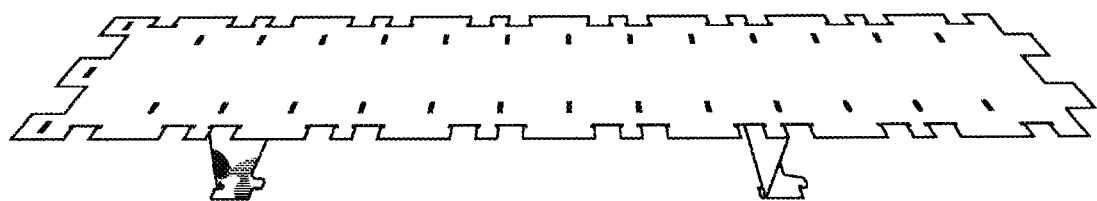
FIG. 12E is a demonstration of interaction between pole pieces and 20.
Figure 13A:
FIG. 13A is a concept sketch, undercut and magnet lock piece.
Figure 13A:
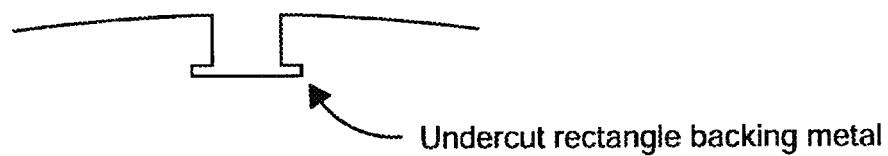
Figure 13A:
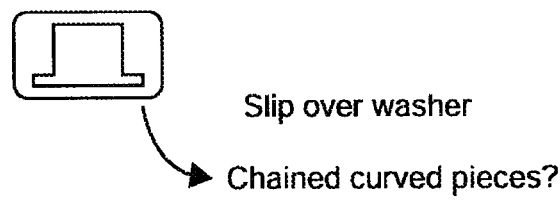
Figure 13B:
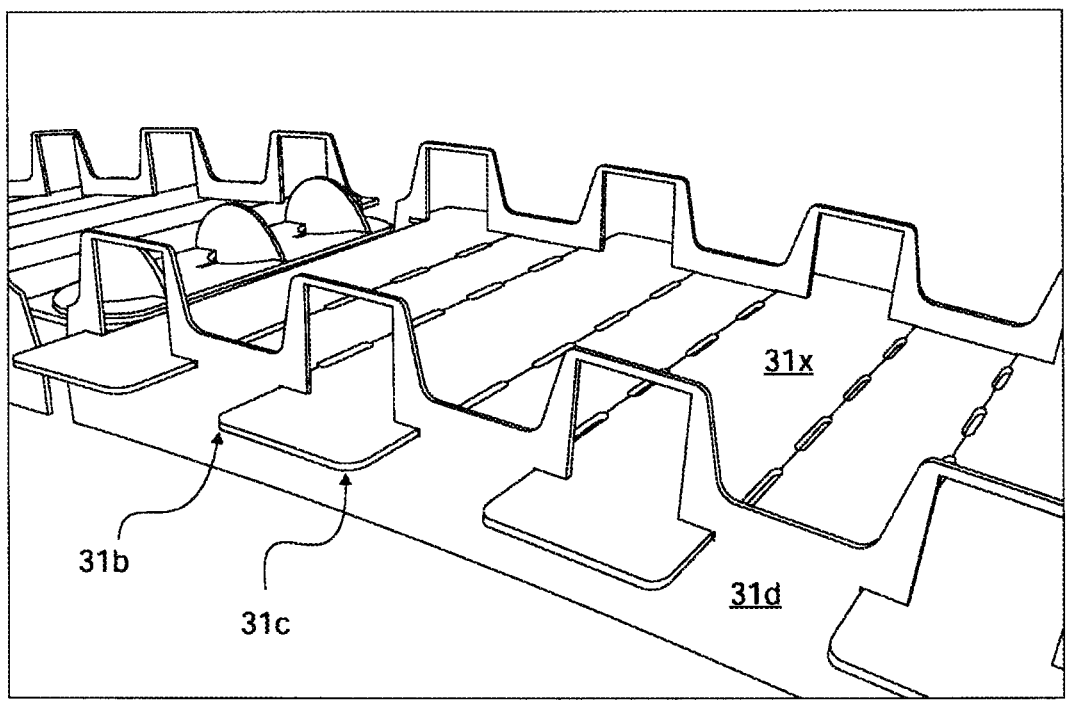
FIG. 13B is a view of an assembly close up of 31b and 31c.

FIGS. 12A and 12B show stator panel undercut 27d and 27e, and matching tangs 27b and 27c in magnetically conductive pole pieces in FIG. 12C and FIG. 12D. FIG. 12E shows how the interlocking magnetic stator circuit is made between 21 (22, 23) and magnetic closure pieces 20, 20b.

Figure 12F:
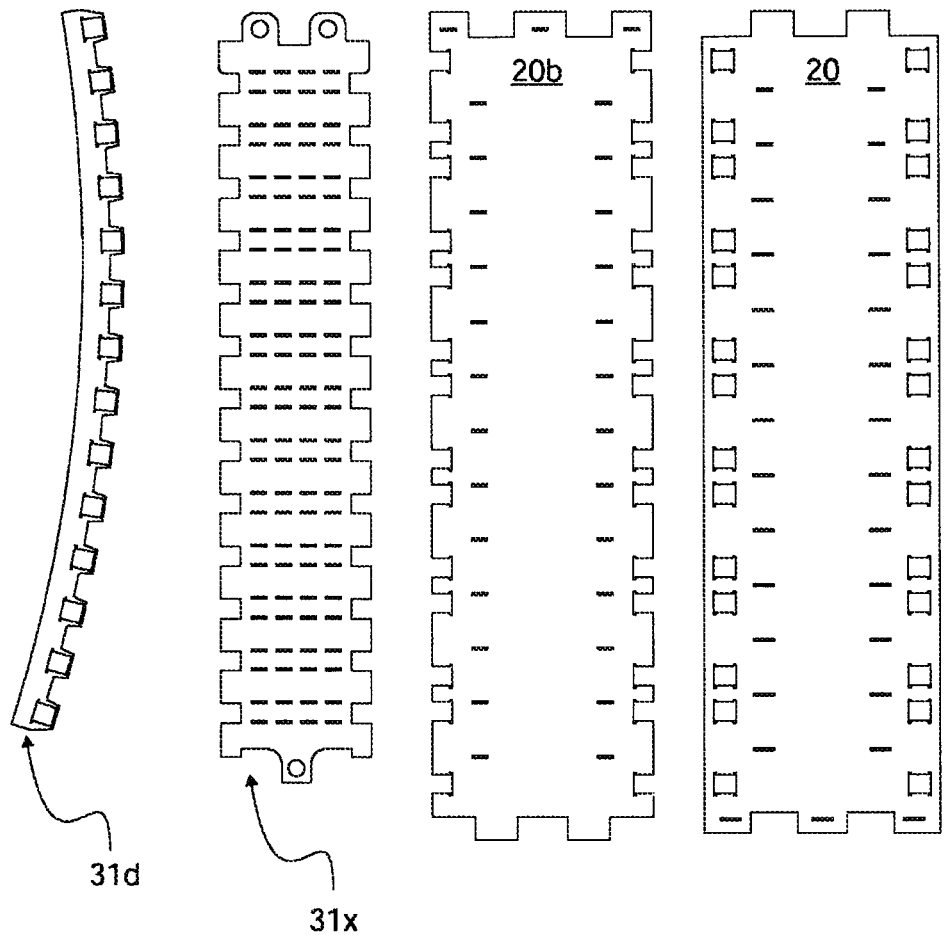
FIG. 12F is a view of rotor parts new magnet lock piece 31c 31d fitting over 31x which is a widened 31b to become undercut version on 31x, and stator parts 20b where space does not permit an a non overhung 20.
Figure 13C:
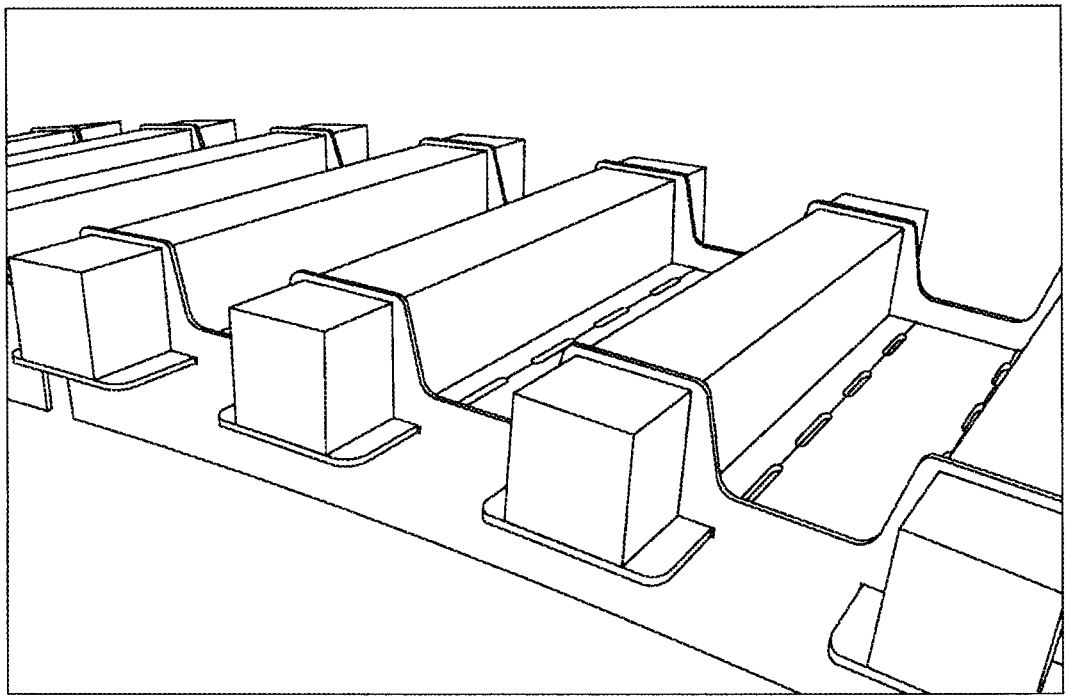
FIG. 13C is a view of an assembly close up of 31b and 31c and magnets 14.
Figure 13D:
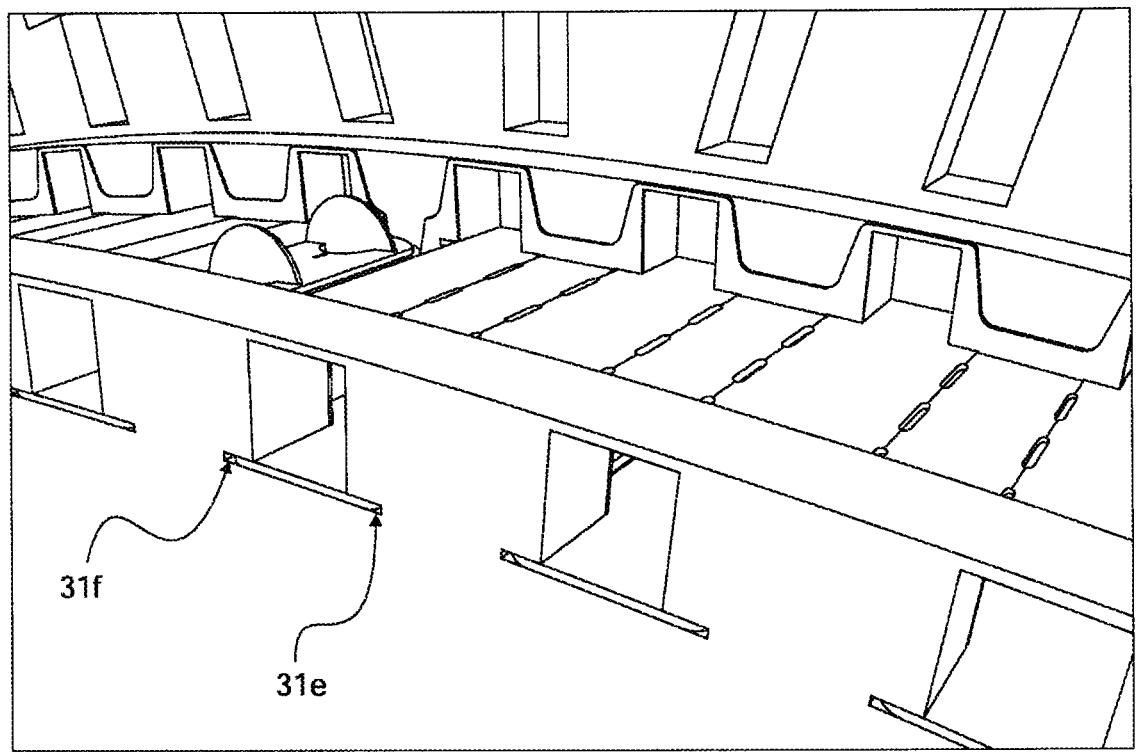
FIG. 13D is a view of rotor above one stator side with 31b and 31c in place.
Figure 13E:
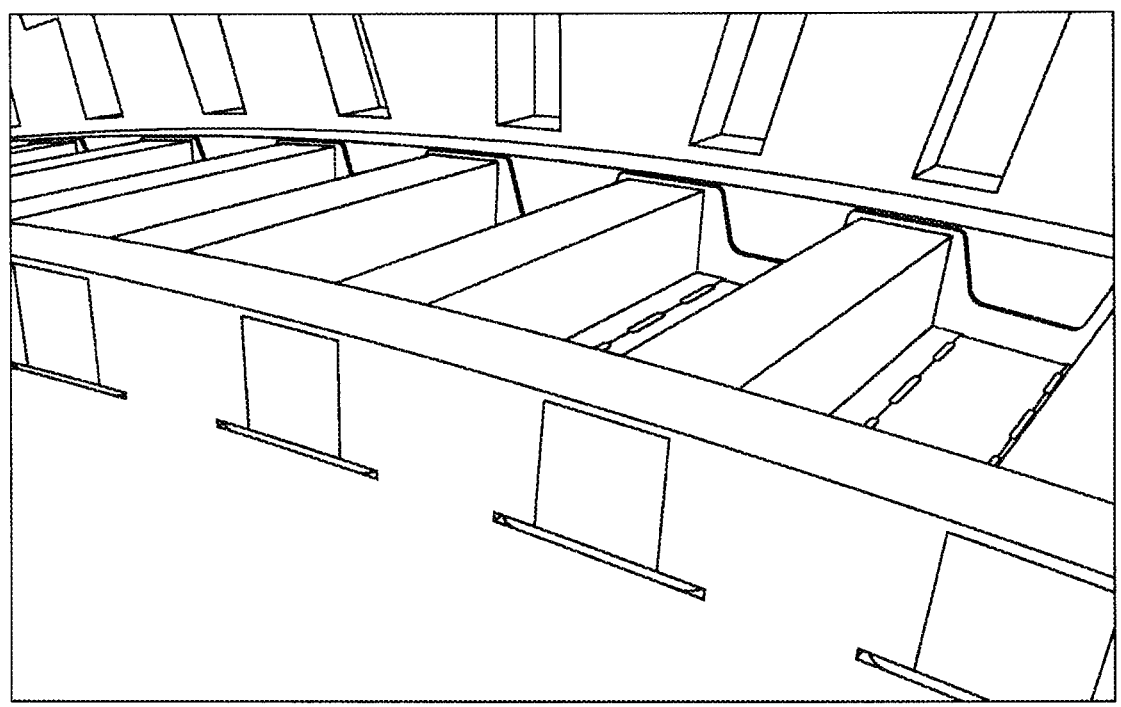
FIG. 13E is a view of rotor above one stator side with 31b and 31c in place and magnets 14.

FIG. 12 and item (31) in previous related application families U.S. Pat. No. 9,583,989B2 and U.S. Ser. No. 11/171,533B2, has widened tangs (31b) and (31c) and thus becomes (31x), widened to go underneath and undercut (31f and 31e) in the rotor (first plate and second plate proximal to wires) which is designed to retain item (31x) under the rotational centripetal forces on the rotor. (31x) has space created in the inside to hold the additional part (31d) which reaches around the tangs and around the magnets (14) to hold the magnets to (31x) and thereby hold the magnets to the rotor as shown in FIG. 13C. FIGS. 12F. 13A, 13C, 13D, 13E these items and installation. Item (31x) could be other shapes such as a single part on each side of a single magnet, as in FIG. 13A item (31d one position). The undercut that holds the magnetically conductive metal tang which the magnet retention hooks loops washers over, to hold the magnets down with the minimum decrease in the the magnetic gap between rotor and stator.

Figure 2O:
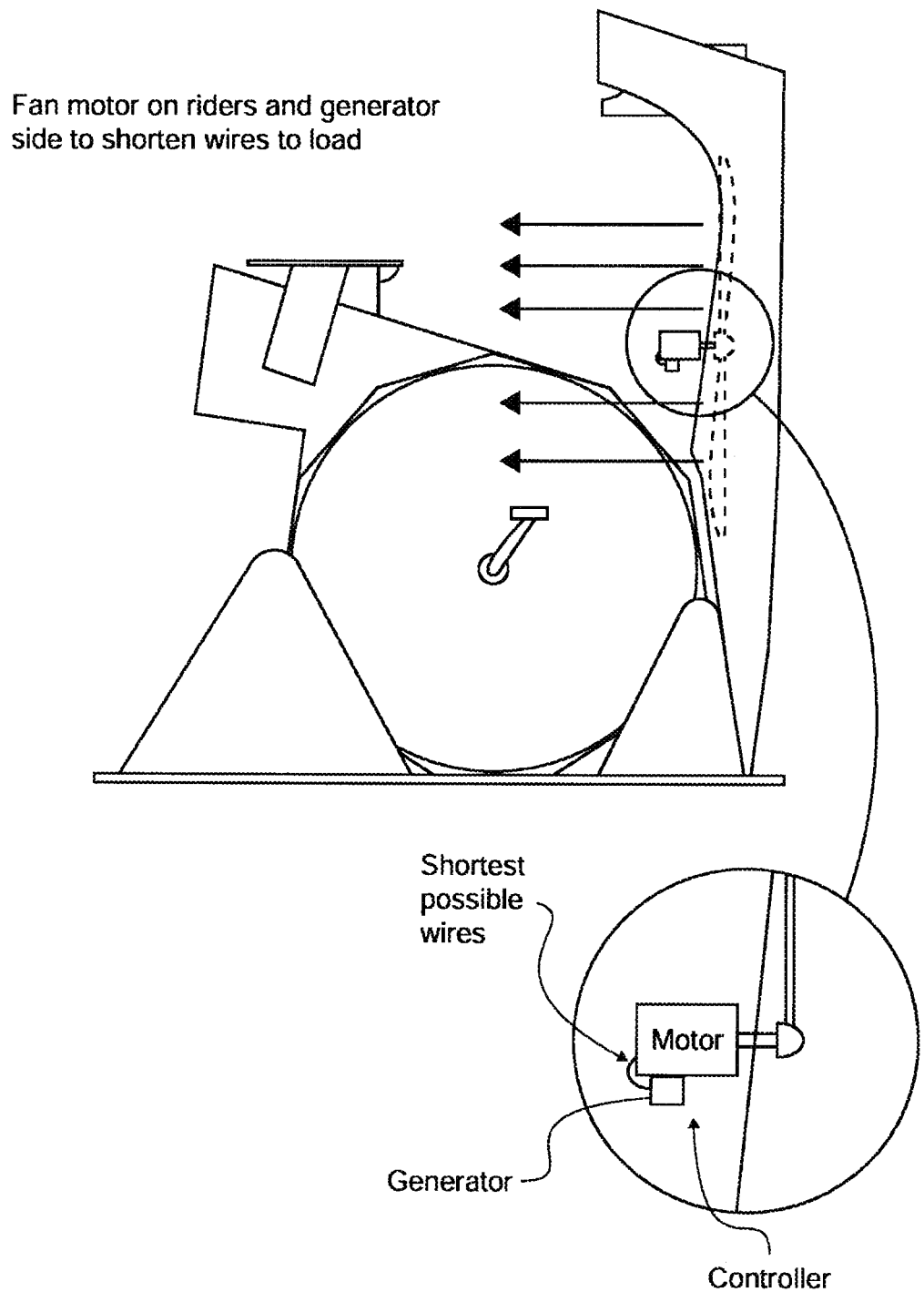
FIG. 2O is a view of an alternate placement where the motor for a fan is placed on the side of the rider.
Figure 2P:
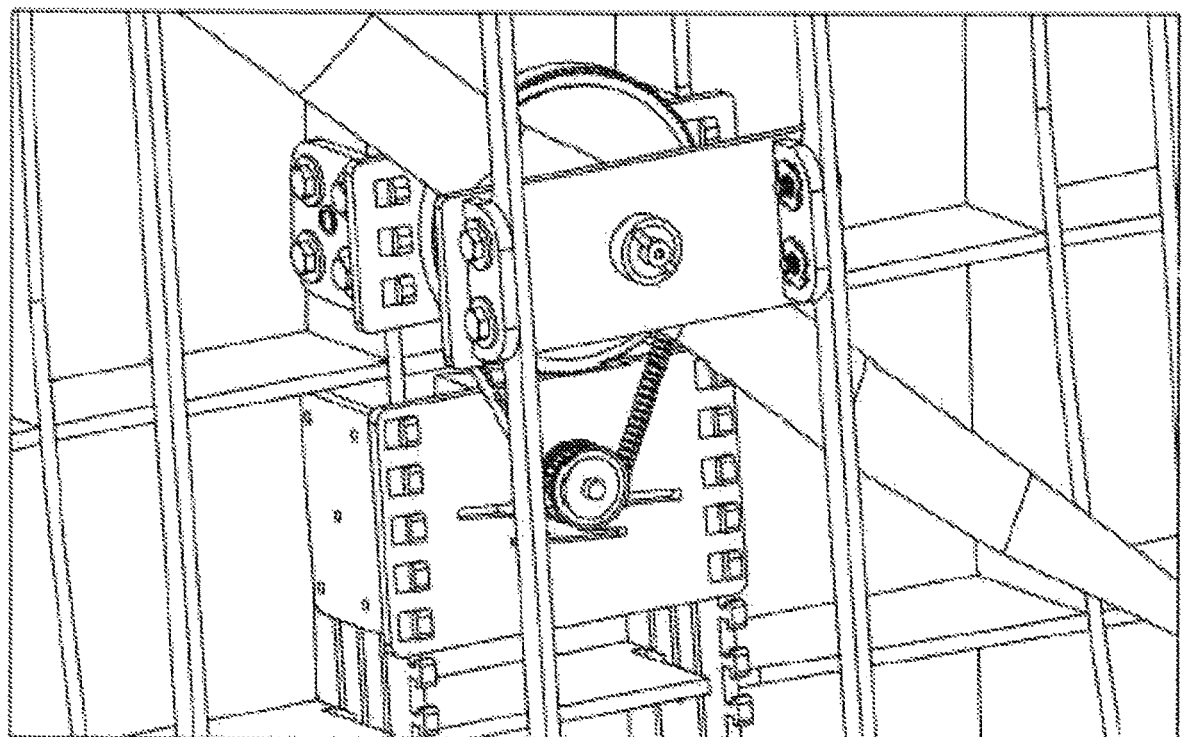
FIG. 2P is a view of close riders view of propeller drive where a motor is on the side opposite to the rider. A Speaker may be placed in center of fan to bring sound with wind instead of sound being drowned out by Fan and wind noise.
Figure 2Q:
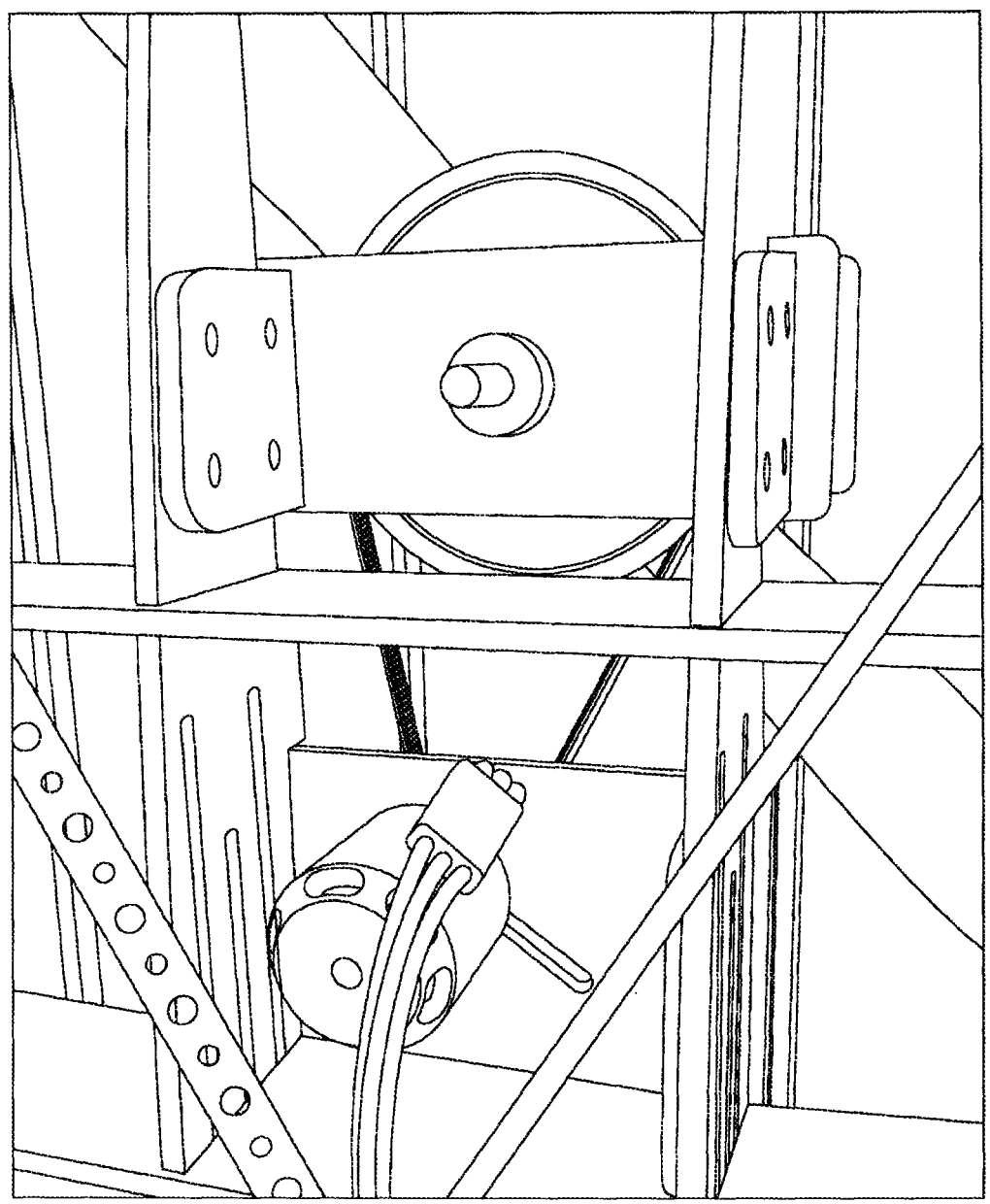
FIG. 2Q is a view from front side of a generator bike fan box 50 propeller drive of a fan box 50 (front as viewed from the outside, the opposite of the side of the of bike as seen by the rider).
Figure 2R:
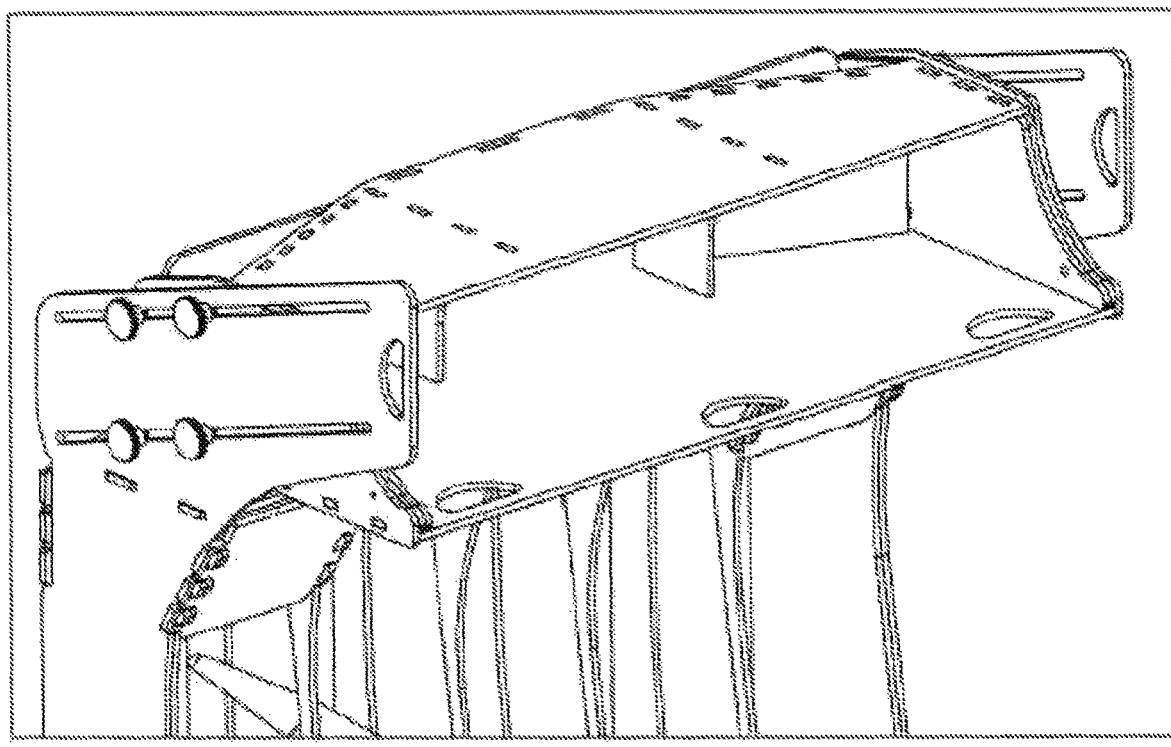
FIG. 2R is riders side ¾ view of Top of fan box 50 with table.
Figure 2S:
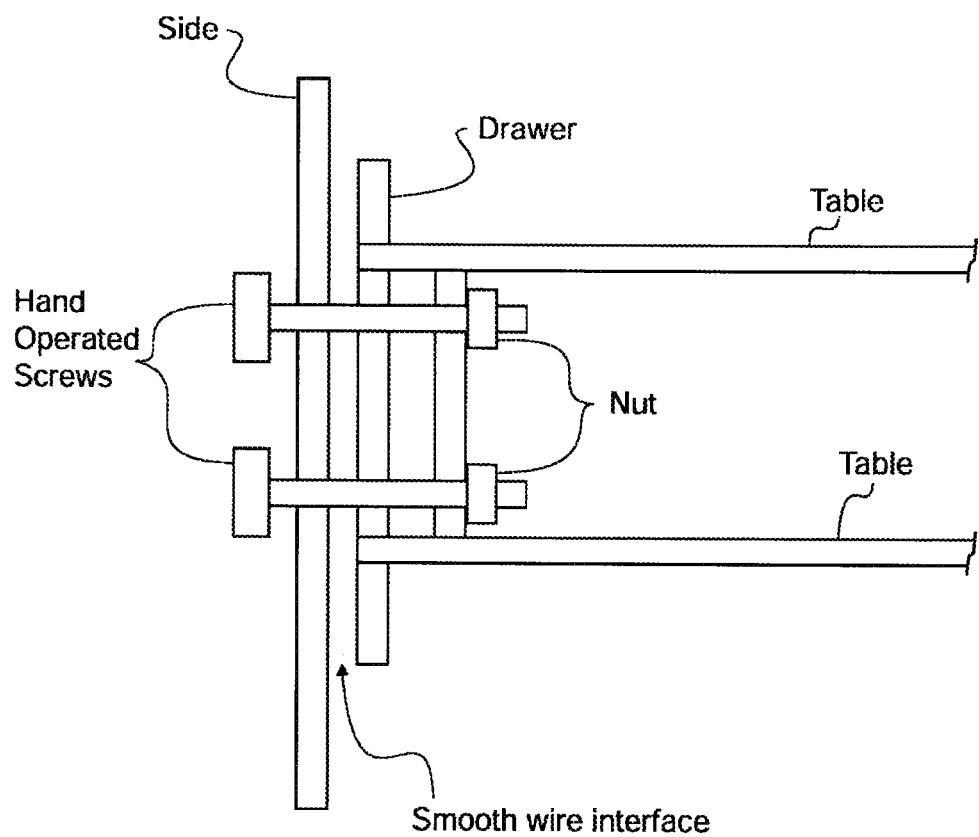
FIG. 2S is a drawing of section of adjustment method.

FIG. 2O discloses a motor for a fan on the side of the rider. See provisional application no. 63/183,039 drawing FIG. 1C30 for a view of fan cooling the rider, user, or human. FIG. 2O shows an alternate position of the motor for the fan on rider side of the propeller. It is preferred that all conductors (e.g., power cables/cords) are short (e.g., as short as possible, less than 40 inches, 30, 20, 15, or less than 10 inches, etc.). The motor is ideally positioned to accomplish this, rather than on the previously shown side of the rotor as in drawing FIG. 2O referenced above.

Figure 2T:
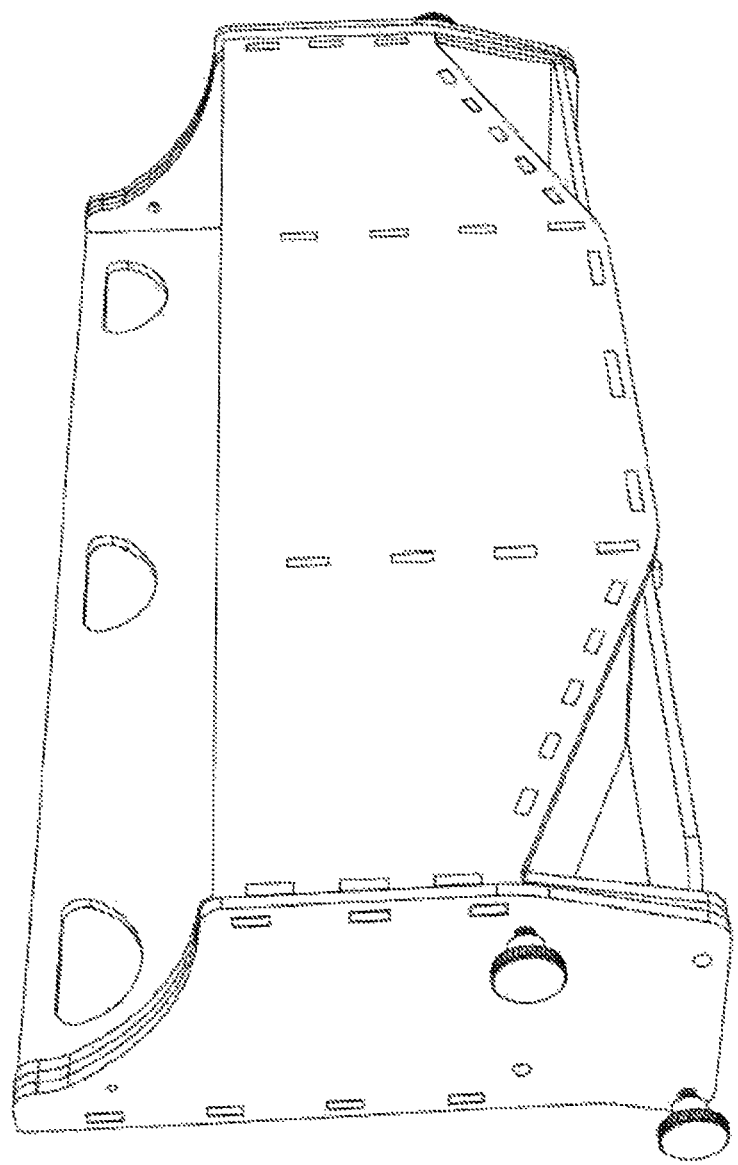
FIG. 2T is table structure top view.
Figure 2U:
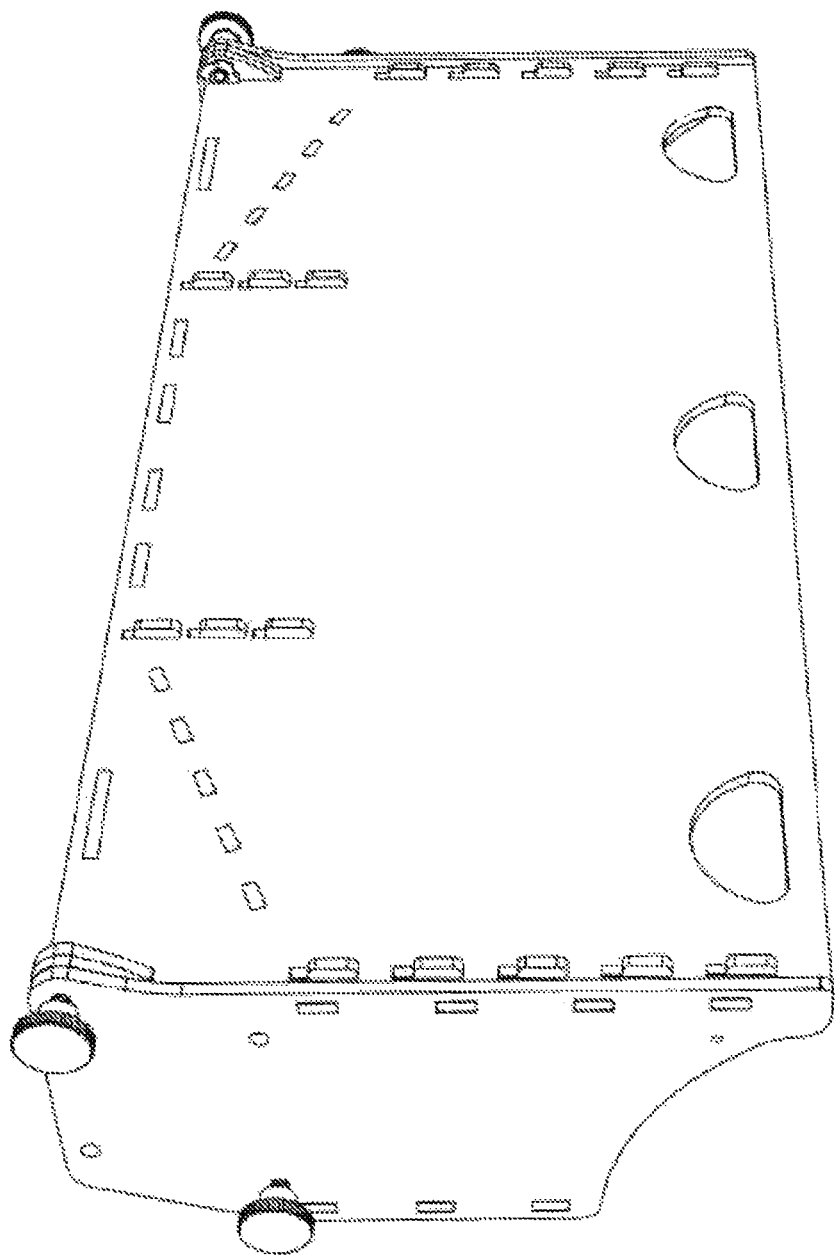
FIG. 2U is a table structure bottom view.
Figure 2V:
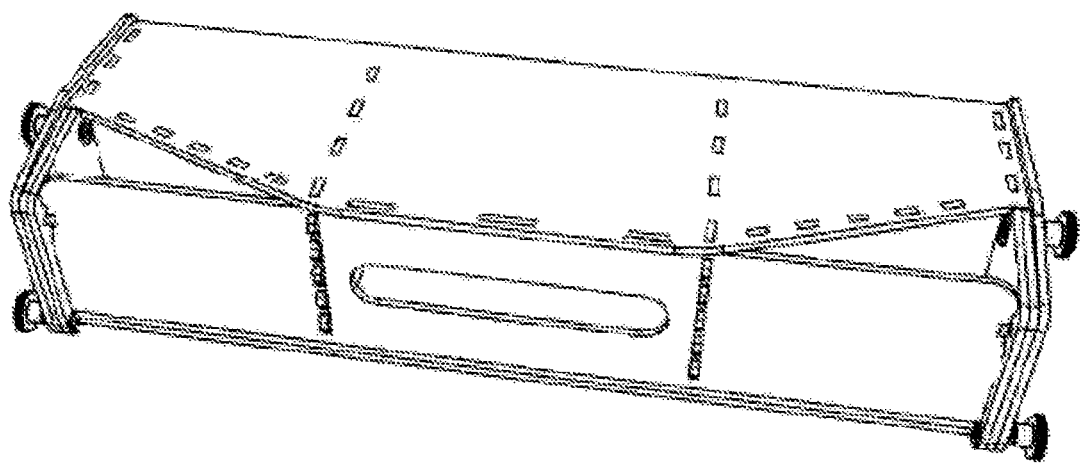
FIG. 2V is a table structure opposite from riders view, bike front view.
Figure 2W:
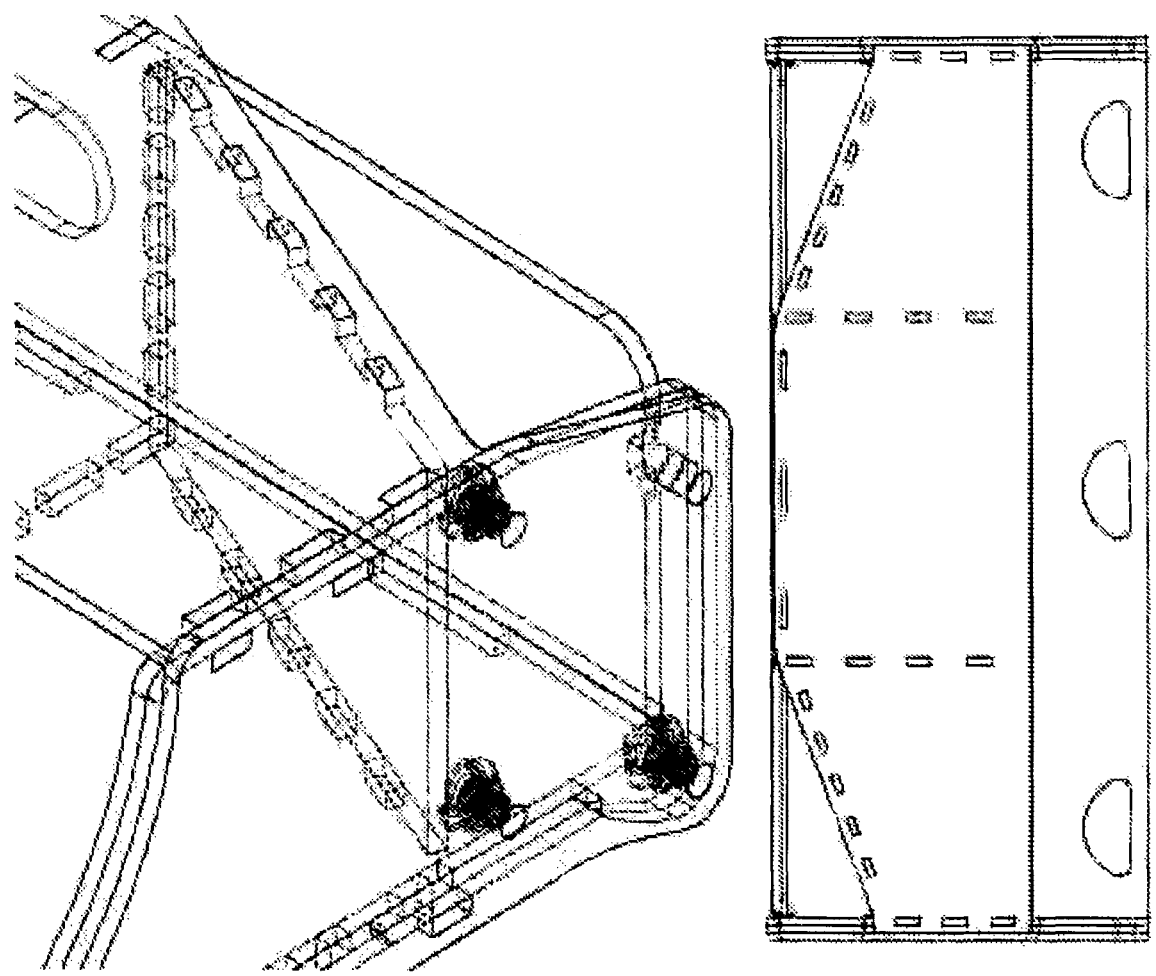
FIG. 2W is a detail of table edge layers and storage bin see thru drawing.
Figure 2X:
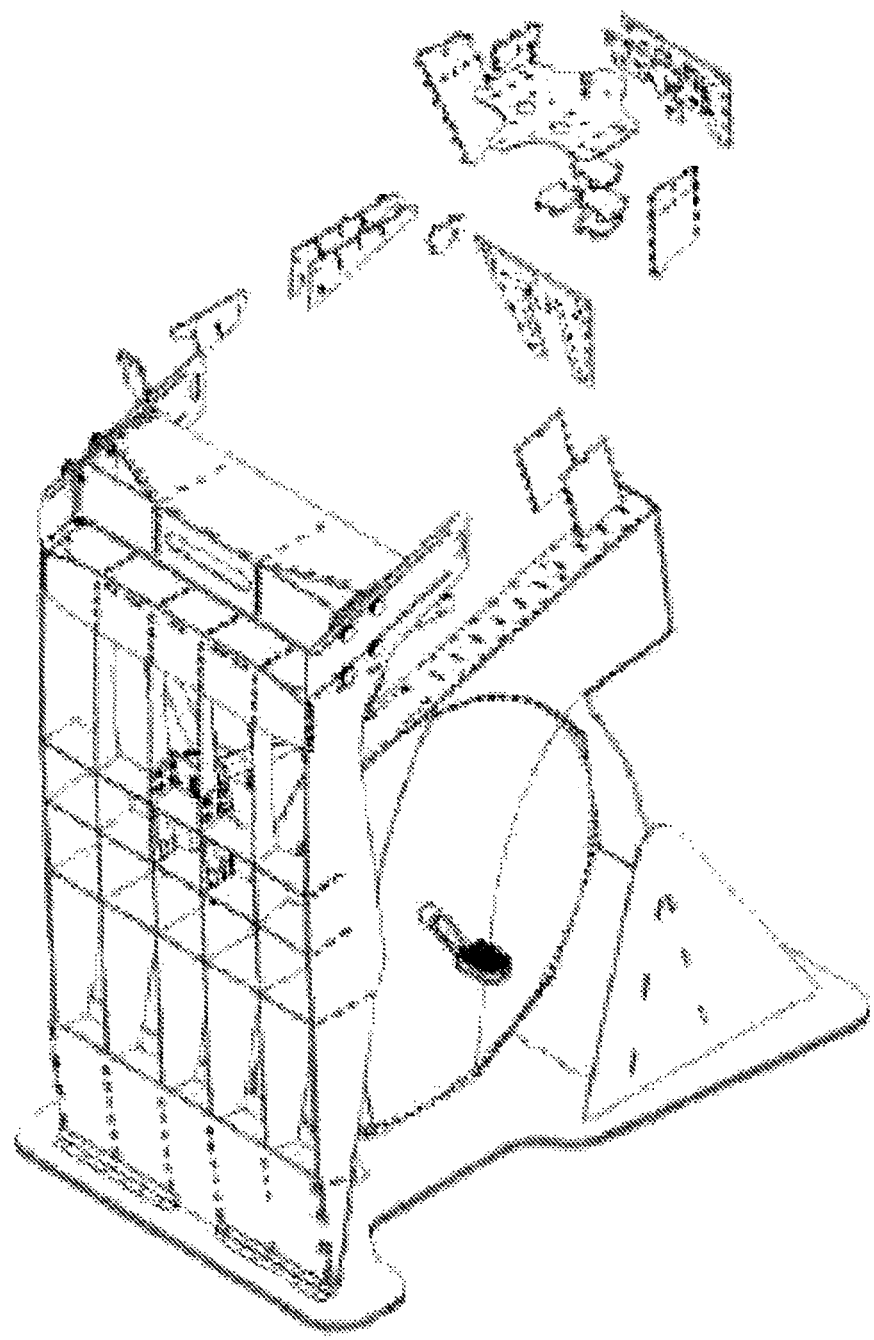
FIG. 2X is a view of a basic Seat ver2.1 exploded above bike drawing with seat.
Figure 2Y:
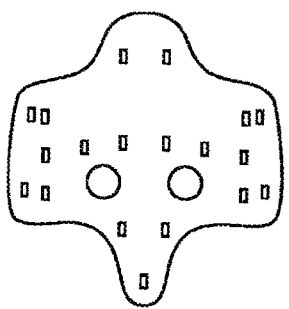
Figure 2Z:
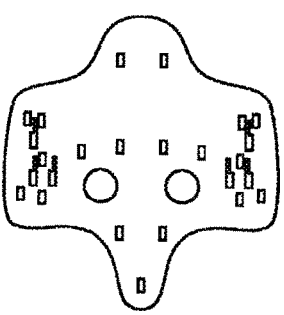
FIG. 2ZZ is a view of a seat raiser pieces, shorter partially installed, taller fully installed.
Figure 2A:
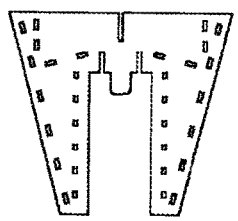
Figure 2B:
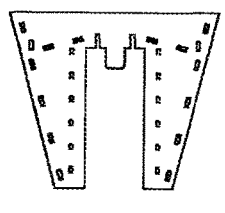
Figure 2C:
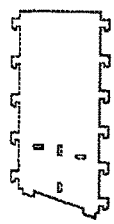
Figure 2D:
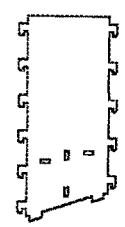
Figure 2E:
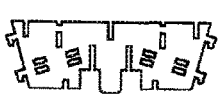
Figure 2F:
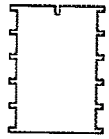
Figure 2G:
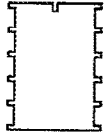
Figure 2H:
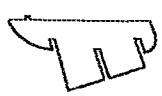
Figure 2I:
Figure 2J:
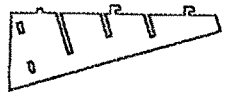
Figure 2K:
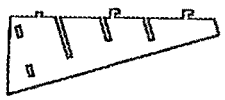
FIG. 2K is a view of an opposite twisting rotation lock to floor.
Figure 2L:
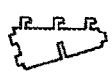
FIG. 2L is a view of a side lock with pin to floor.
Figure 2M:
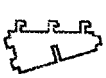
FIG. 2M is a view of an outward/inward lock gravity splay, of the generator with the sides of 1C10 pressing down into the floor to achieve a lock.
Figure 2N:
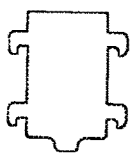
Figure 2O:
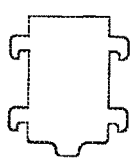
Figure 2P:
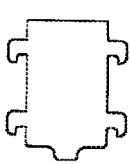
Figure 2Q:
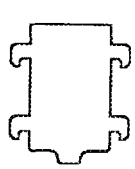
Figure 2R:
Figure 2S:
Figure 2T:
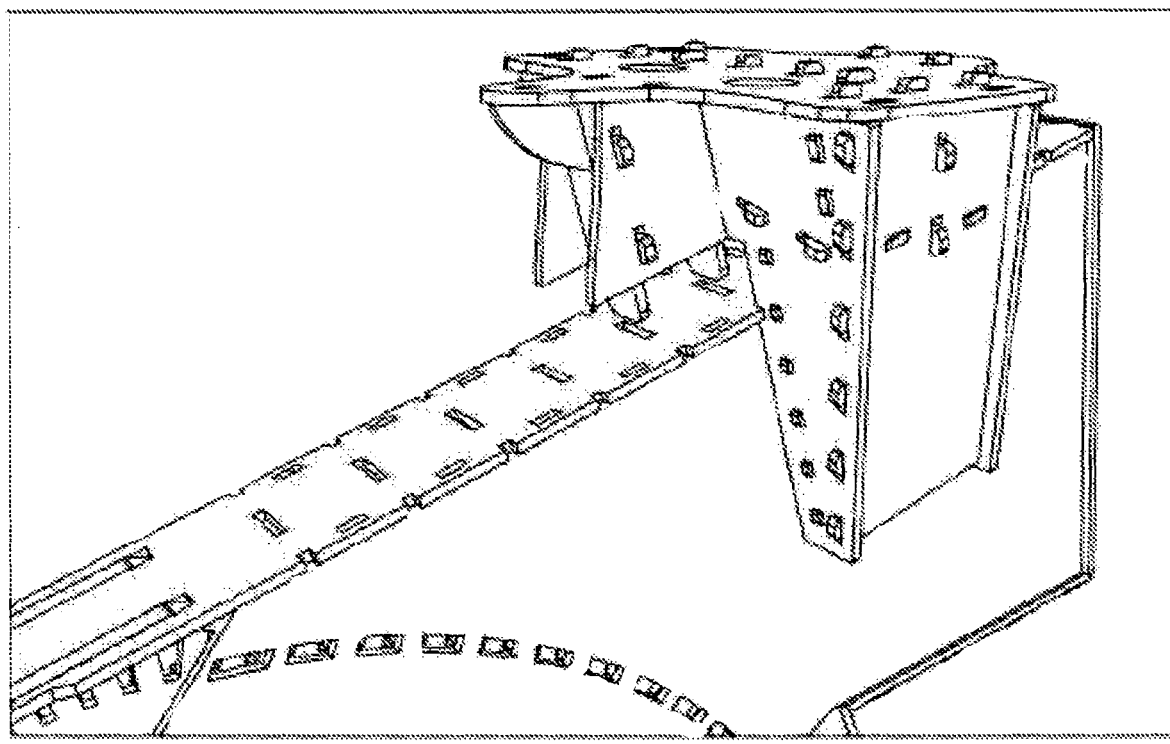
Figure 2U:
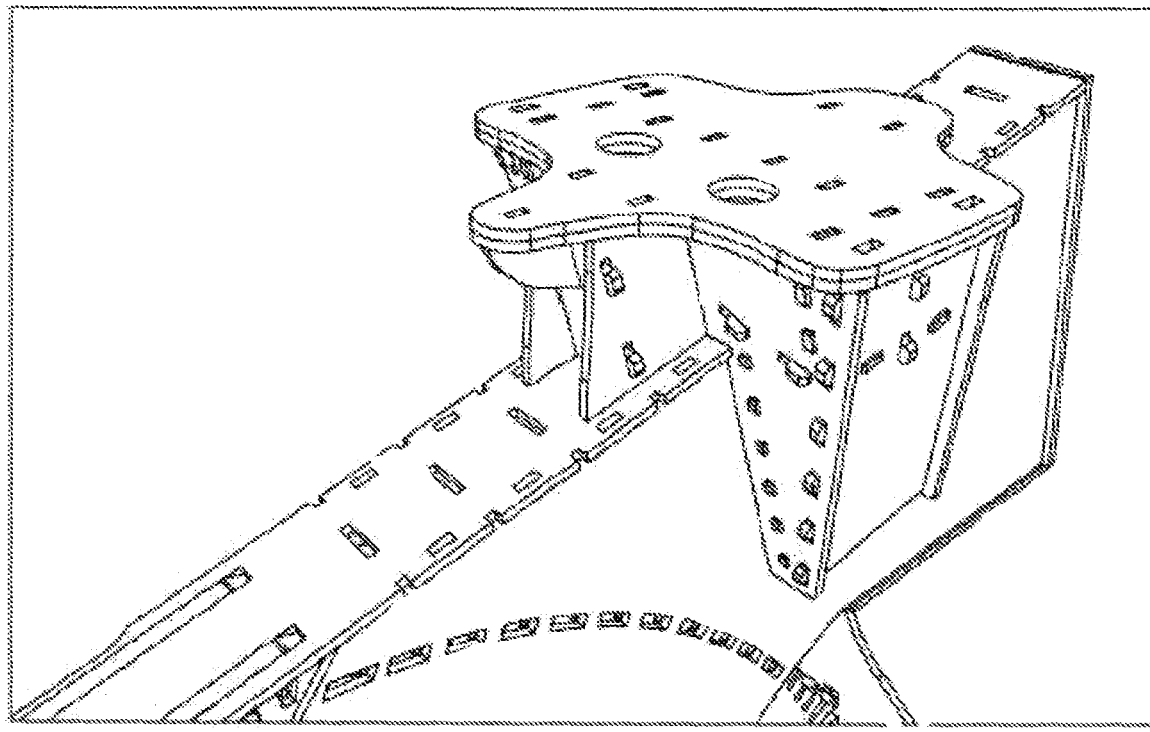
Figure 2V:
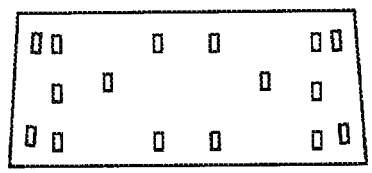
Figure 2W:
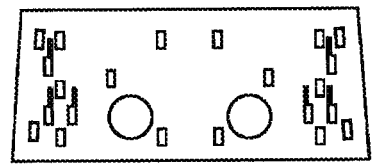
Figure 2X:
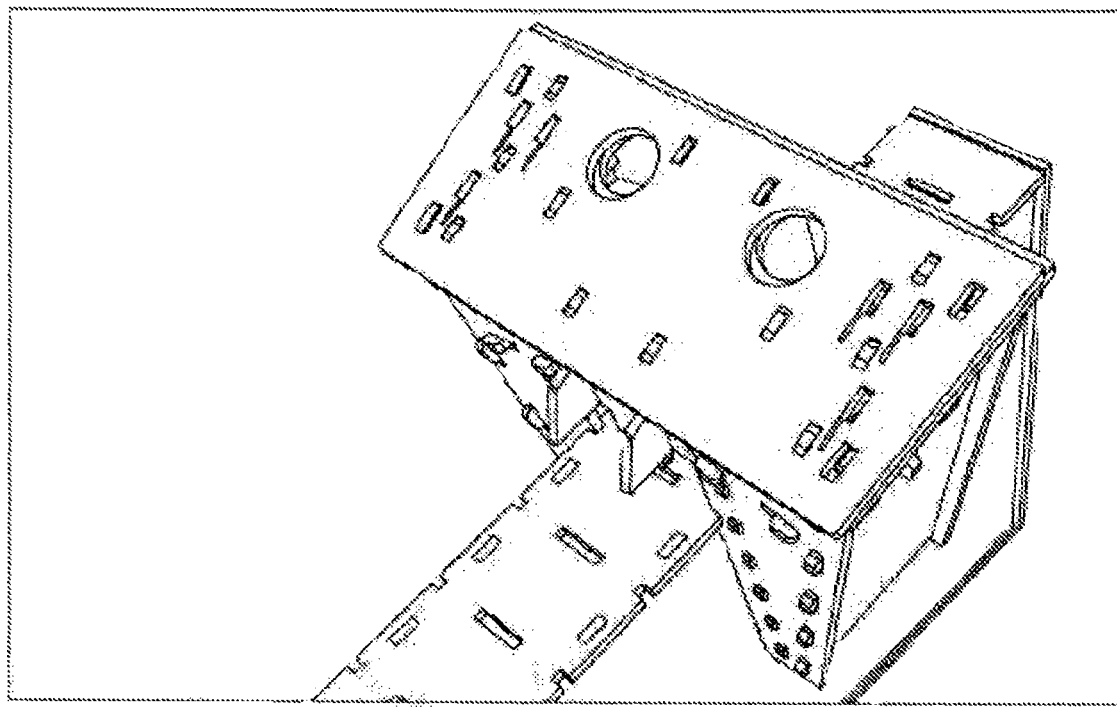
Figure 2Y:
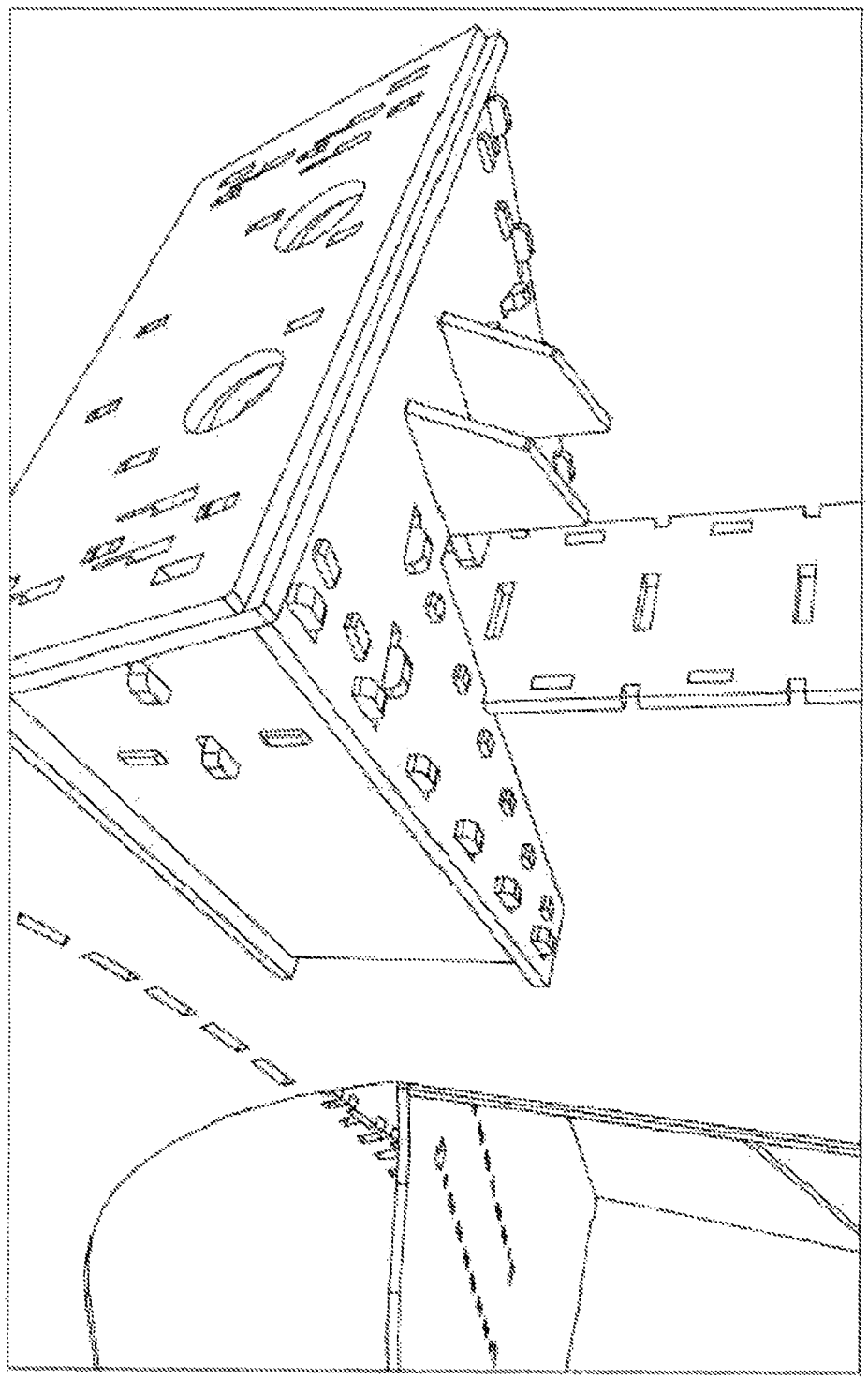
Figure 2Z:
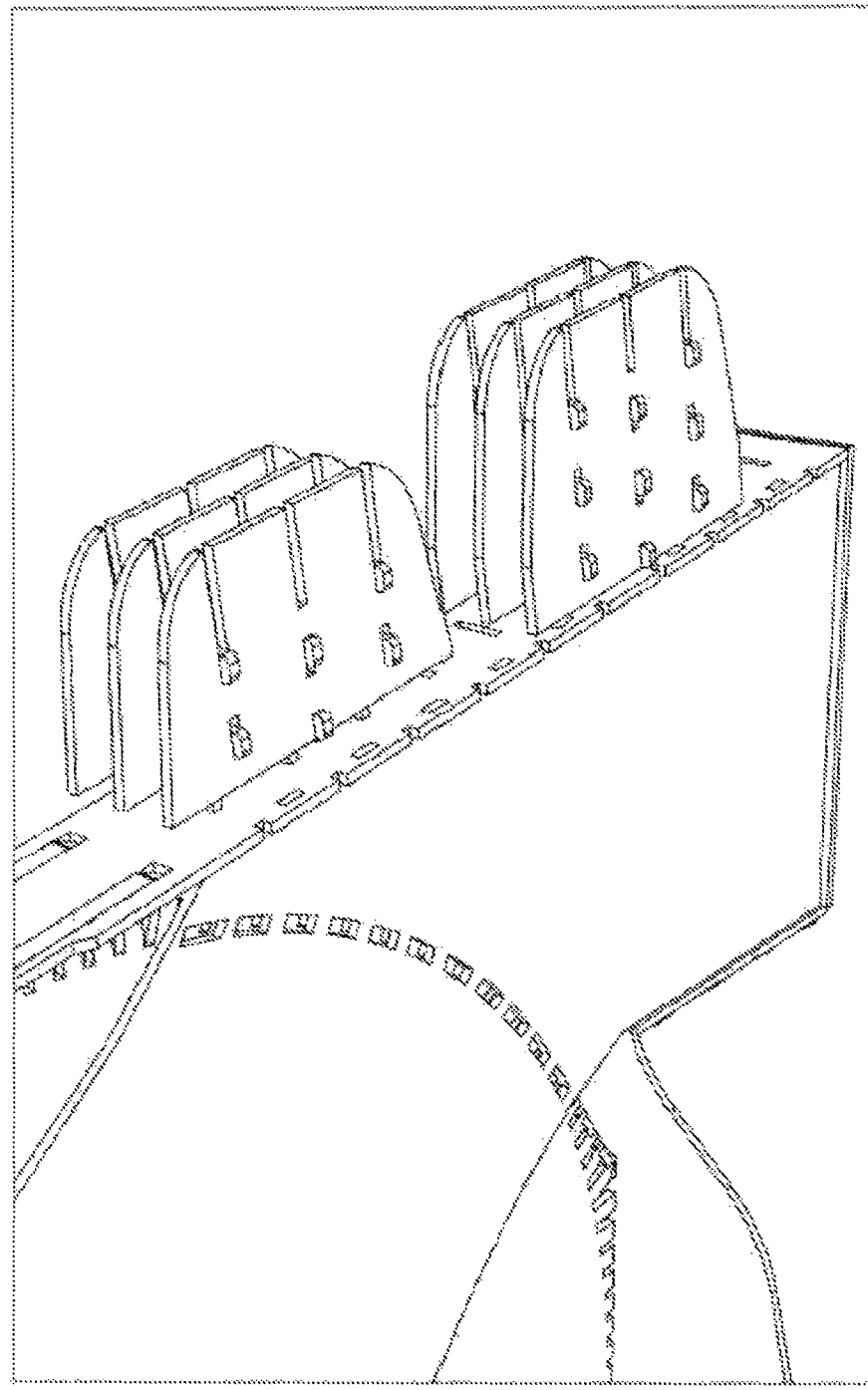
Figure 3A:
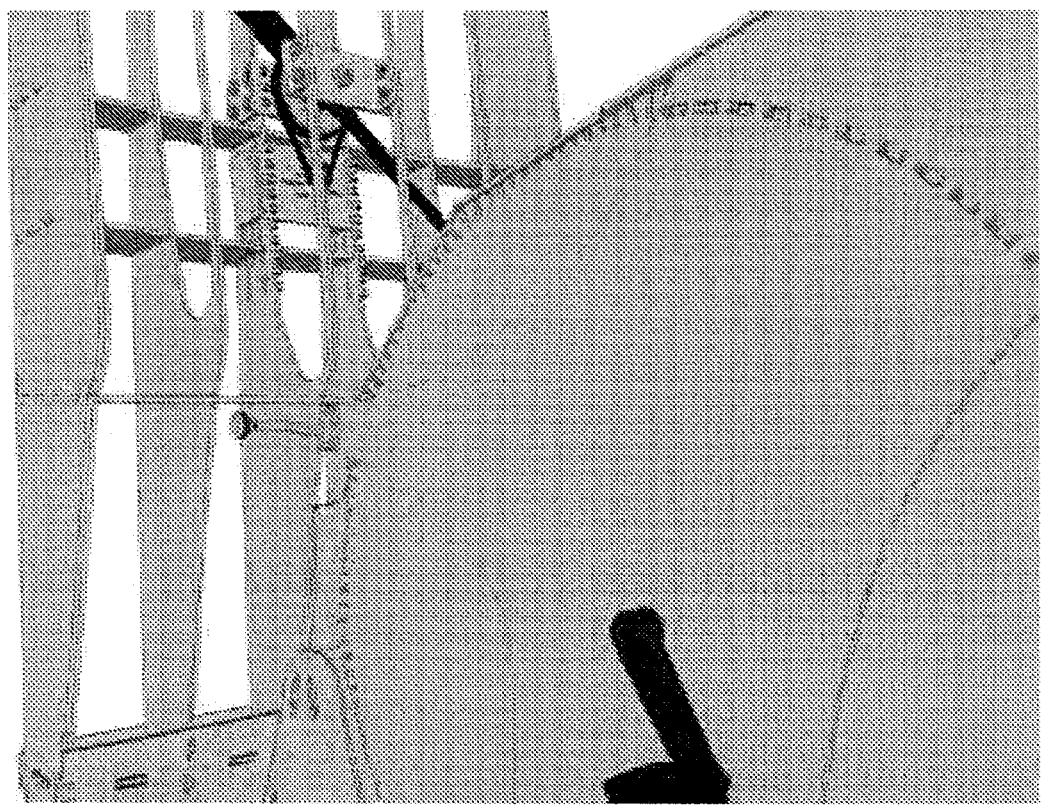
FIG. 3A is a view of a protrusion attachment adjustment to fan box drawing.
Figure 3B:
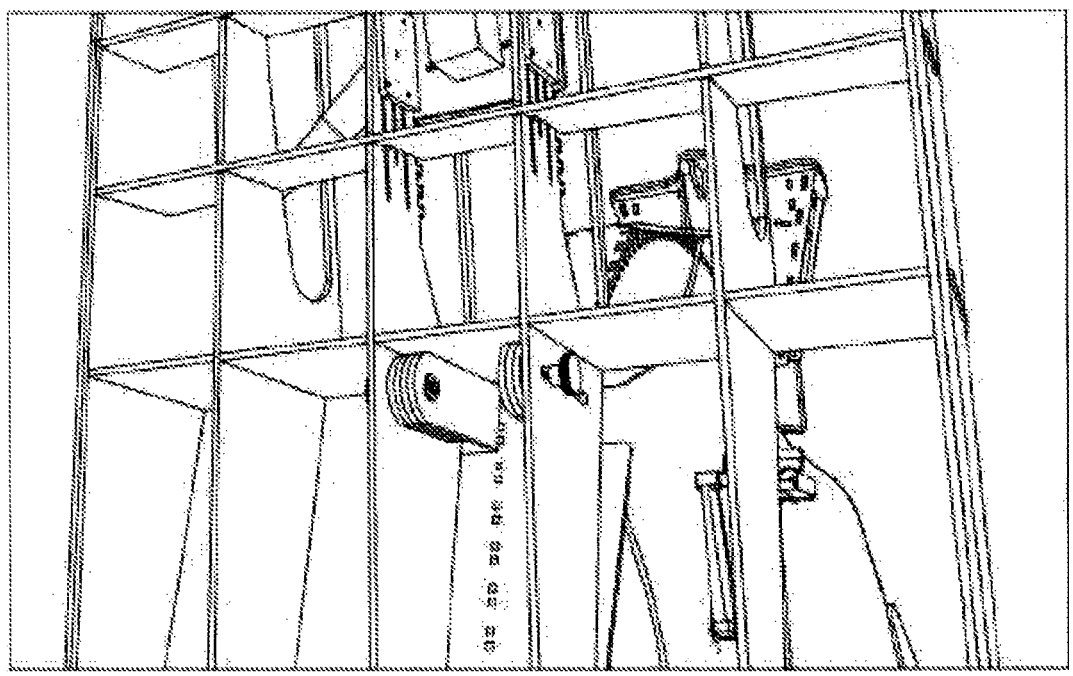
FIG. 3B is a view of a protrusion attachment adjustment to fan box drawing view front.
Figure 3C:
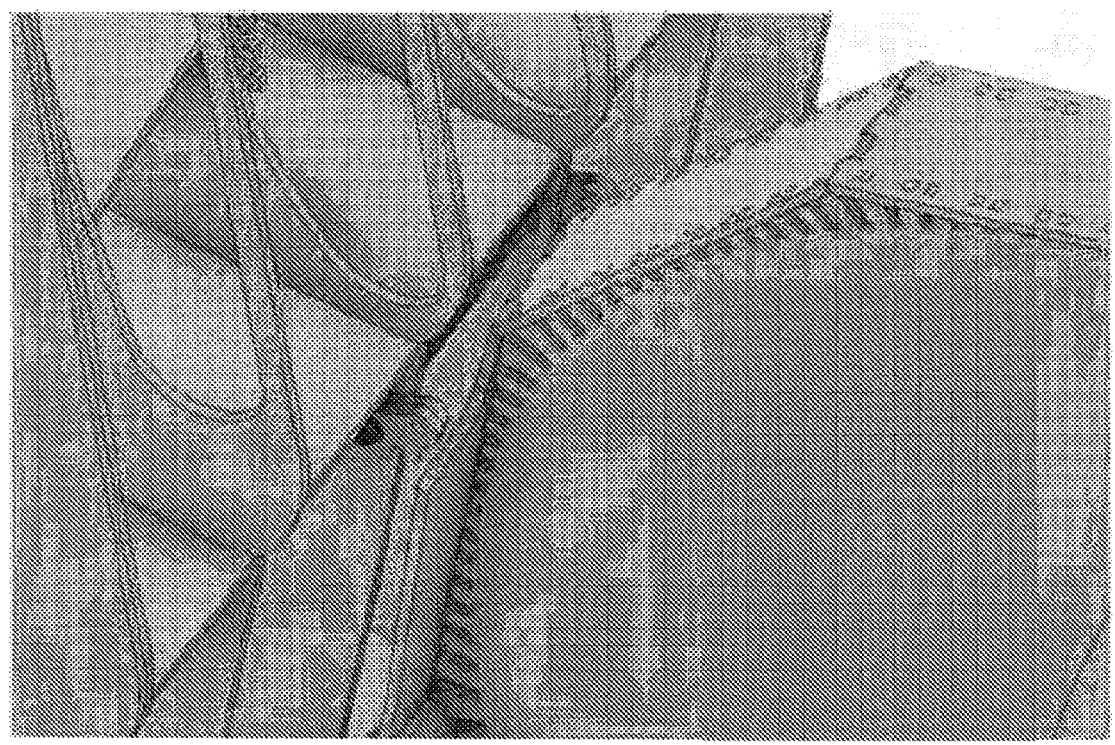
FIG. 3C is a view of an alternative hooks to piece 7n-9-10 FRONT-OUTER-PANEL.
Figure 4:
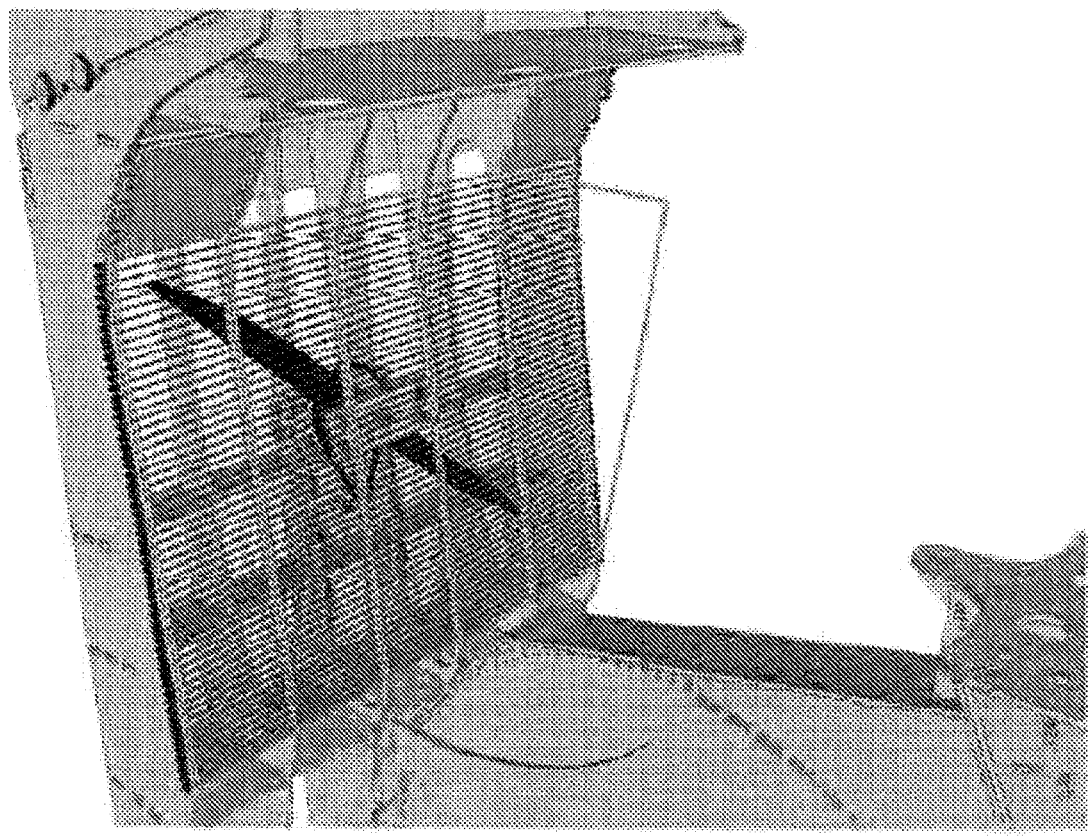
FIG. 4 is a view of a fan protective slats drawing.
Figure 5:
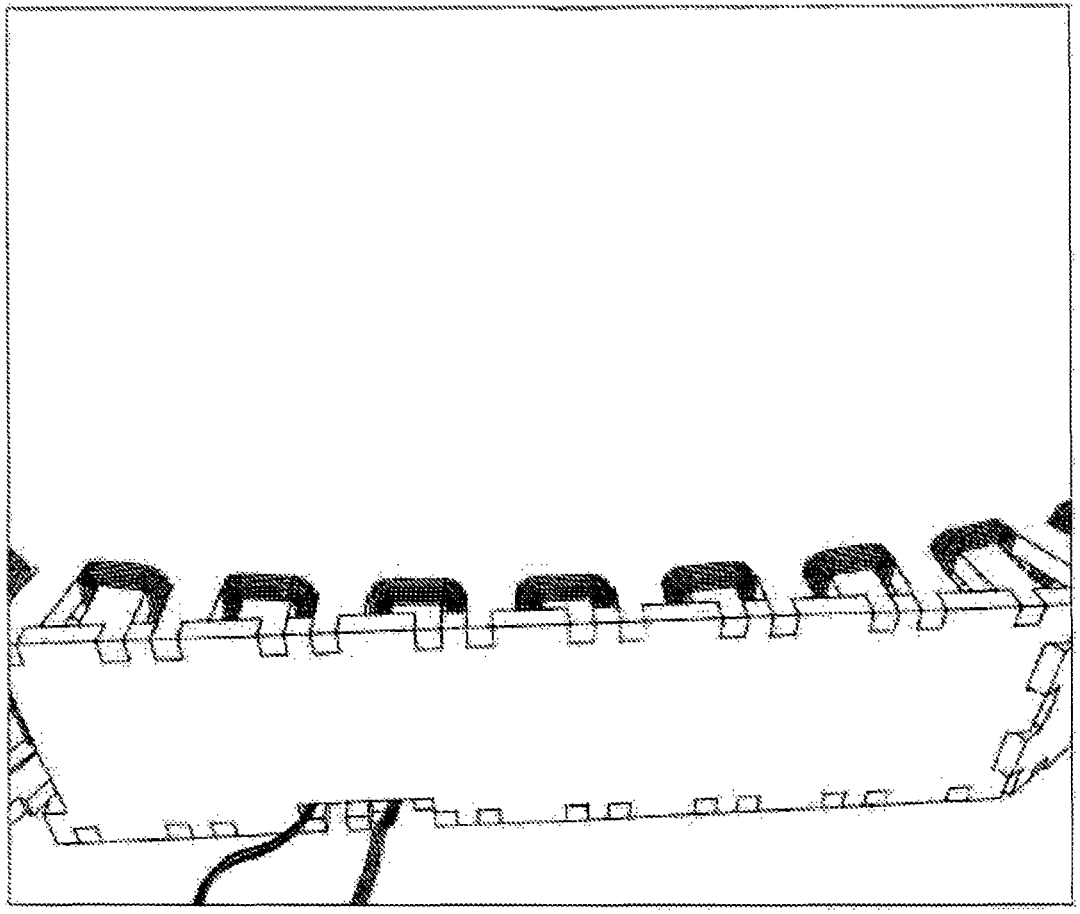
FIG. 5 is a view of 7d-21-3-TOP-H-CAP-WO/T.

FIG. 2T Table Tops—Utility tables are placed where in the area where traditional handlebars on a bike would be located, as depicted in the figures. In two-tiered embodiments, the top layer is preferably high enough over the lower layer to accommodate writing or drawing on the lower layer, or to otherwise hold equipment or tools for working or entertainment. For example, FIG. 2T shows a table design to accommodate setting up of phones and tablets with remaining space for laptops. This design can be attached to the bike device or placed freestanding upon a table or flat surface of the bike.

Figures depicts further embodiments of utility tables of the inventive subject matter. Similarly, Figures shows a table design to accommodate setting up of phones and tablets with remaining space for laptops, with a freestanding stand table, with the lower table used primarily for storage or keyboards. Some embodiments are further modified to accommodate additional devices, for example including holes to fit rabbit ear antennas of a device, or holes on both sides of the table of the size to allow fractional pointing of rotatable antennas for portable televisions or other wireless communication devices.

Other fan table accessories are contemplated. Cooling the exercising person and giving the exercising person access to simultaneous control of fan cooling and of a table to do things (e.g., with electrical power) to utilize mental inputs and output devices is desirable. In such cases, energy is more likely to be consumed than generated, and no method of energy generation is supplied. The framework of the table is designed to hold commonly available grid powered fans. User control would be provided remotely on the desk/table by a method that allows the common fan to start properly with full power and decrease in power after a time (e.g., default or user defined) at full power, or a switched between full power or off.

Rider's side electronics or controls or boxes can be placed in the prop center. In such embodiments, a box in this area does not block the wind (e.g., at center/head of prop), and allows direct access to the generator wiring (accommodating short conductor/wires). In embodiments where the motor is on the rider's side as well (e.g., FIG. 2T) then access to the fan motor inputs have the least copper/conductor losses.

Diagonal mesh can be used to cover/protect the prop, in some embodiments improving shear stiffness. Any mesh, grill, netting, or similar could be attached diagonally to stiffen the frame. Cut outs or arches can further be added to improve air flow from the fan. For example, arch like opening shapes designed to un-block the propeller to improve airflow can be used.

Figure 10F:
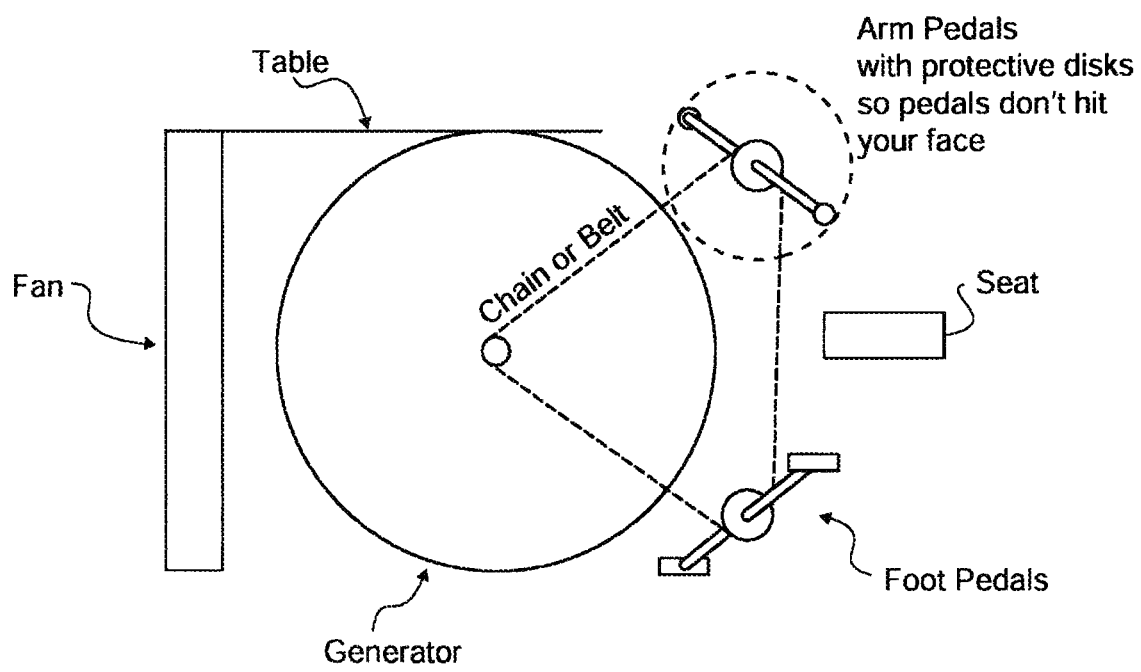
FIG. 10F is a view of an arm and pedals behind Generator on shared chain (with reference to Provisional 63/291,394).

In some embodiments (e.g., FIG. 10F) arm and pedals behind the generator are on a shared chain. FIG. 10F shows the functional architecture and locations of an arms and legs shared drive where the human is upright and seated behind the generator with fan for cooling and table for mental interaction devices.

Figures 10G, 10H:
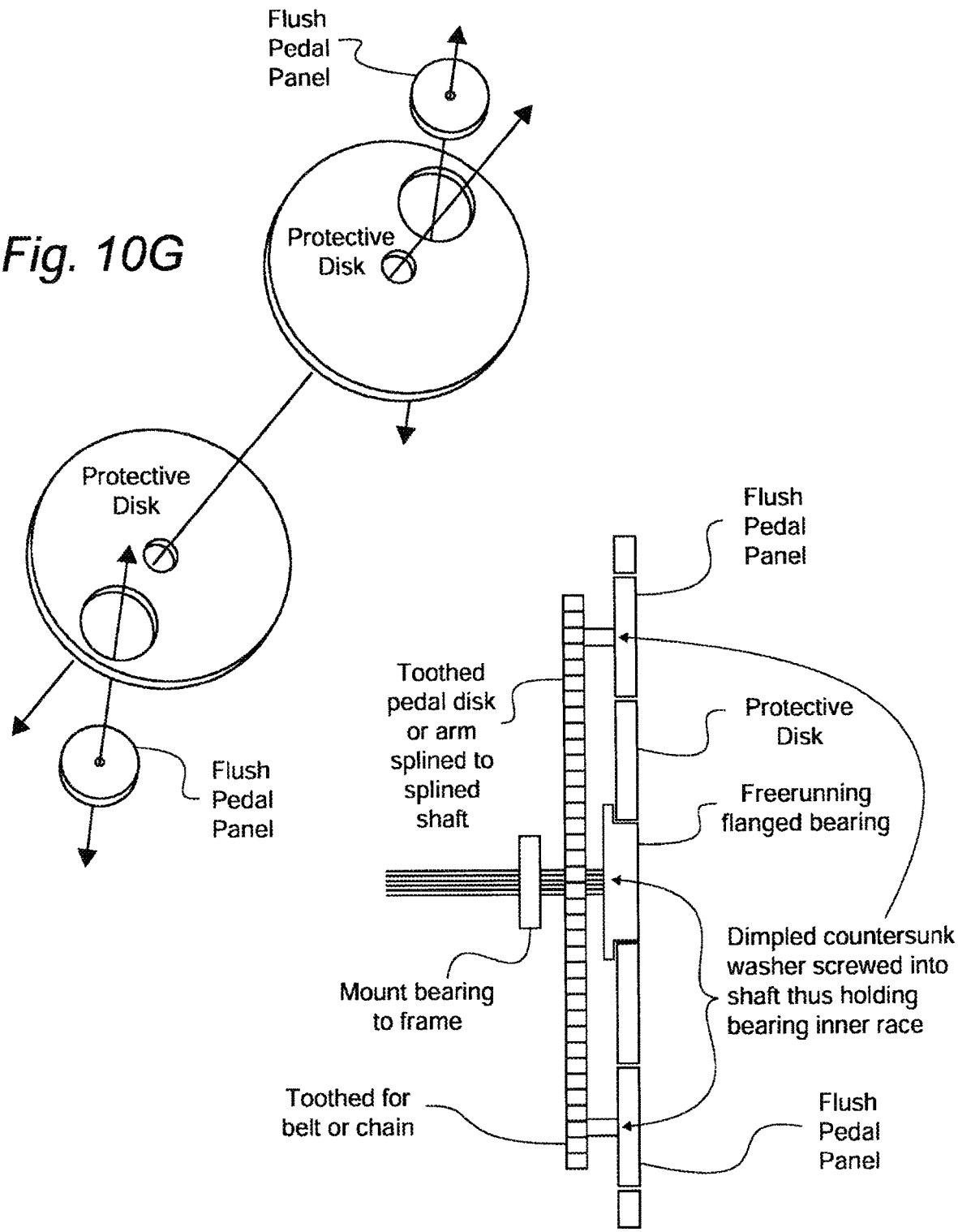
FIG. 10G is a schematic side semi sectional diagram of flat hand handle arm pedals and hand protections.
FIG. 10H is a sectional diagram of the arrangement of FIG. 10G shafts and bearings of flat hand arm pedals and protections.
Figure 10I:
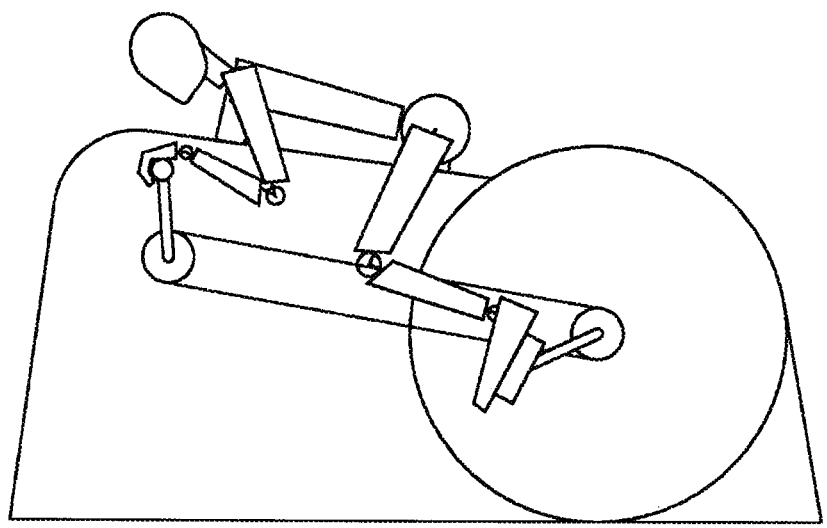
FIG. 10I is a view of an arrangement of FIG. 10G and FIG. 10H arm pedaling with leg pedaling in a face down configuration.
Figure 10J:
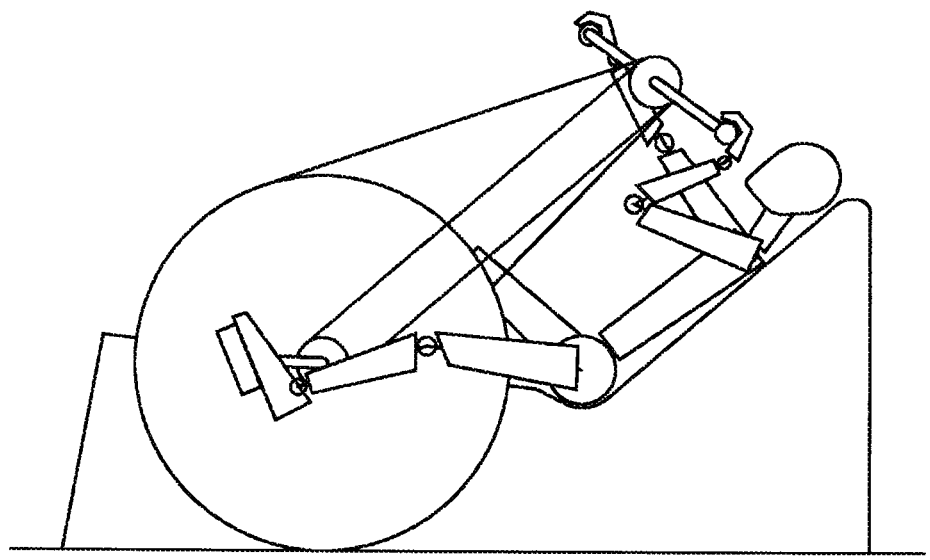
FIG. 10J is a view of an arrangement of FIG. 10G and FIG. 10H arm pedaling with leg pedaling in a face up configuration.

FIG. 10G depicts an exploded diagram of flat pedals and protections. The view shows the hand pedal panel faces which the rider's hand presses inward on or holds to apply friction and spin the generator. These pedals are within and flush with a protective disk. The purpose is to avoid any protrusion of a spinning object which could strike the rider or nearby person. Viewed from another perspective, FIG. 10G shows an arm operated rotating exercise that prevents pedals from hitting the user in the face and avoids the machine driving your arms into injury, with the added exercise feature of effort inward against the flat pedal disks.

FIG. 10F depicts a sectional detail diagram of the arrangement of 4D9c shafts and bearings. This shows one side of the arm drive in sectional detail. In this embodiment, each pedal has an arrangement of a free running flanged bearing that is similar to the larger protective disk and fixed to the toothed on untoothed pedal disk that is fixed to the main splined shaft. It is also possible for the pedal to be fixed to a shaft that rides in a free running bearing in the pedal disk.

Figure 10K:
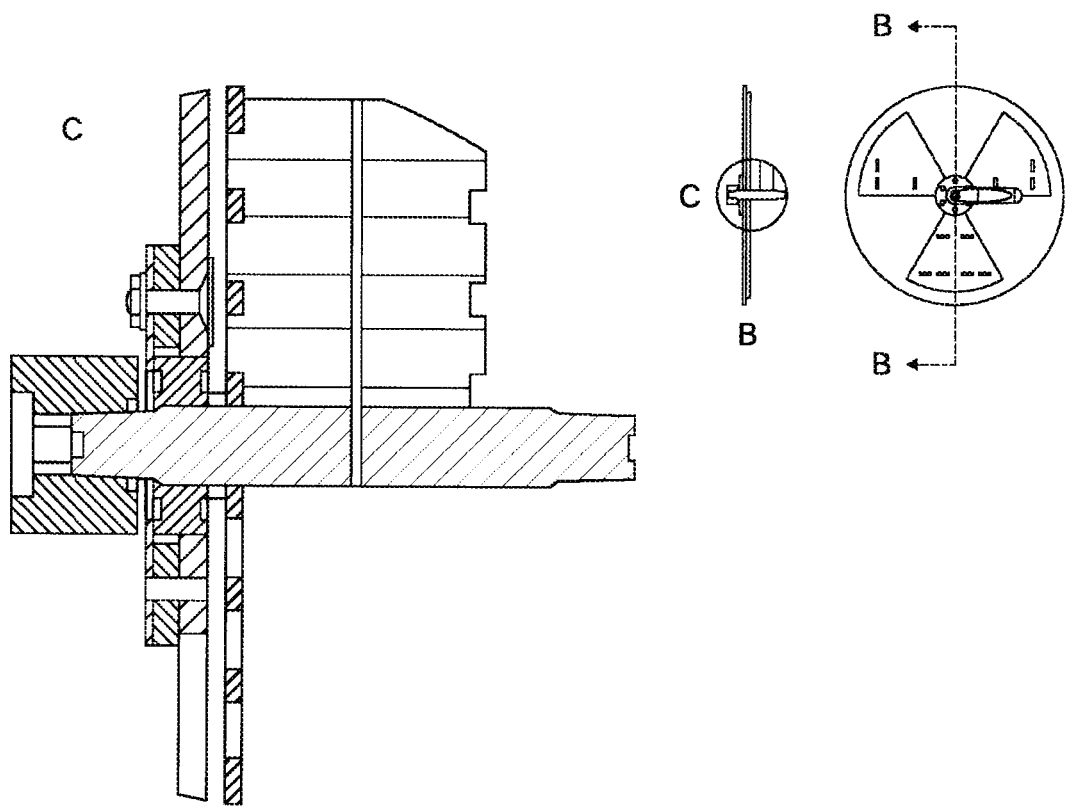
FIG. 10K a sectional view of one half of an axle assembly.
Figure 10L:
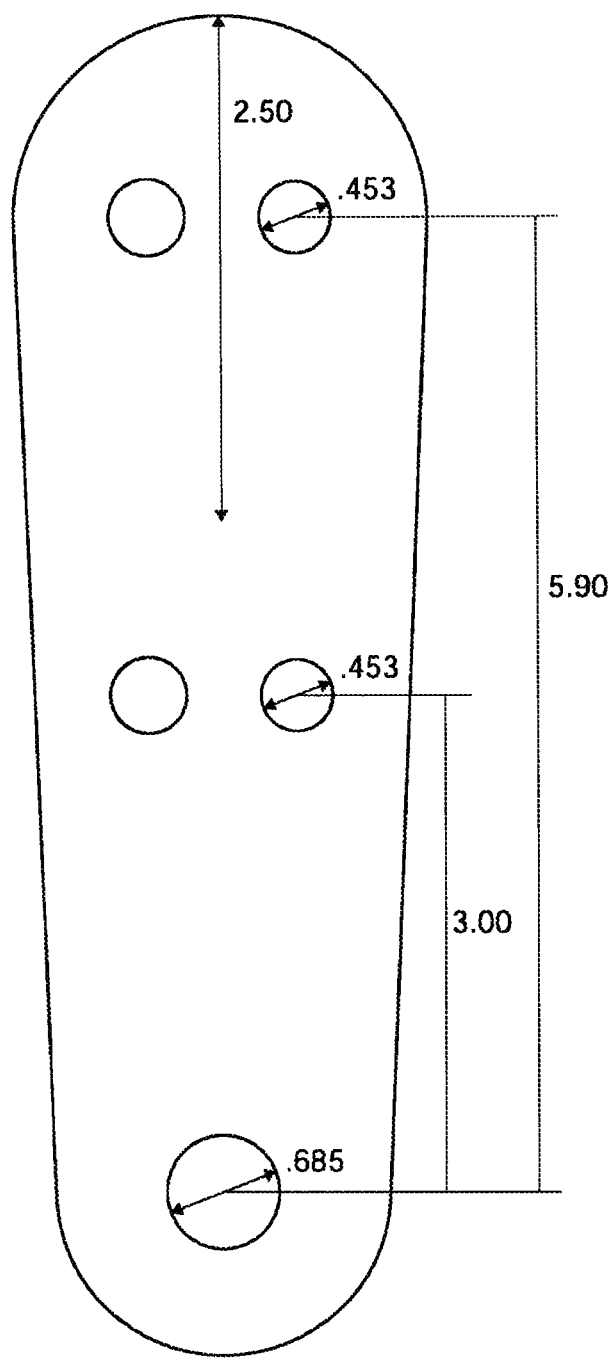
FIG. 10L is a view of an example pedal arm.
Figure 10M:
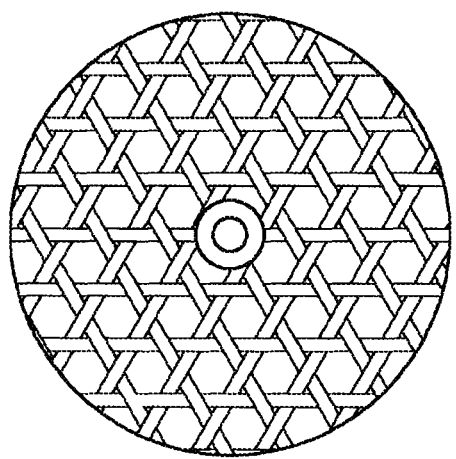
FIG. 10M is a view of a Triaxial Fill.

FIG. 10K is a sectional view of one half of an axle assembly resulting in pedal arms not contacting the retaining plate screws, accomplishing prestress of the number six pieces by over sizing the stack inside and clamping from the outside, between the rotor and inner race of the bearings and clamping from the outside on the outer race of the bearing with a plate on rotor sides spacing the pedal away from the inner bearing race by the pedal arm on washers that touch the inner race of the bearings clamped shut by screw and washer threaded into the axle on each side.

Figure 11A:
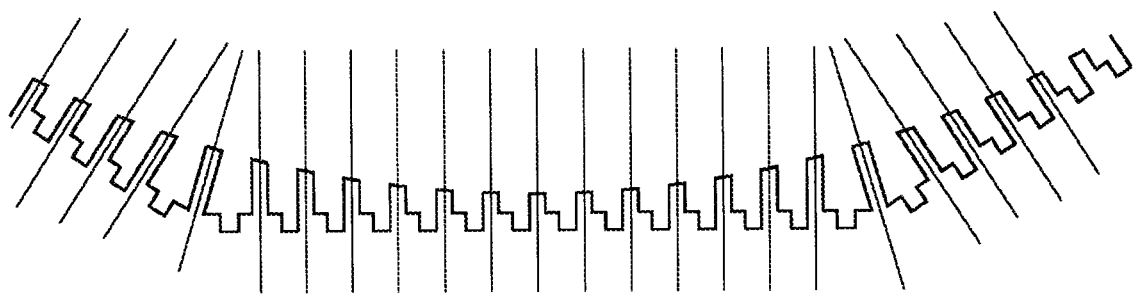
FIG. 11A is a view of a normal versus radial slot alignment.
Figure 11A:
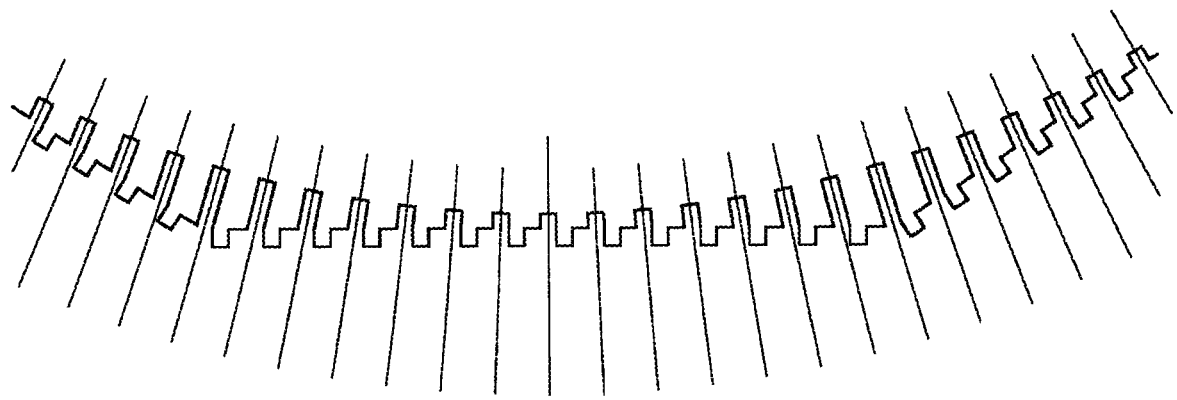
Figure 11B:
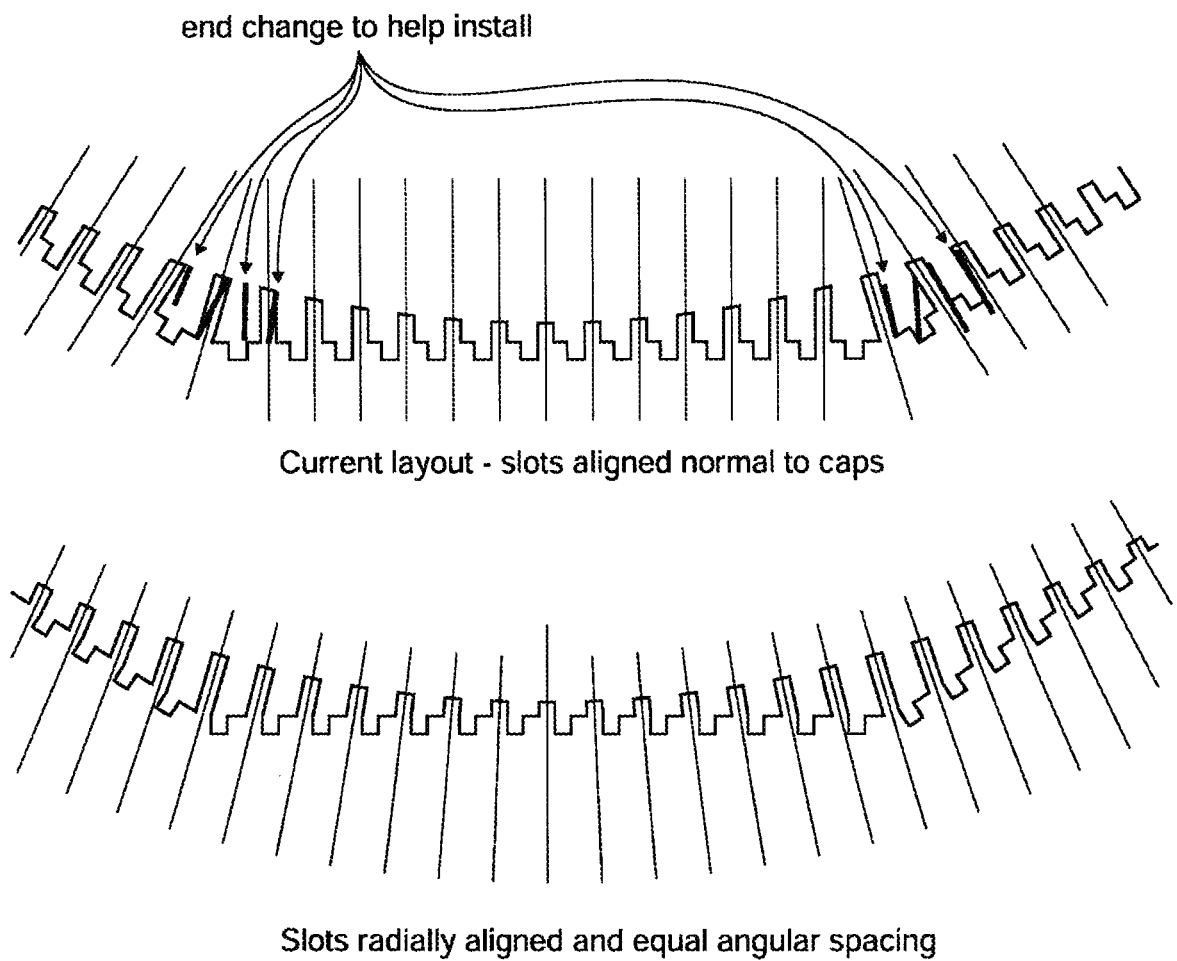
FIG. 11B is a view of a marked up reduction in size to facilitate winding installation.

In some embodiments, size is reduced to facilitate winding installation (e.g., wires). Wire slots near the transition between flat cap areas of the polygonal electric motor stator are marked to cut wider in the fashion of previously disclosed "slots radially aligned and equal angular spacing" in FIG. 11A and FIG. 11B. For example, FIG. 11B shows reduction in size to facilitate winding installation. Figures shows Winding difficulty with pencil lines for modification. In some embodiments, stiffening tubes are used to hold wires from hitting the rotating rotor. Modifying the stator slots near the transition between flat areas of the polygon assists in the installation of pre-wound stator winding.

Figure 14B:
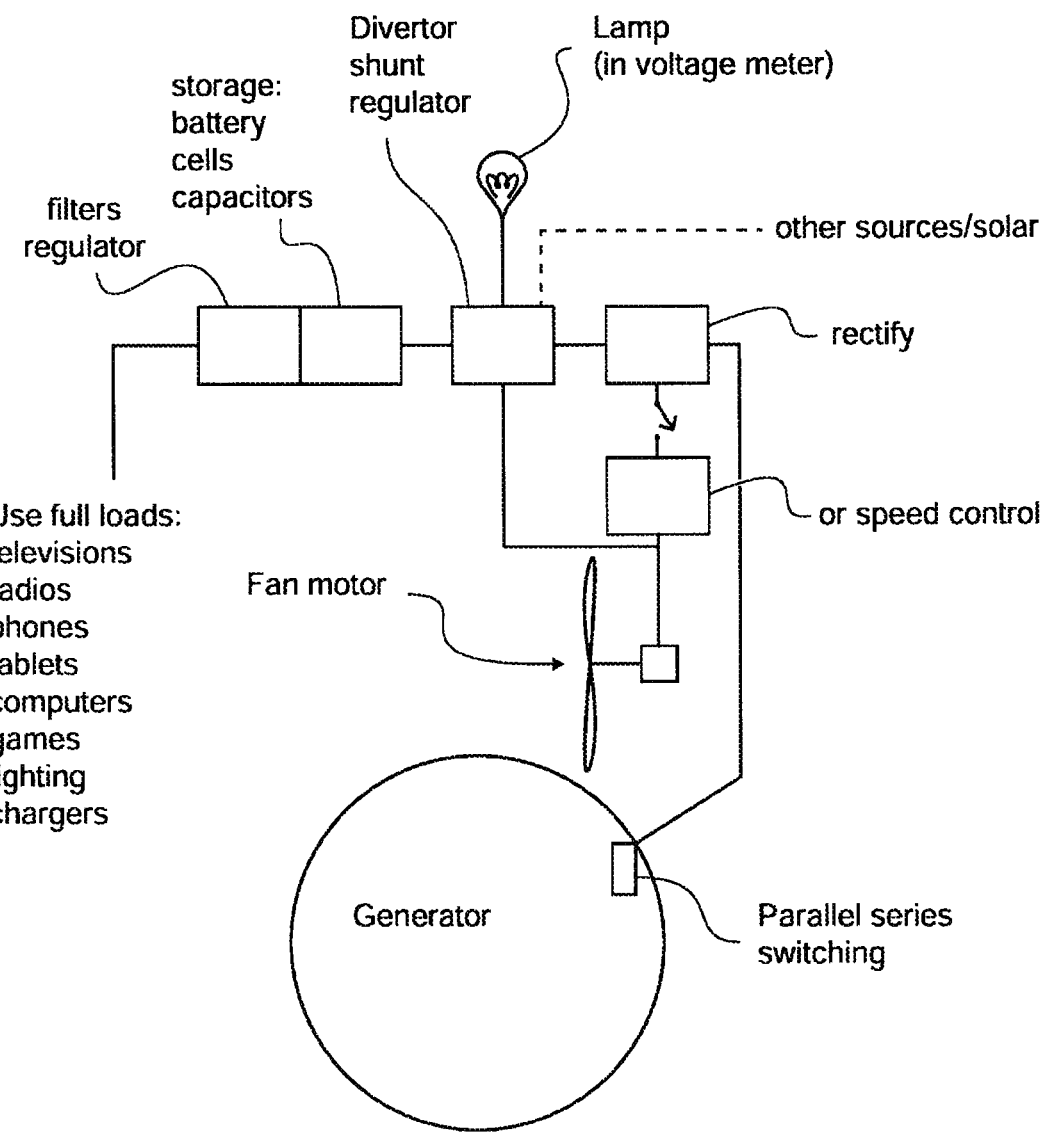
FIG. 14B is a schematic of utilizing power from a generator by diverting, shunting excess generator voltage to fan load.
Figure 14C:
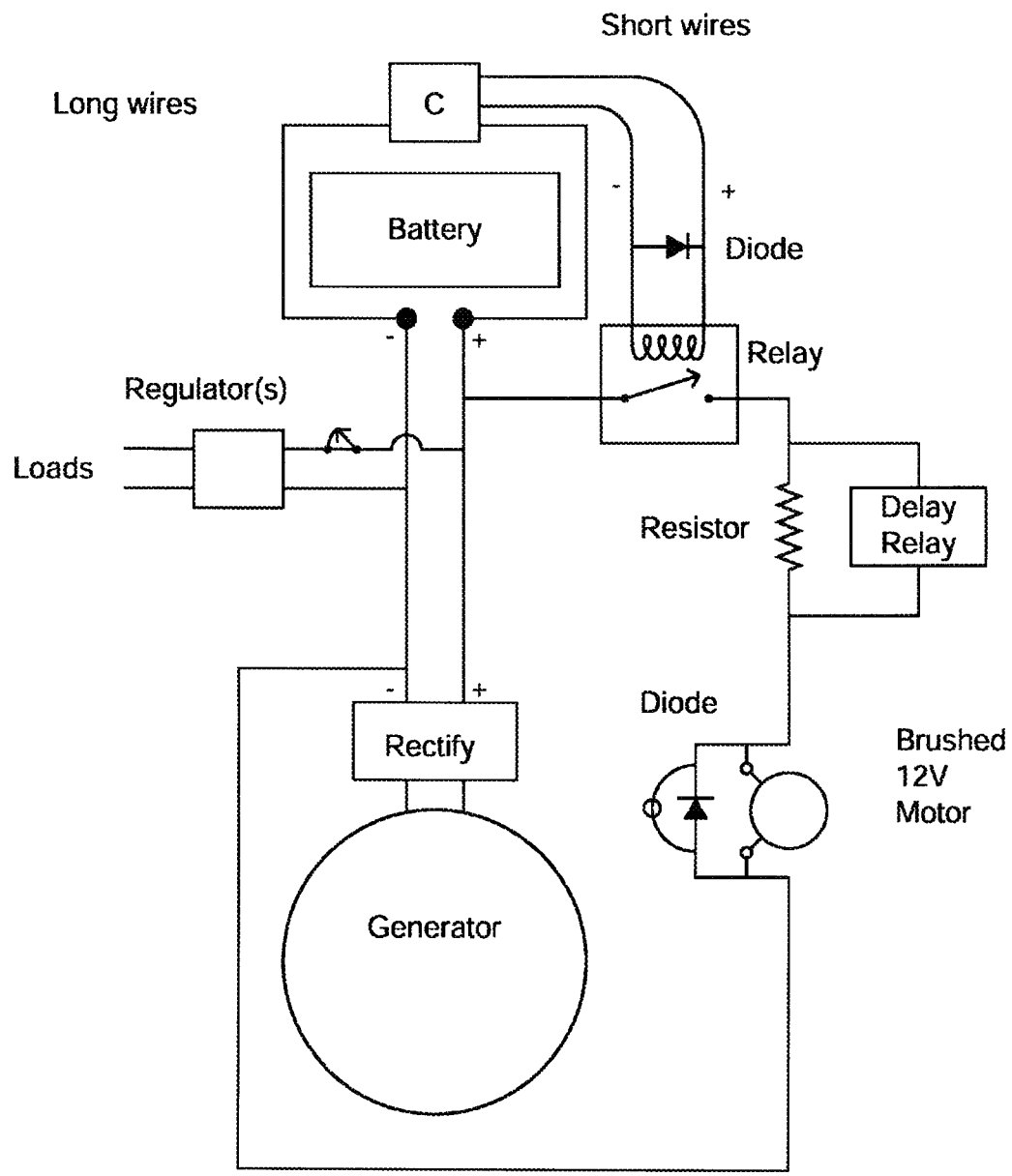
FIG. 14C is a schematic of utilizing power from a generator by relay control C and soft start of fan, C may be manual or specific voltage triggered to divert over voltage.
Figure 14D:
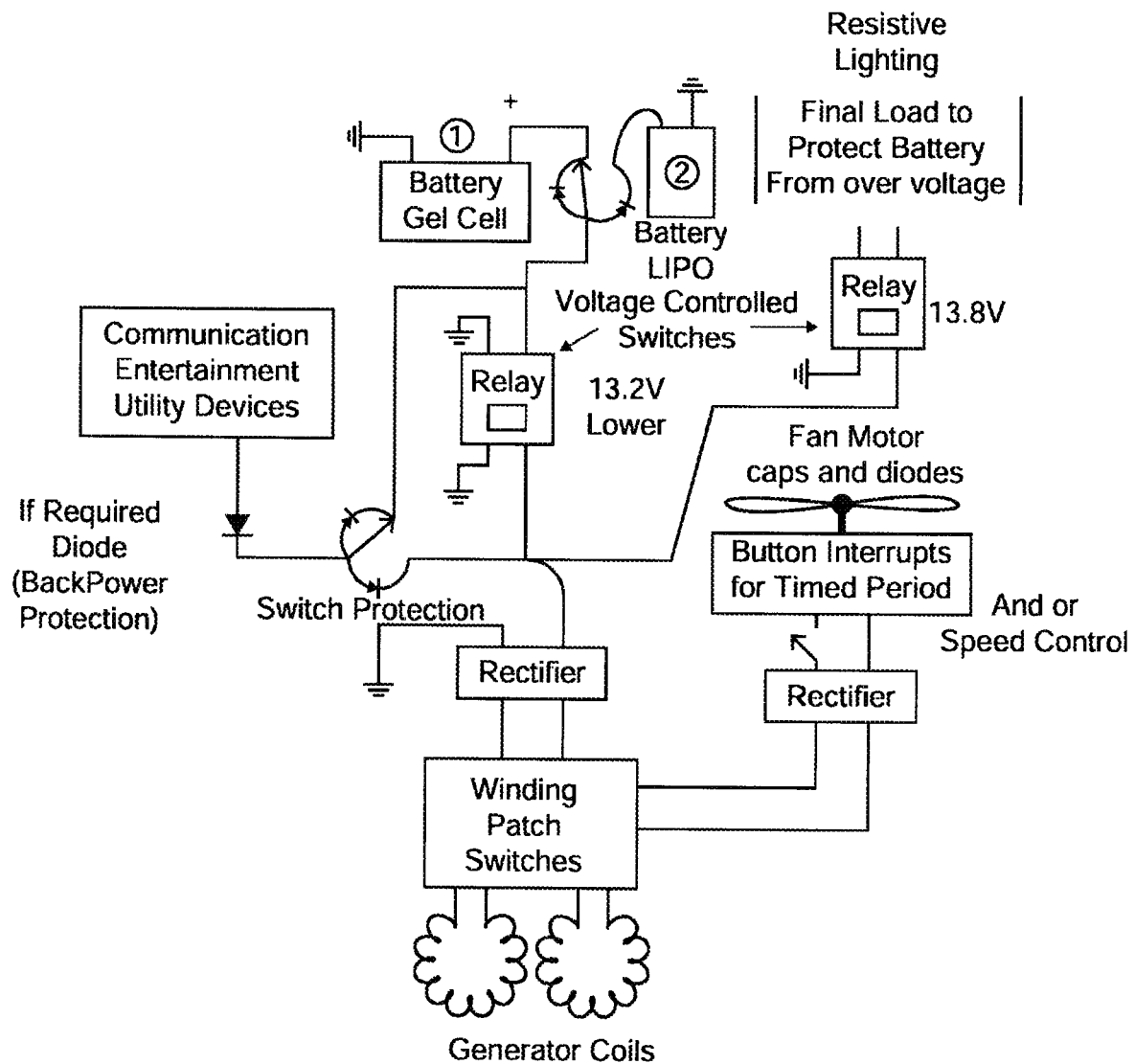
FIG. 14D is a schematic of utilizing power from a generator by two stage relay voltage diversion control with fan circuit entirely separated.
Figure 14E:
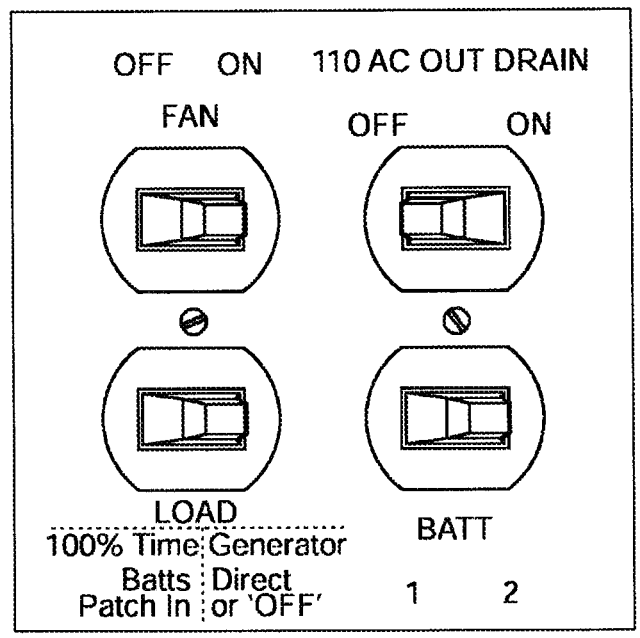

FIG. 14B shows diverting or shunting excess generator voltage to the fan load. Excess voltage is diverted to light a lamp in a voltage meter or to power the cooling fan. The correct voltage range is sent to storage, buffers, or filters, with a possible final stage of regulation prior to supplying electricity to sensitive electronics.

Figure 11C:
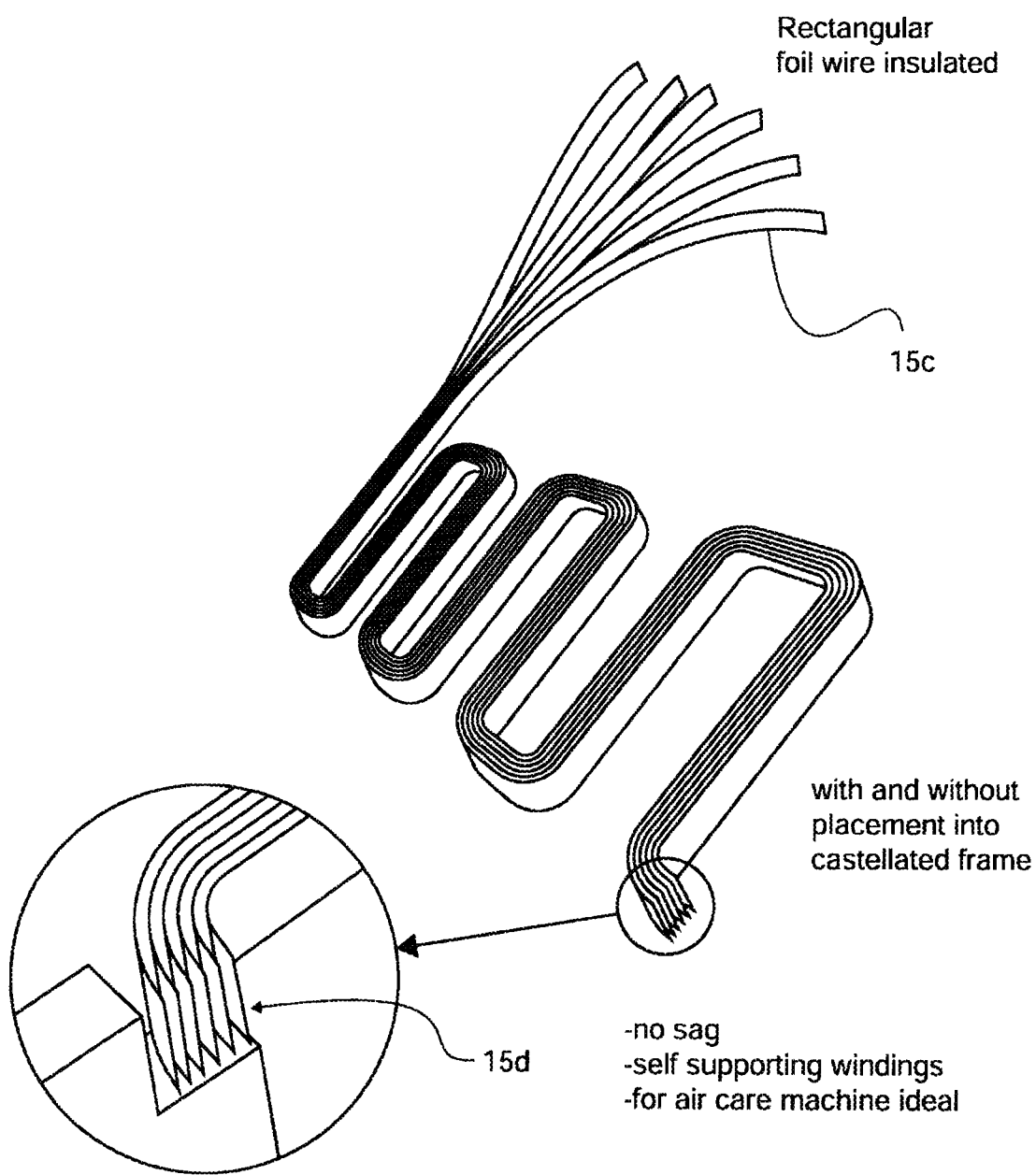
FIG. 11C is a view of flat winding conductors for shear beams anti sag.

FIG. 11C shows a winding 15d consisting of individual flat conductors 15c splayed out individually to demonstrate how it is constructed. In some embodiments, flat copper wire is used on its side to hold itself up so it does not sag into the moving rotor. In some cases, such as when the bike needs to freely coast, no metal is used on the stator that would produce a magnetic link preventing human rotation due to extreme cogging resistance due to the large number of poles magnetic attraction. In other applications the device could be started up as a motor by stored energy till energy from an outside source (e.g., wind generator, water wheel, solar, etc.) could take over and keep it rotating to switch to generation. The vertical arrangement of the thin dimension acts as a shear web beam to span the stator with minimum sag, thus avoiding contact with the rotor, and achieving the minimum of gap between rotating rotor and static stator. Item 15c is an individual flat conductor winding arranged as a shear web beam to span the stator with minimum sag. Item 15d shows a group of 15c conductors filling the available stator winding space noted in cutaway view.

Figure 11D:
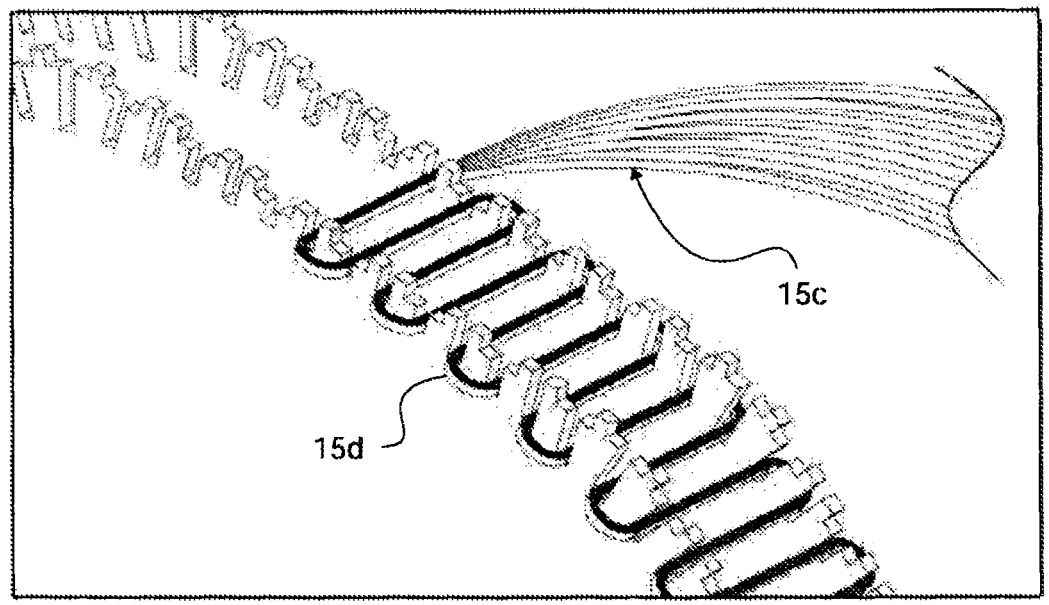
FIG. 11D is a view of flat winding conductors for shear beams anti sag.
Figure 11E:
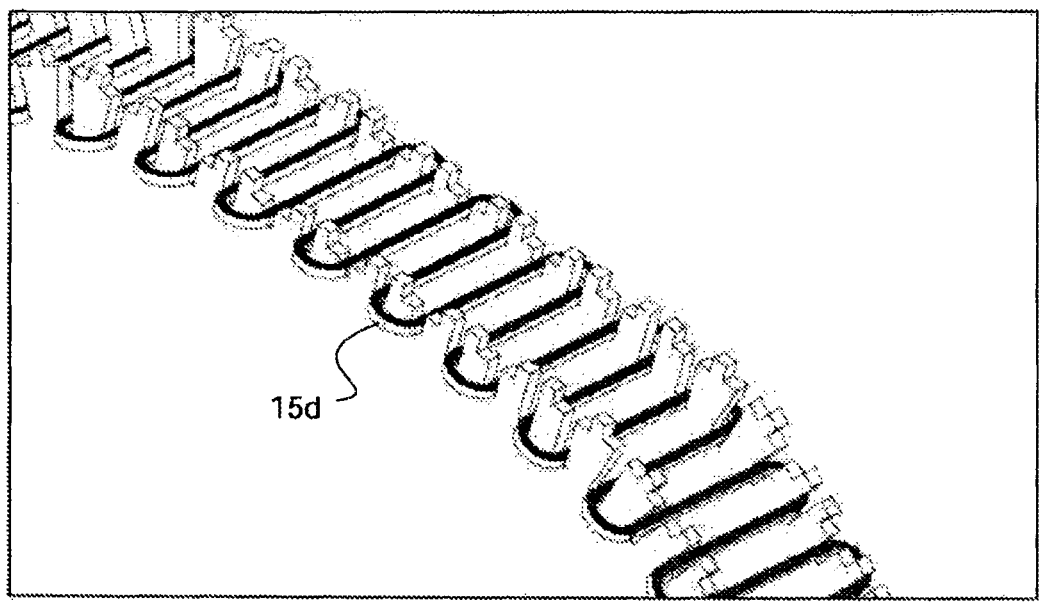
FIG. 11E is a view of flat winding conductors for shear beams anti sag.
Figure 11F:
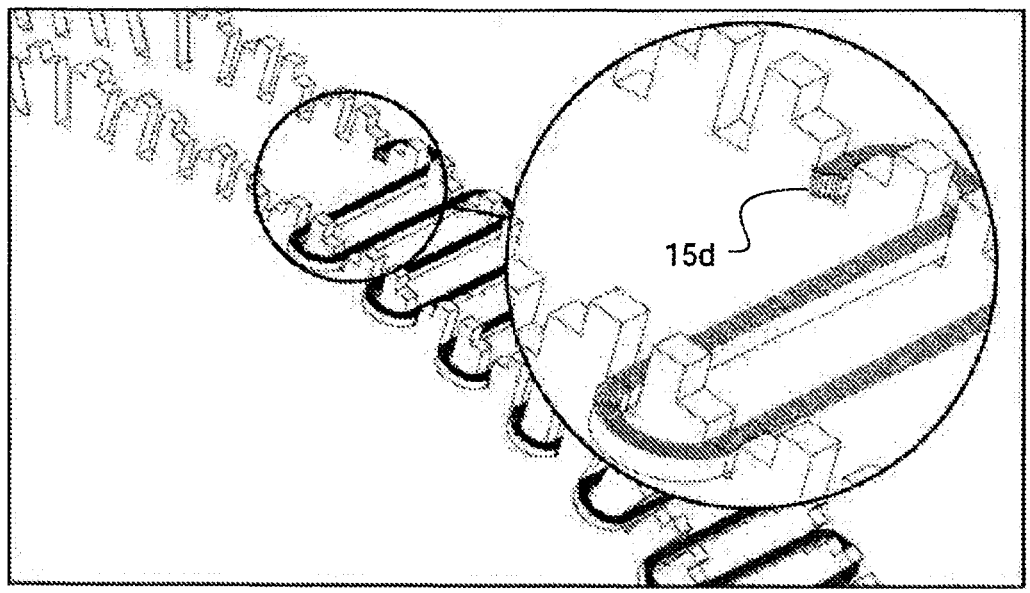
FIG. 11F is a view of flat winding conductors for shear beams anti sag.
Figure 11G:
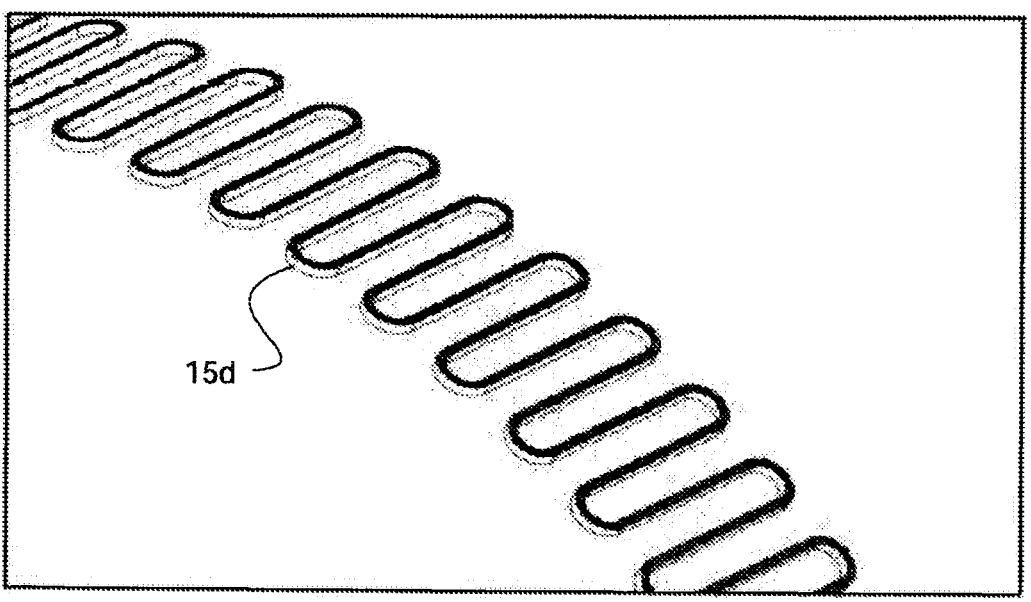
FIG. 11G is a view of flat winding conductors for shear beams anti sag.
Figure 11H:
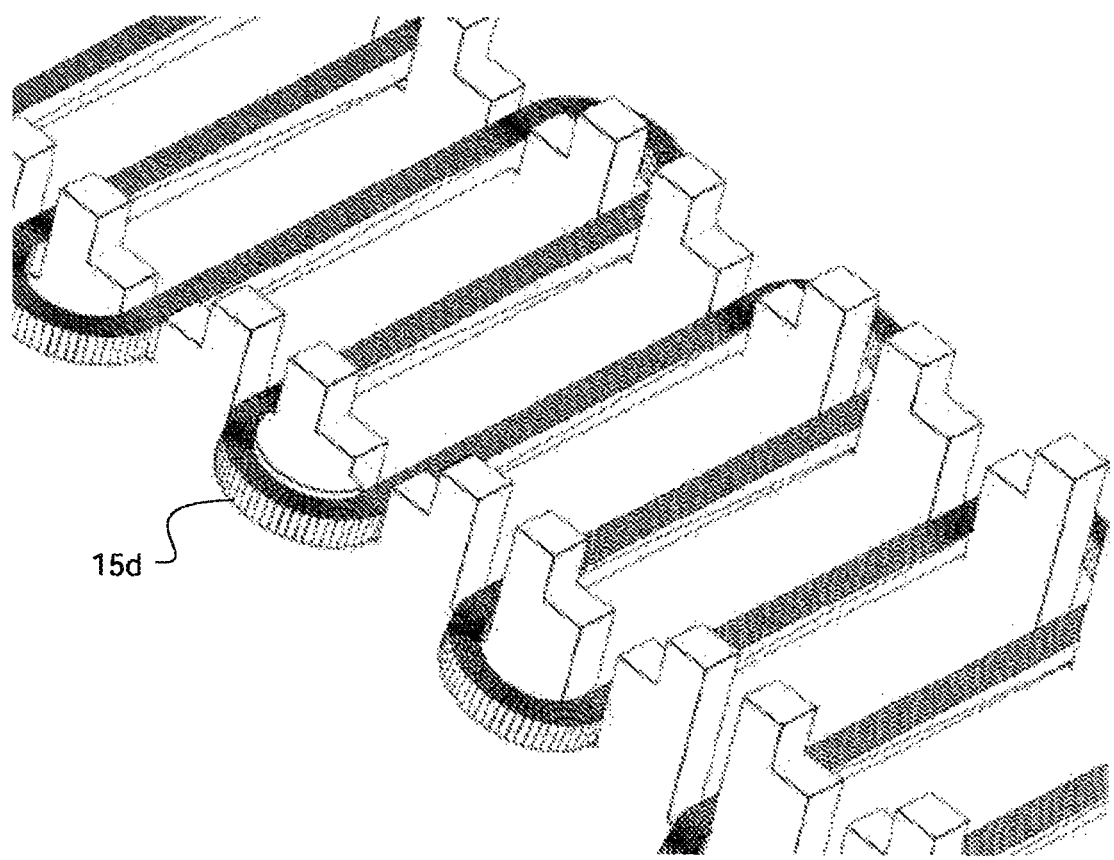
FIG. 11H is a view of flat winding conductors for shear beams anti sag.

FIG. 11D shows a winding 15d of individual flat conductors 15c splayed out individually to demonstrate how it is constructed, while FIG. 11E shows winding 15d in the stator. FIG. 11F is a sectional view of the edge hypothetical cutaway to demonstrate the method of winding with flat conductors 15d. FIG. 11G is a winding shown pre bent and formed prior to installation on the stator, to ease or expedite installation. FIG. 11H shows a winding close up to indicate curvature associated with computer aided design internal logic.

Figure 11I:
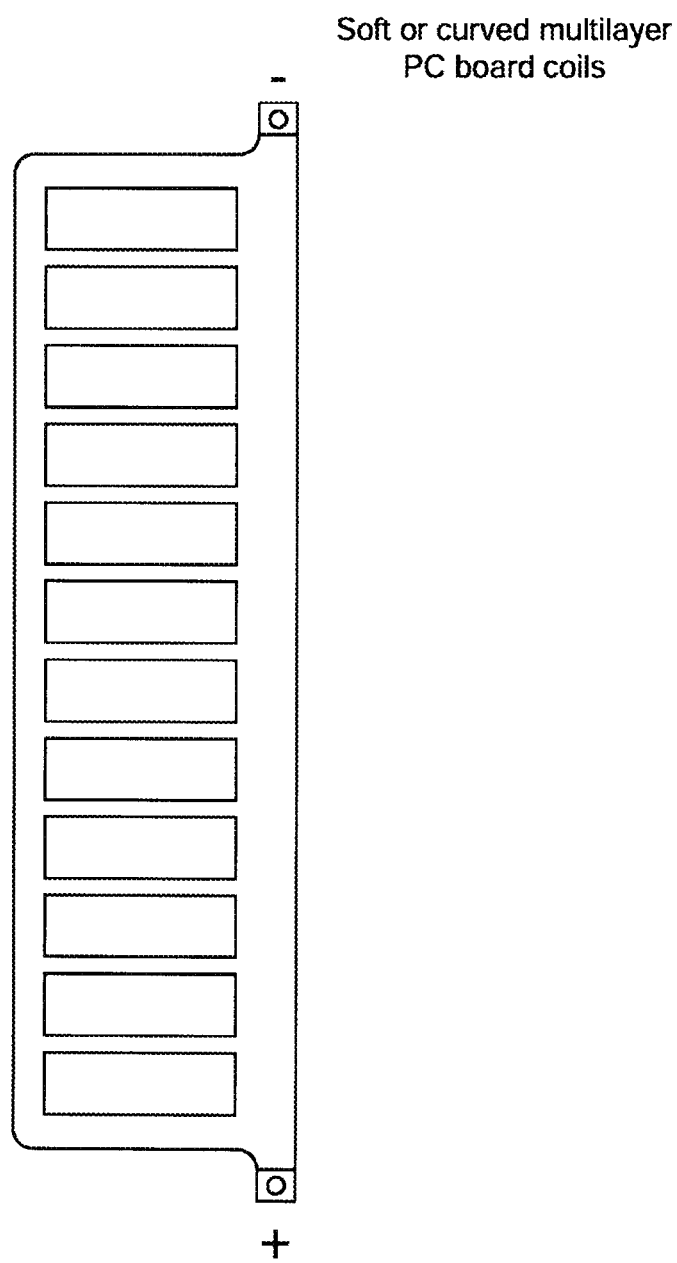
FIG. 11I is a view of a multilayer Printed Circuit Board acting as wire winding.
Figure 11J:
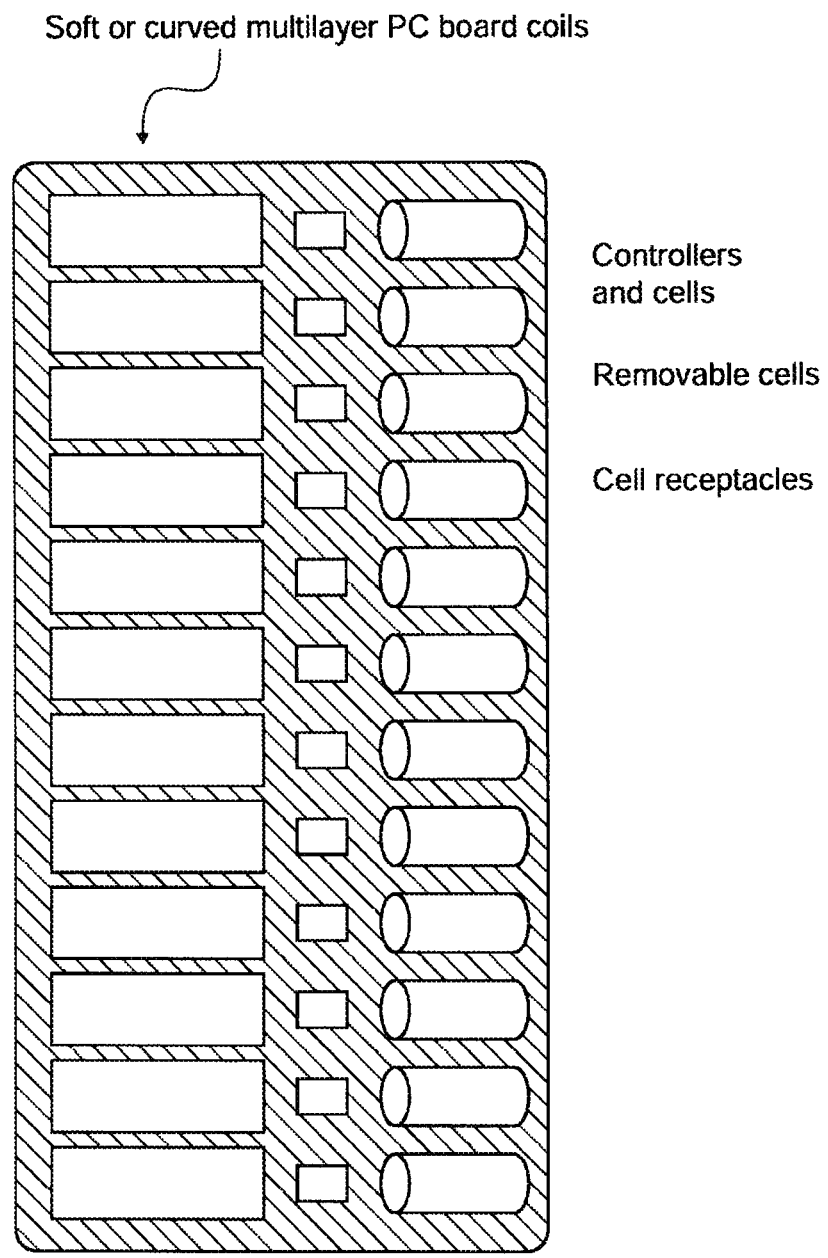
FIG. 11J is a view of a multilayer Printed Circuit with a group of Francis Pole Power Groups.

In some embodiments, windings further include PC boards. For example, pole winding coils may be made out of multilayer printed circuit boards or coils adjacent to the printed circuit board materiel. In FIG. 11I a printed circuit board is shown without electronics. FIG. 11J shows a multilayer printed circuit board with electronics, for example power groups associated with applications U.S. Ser. No. 14/497,347 and U.S. Ser. No. 17/240,783. FIG. 11J illustrates printed circuit board attaching the power groups as an option, although this would reduce serviceability on a per power group basis. Preferred printed circuits are flexible (e.g., paper, fabric, polymer, lightweight material, etc.), though rigid boards may be used.

Figures shows a multilayer Printed Circuit Board with electronics, for example a power group associated with applications U.S. Ser. No. 14/497,347 and U.S. Ser. No. 17/240,783, with individual solar cell panels assigned to each group. we see individual coils embedded in conductor layers of a multilayer Printed Circuit Board forming one Power Group being installed over a photograph of real stator frame with a previously installed example of a conventional wire winding. Figures shows schematically the addition of separate solar power generation panels for each power group as a source of energy that is in addition to regenerative braking and or other sources. Thermoelectric cells could be substituted for the Solar Cells. The inhibition or failure of one solar cell does not damage the other Solar Cells that are not connected to it, and thus the machine continues to operate reasonably well. Optional 3 phase overlapped windings (not shown) as single phase is easier to show, as in previous applications.

The printed circuit boards or other modular construction facilitates the ability to service or replace individual components such as chemical cells or groups of components, or power groups. It also possible to automatically discard burning components away from the vehicle, preferably downward or in a harmless direction. Rotating the entire motor generator system (e.g., on demand, as part of motive operation, etc.) would also facilitate service or automatically discarding burning or damaged components.

FIG. 29A is a view from above of a motor generator with integrated stored energy that rotates in its mounts to allow dumping of burning cells below or rapid changing of cells by hand from above in the engine bay under the hood, mounted to the transmission of vehicles in a size similar to existing ICE (internal combustion engines).

FIG. 29B shows details of an external shaft bearing in motor mount along with a lock, for example a lever lock. A through motor rotating shaft extends into an external motor mount to the vehicle frame with a bearing in the motor mount to support the motor generator on both sides. The option of rotation facilitates the ability to spin the motor generator and chemical cell combination for servicing. An Internal Combustion engine could also take the place of the external motor mount herein for a common hybrid architecture except for the ability to spin the motor generator and chemical cell combination for service. FIG. 29C shows an external shaft bearing in motor mount, with a perpendicular pin lock.

FIG. 29D shows a side view a motor generator that rotates in its mounts to allow dumping of burning cells below or rapid changing of cells by hand from above in the engine bay under the hood, mounted to the transmission of vehicles in a size similar existing ICE engines.

Figure 15:
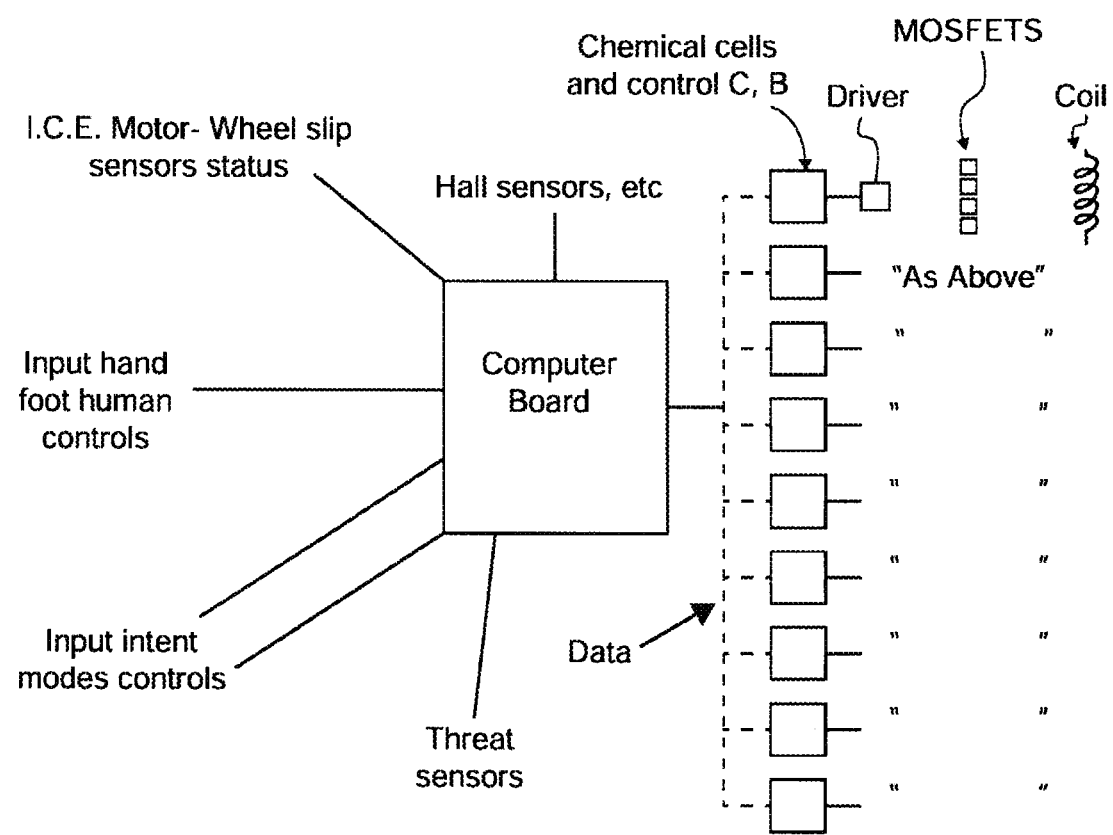
Figure 16:
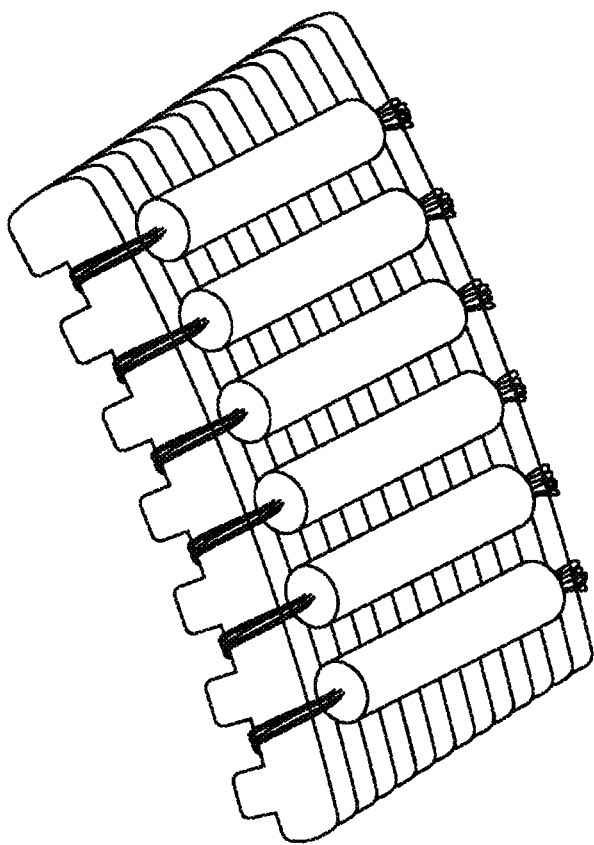
Figure 17:
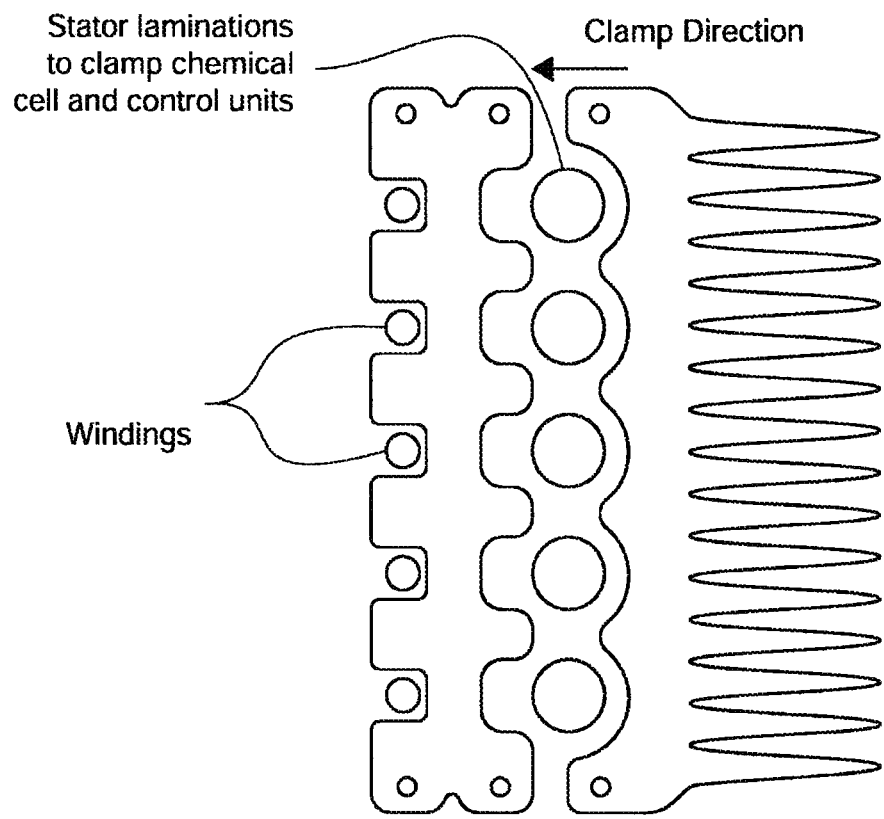

FIG. 16 shows an electric motor generator with the stator magnetic circuit and power group associated with applications U.S. Ser. No. 14/497,347 and U.S. Ser. No. 17/240,783 and FIG. 15. The 2d methods of U.S. Ser. No. 15/410,630 are used to manufacture Longitudinal Magnetic Laminations. FIG. 16 shows an example where the stack of laminates which forming the cap of the motor stator has power groups with windings wrapped around the laminations from the sides. Shown in FIG. 17 is a side view of 2d laminations that add the functions of holding the power groups in position and providing cooling surface area to the power groups.

Figure 22:
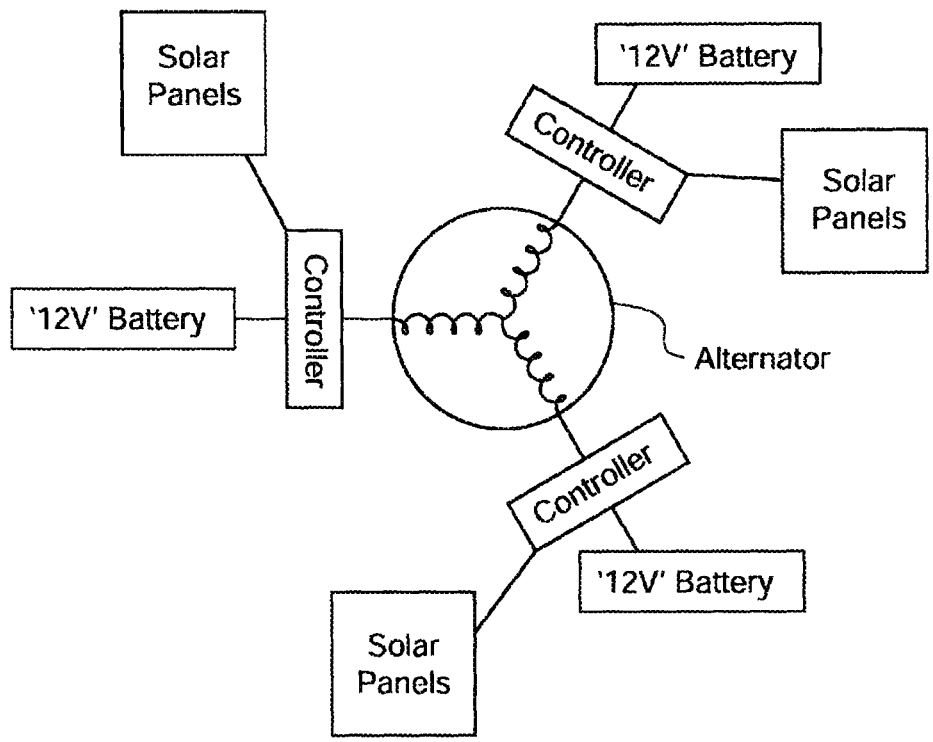

It is contemplated that existing alternators (e.g., of 2d manufacture) can be converted into motor generators capable of acting to start the vehicle in motion and start the combustion engine and then generate electricity underway or under deceleration, for example by existing fan belt or other means. FIG. 22 shows a modified schematic of an automotive alternator with one capacitor bank winding, another winding for a deep cycle group of chemical cells, or a third winding for starting type group of cells, designed to fit and function into the space of the replaced standard lead acid automotive battery location.

In some embodiments, the stator magnetic circuit and power group of applications U.S. Ser. No. 14/497,347 and U.S. Ser. No. 17/240,783 are used to modify an alternator such that electricity is discharged from the chemical cell or cells to the stator phase poles and coils of the power groups at voltages inherently available from the individual phase of historically commonly available 12 nominal alternator, or at nominal voltages of 12, 24, 36 or 48 volts. Preferably, the controllers could exploit residual magnetism to start generation even if no batteries where present, and accomplish feeding and control of any field coil that might exist. Ideally the controllers could switch between nominal 12v dc charge controls to output unrectified AC voltage of variable frequency at perhaps near 110 volts AC to equipment that could directly use it or to power conversion equipment.

Methods, systems, and devices are contemplated to keep the mosfets or other switching adequate when the main or single chemical cell sags its voltage under load to a level below the switch's normal or rated operation, for example with the power group of applications U.S. Ser. No. 14/497, 347 and U.S. Ser. No. 17/240,783, and FIG. 15. For example, the main or single chemical cell is matched with other types of chemical cells (e.g., electrolytic capacitors or super capacitors, etc.) by an additional passive or active switching scheme that supports the load and voltage to assist the main or single chemical cell. See FIGS. 23, 24, 27, and 28. Inductive matching can also be used, for example with a separate winding on the same pole to either make the voltage sag of one type moot or to inductively reverse electricity to the sagging circuit. See FIG. 25. Further, two super capacitors operating below optimal voltage can be used to provide a buffer capacity within the voltage range of the main chemical cell (e.g., lithium based cell, etc.). See FIGS. 26 and 27.

Figure 23:
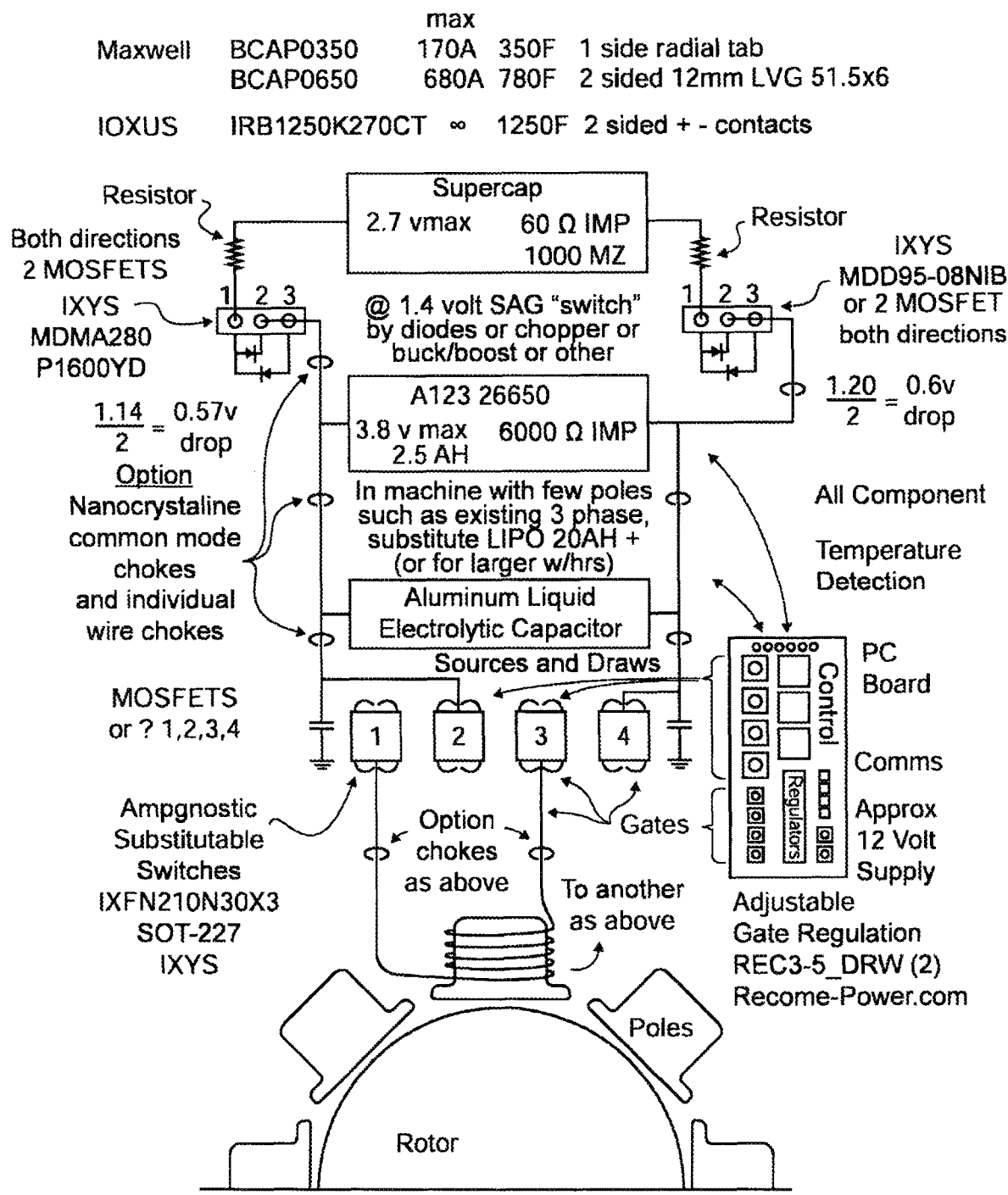

FIG. 23 shows an electric motor generator with the power group of U.S. Ser. No. 14/497,347, U.S. Ser. No. 17/240,783 and FIG. 15, preferably made by the 2d methods from U.S. Ser. No. 15/410,630. FIG. 23 shows the addition of 2 types of large capacitors to the power group. A supercapacitor and a conventional capacitor are used when the braking regeneration is in the high voltage of the chemical cell, while other capacitors of the system absorb part of the energy. When feeding the motor the chemical cell voltage will sag below the ability of switching mosfets to operate efficiently or at all, and the other capacitors add the energy needed for efficient mosfet switching.

The relative lower impedance of the 2 capacitors versus the chemical cell assists in making the 2 large capacitors for the potential to act as first in, first out, on energy exchange to solve problems of voltage sag from the storage LiPO or similar cells under load, and subsequent poor function of mosfets and Igbts at ultra low voltage. This architecture is unique to exploiting maximum amps of, for example, LiPO A123 and Supercaps without balancing problems of series applications. More than one coil and controller per coil will also have advantages in low frequency ziggurat switching, which is more tolerable to supercaps. The Regular Aluminum Electrolytic capacitor is common for battery wire inductance problems, and ripple smoothing. Although these large capacitors may seem to consume volume that could just as well have been more Lithium or high energy density cells, this application seeks to reduce the short and long term cost of cells by reducing quantity, increasing utilization and allowing individual replacement. Cooling systems space consumption may be replaced by these capacitor, inductor, chokes, nanocrystalline absorbers, resistor, semiconductor surface areas and functions.

Figure 24:
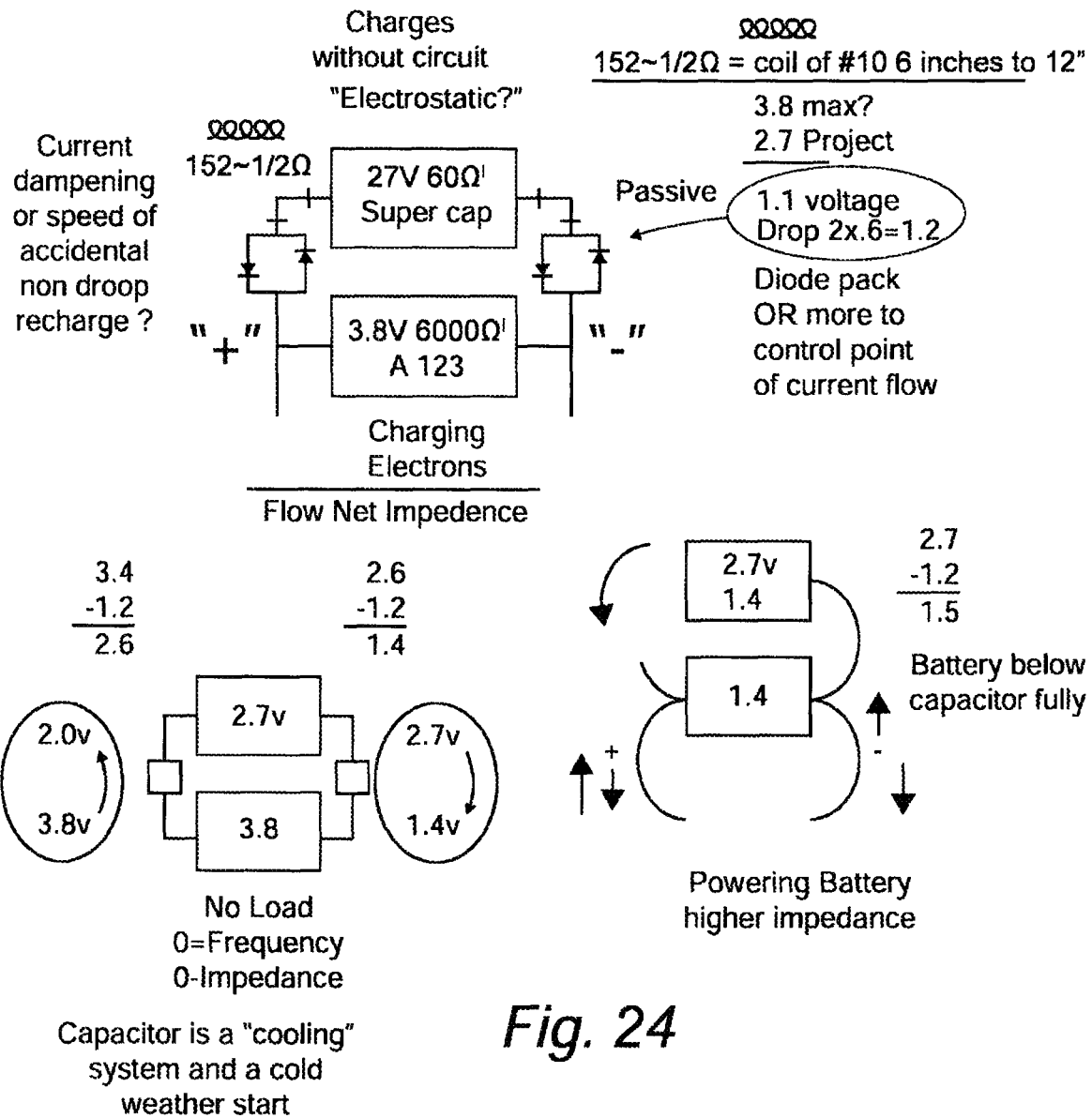

The 3 chemical cell component system splits work by inherent frequency-time base-inductance, and thus spreads thermal problems over a larger surface area. This provides a cooling solution as well as increasing discharge cycle life of system and providing for a more constant ripple reduced avoidance of voltage drop. The maximum voltage limits of the 'supercapacitor' are at this time lower than the maximum voltage of the chemical cell. The inherent voltage drop of diodes can be used to protect and equalize the 'supercapacitor' against the chemical cell, as shown in FIG. 23. Other passive devices are possible, capacitor, inductor, chokes, transformers, nanocrystalline absorbers, resistor, or semiconductors, for example. In FIG. 24, 26, 27, 28 the position of the diodes could be replaced with logic controlled switches or DC/DC buck boost convertors.

The motor coil facing mosfets could also be a part of a buck boost system to change the whole operating voltage of the storage system relative to the motor coils. However, in FIG. 23 we look at the most direct passive means for intellectual understanding and perhaps better machine performance that might avoid problems with voltages below semiconductor efficiency levels in general and the losses associated with buck boost conversion. FIG. 23 uses the flaw of diode semiconductor voltage drop as a semiconductor operational tool that performs consistently at low voltages, thus compensating for switching semiconductors that may not operate well at low voltages (e.g., high gate voltage required, high heating, poor efficiency, etc.).

Some, most, or all of the components in FIG. 23 increase the surface area of cooling of the system by taking use away from the chemical cell and putting that use in other components. Yet the paths are as short as possible to avoid conduction losses at low voltages and field collapse flyback voltages.

Ultracapacitors have a typical time constant of approximately one second. One time constant reflects the time necessary to charge a capacitor 63.2% of full charge or discharge to 36.8% of full charge. The time constant of an ultracapacitor is much higher than that of an electrolytic capacitor. Therefore, it is not possible to expose ultracapacitors to a continuous ripple current as overheating may result. The ultracapacitor can respond to short pulse power demands, but due to the time constant the efficiency or available energy is reduced. The most typical method of passive balancing utilizes resistors in parallel with the ultracapacitors. This method has a higher leakage current. Ultracapacitors are capable of operating between their rated voltage and zero volts. The energy in the capacitor is proportional to the voltage squared according to $E=\frac{1}{2}CV2$.

In some embodiments, one supercap is protected to access its higher voltage and higher capacity, for example 2.7 v max in a single supercapacitor versus 3.3 v nominal and 3.8 v max voltage in a A123 Lithium type. In FIG. 23, one supercap avoids the balancing problem of more than one super capacitor. Two supercaps in series have a max voltage of 5.4 volts for a strategy of undercharging or underutilizing the supercapacitors relative to the example A123 cell at 2.7 volts maximum as a passive means of voltage management. See FIGS. 24, 26, 27, and 28.

Figure 25:
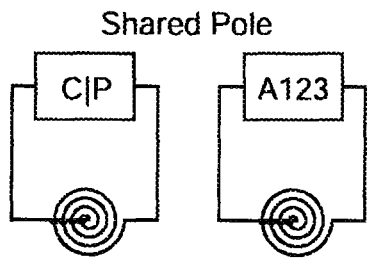

The capacitor in FIG. 25 helps to solve ripple and flyback inductance that damages the system, as with chokes. Likewise, low frequency switching using the rotor speed single square wave or trapazoidal commutation would reduce the frequency of ripple. The use of overlaid square waves by having more than one power group share a power pole could allow creating of a synthetic sinusoidal ziggurat wave at the motor magnetism interface. See FIGS. 24, 26, 27, and 28.

FIG. 25 shows another embodiment wher the super capacitor and the Lipo A123 is separated by separate windings on the same pole. Thus, the differences between the energy storage capabilities is managed by a transformer like function of the pole, and each device may be switched in and out in overlap opposition or complementation, or switched at completely separate times (e.g., a ziggurat wave summation or two separate pulses). FIG. 26 shows using the separate windings as buck boost transformers or as separation between North and South polarity of function, for example, to cause each power group to operate on one of the magnetic polarity transients of the rotating magnetic machine. FIGS. 27 and 28 show alternative embodiments of this concept.

A 2.5 ah A123 cell has a 10 second surge rating of 120 amps, the GWL brand 20 ah cell has a surge rating of 200 amps. Continuous Amps might be 40 to 70 depending on cooling. Attempting to use buck boost might cause ripple damage to the supercapacitor and at such high amps and low voltage it perhaps may be difficult to implement buck boost. This provides a surge absorber, sagfighter, and multi purpose cooling. Gate Voltage can be obtained from the 10 to 14.5 ish Automotive buss, the regulation for the gate is available at 12 volts. Measurement of state of charge of A123 cell by voltage becomes more difficult, but if thermal measurements are comprehensive, control by temperature is useful.

Cooling allows much larger amps. This architecture is unique to exploiting maximum amps of LiPO, A123 and Supercaps without balancing problems of series applications. More than one coil and controller per coil will also have advantages in low frequency ziggurat switching, which is more tolerable to supercaps. Variations on the example presented include different combinations of cell and capacitor chemistry and component choices to obtain the same result.

FIG. 15 shows electric motor generators of U.S. Ser. No. 14/497,347, U.S. Ser. No. 17/240,783 combined with 2d methods of electrical machine structure from U.S. Ser. No. 17/240,783 in vehicular application. See, e.g. FIGS. 2MMM, 2NNN, 2OOO, 18, 19, 20, 21. Both sides of a magnet are used for a magnetic circuit to be used when operated as a motor, such that cogging resistance could be managed or tolerated.

Figure 18:
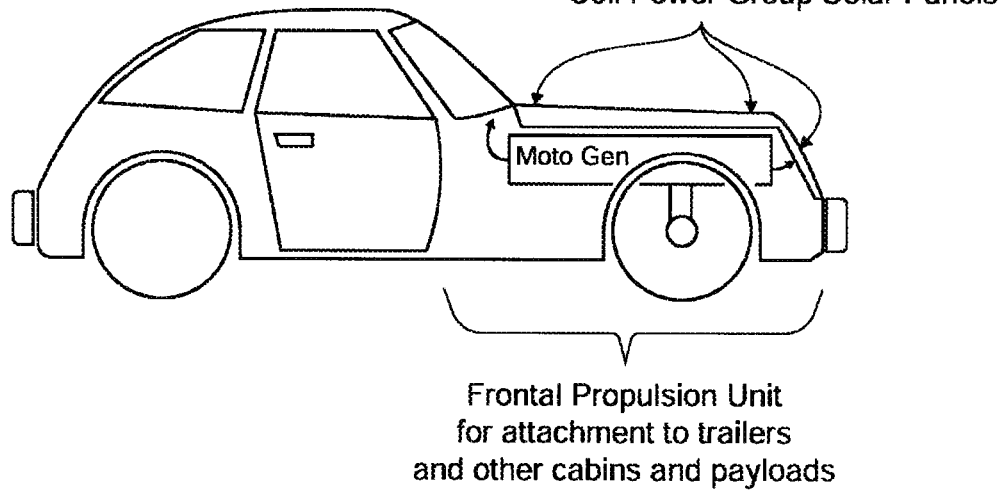
Figure 19:
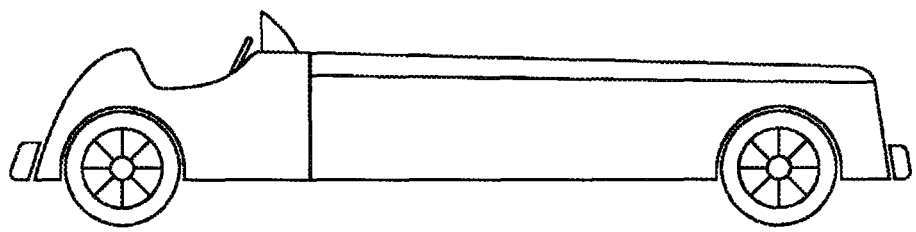
Figure 20:
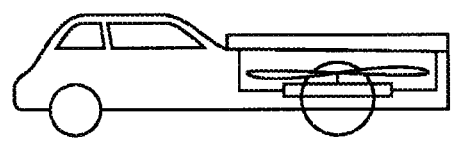
Figure 21:
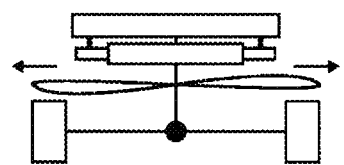

FIG. 18 shows an installation of functions in the long hood of a vehicle, where the long hood is covered with solar cells that feed the power groups. If that vehicle is front wheel drive then the propulsion unit could be attached and removed from trailers and cabins and payloads of various types. FIG. 19 shows an example of a very long hood vehicle to allow more solar power generation. FIG. 20 and FIG. 21 show how a cooling propeller could function on the motor generator shaft.

Descriptions throughout this document include information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary. The recitation of ranges of values herein is merely intended to serve as a shorthand method of referring individually to each separate value falling within the range. Unless otherwise indicated herein, each individual value is incorporated into the specification as if it were individually recited herein.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the detailed description of preferred embodiments, along with the accompanying drawing figures in which like numerals represent like components.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Nothing stated herein precludes or excludes other combinations and arrangements of the methods and mechanisms disclosed herein.

I claim:

1. An electric generator comprising:
   a drum having a first and a second side wall with a plurality of stator poles at an edge of each side wall;
   a table disposed above the drum;
   a conductor disposed about the plurality of stator poles;
   an axle passing through the first and second side walls;
   a first and a second plate disposed within the drum and coupled to the axle, wherein the first and second plates rotate with the axle;
   a plurality of magnets disposed between an edge of the first and second plates; and
   a crank coupled to the axle outside of the drum; wherein at least one of the first and second side walls or first and second plates is wood.

2. The generator of claim 1, further comprising a foot pedal coupled to the crank.

3. The generator of claim 1, wherein each of the first and second side walls and first and second plates are at least 50% composed of wood.

4. The generator of claim 1, wherein each of the first and second side walls and first and second plates are composed of wood.

5. The generator of claim 1, further comprising a first connector spanning between the edge of each side wall and coupled to each side wall.

6. The generator of claim 5, wherein the first connector is coupled to each side wall via a mated slot and post.

7. The generator of claim 1, wherein the conductor is a copper wire.

8. The generator of claim 1, wherein the conductor is a flat strip of copper.

9. The generator of claim 1, wherein the conductor is electrically coupled to one of a battery, an electric motor, or an electric outlet.

10. The generator of claim 1, further comprising a seat disposed above the drum.

11. The generator of claim 10, wherein the seat is composed of wood.

12. The generator of claim 10, wherein the seat is coupled to the drum.

13. The generator of claim 1, wherein the table comprises a base and an upper tier.

14. The generator of claim 1, wherein the crank is a first crank and further comprising a second crank coupled to the axle outside of the drum.

15. The generator of claim 14, further comprising a pedal coupled to the first and second cranks.

16. The generator of claim 1, further comprising a second connector spanning between the edge of each plate and coupled to each plate.

17. The generator of claim 16, wherein the second connector is coupled to each plate via a mated slot and post.

18. The generator of claim 1, wherein the table is composed of wood.

19. An electric generator comprising:
- a drum having a first and a second side wall with a plurality of stator poles at an edge of each side wall;
- a seat disposed above the drum and an electric fan directed at the seat;
- a conductor disposed about the plurality of stator poles;
- an axle passing through the first and second side walls;
- a first and a second plate disposed within the drum and coupled to the axle, wherein the first and second plates rotate with the axle;
- a plurality of magnets disposed between an edge of the first and second plates; and
- a crank coupled to the axle outside of the drum: wherein at least one of the first and second side walls or first and second plates is wood.

* * * * *